(12) United States Patent
Poltorak

(10) Patent No.: US 11,341,962 B2
(45) Date of Patent: May 24, 2022

(54) ELECTRONIC PERSONAL INTERACTIVE DEVICE

(71) Applicant: Alexander Poltorak, Monsey, NY (US)

(72) Inventor: Alexander Poltorak, Monsey, NY (US)

(73) Assignee: Poltorak Technologies LLC, Suffern, NY (US)

( * ) Notice: Subject to any disclaimer, the term of this patent is extended or adjusted under 35 U.S.C. 154(b) by 910 days.

(21) Appl. No.: 15/492,833

(22) Filed: Apr. 20, 2017

(65) Prior Publication Data

US 2017/0221483 A1    Aug. 3, 2017

Related U.S. Application Data

(63) Continuation of application No. 13/106,575, filed on May 12, 2011, now Pat. No. 9,634,855.
(Continued)

(51) Int. Cl.
| | | |
|---|---|---|
| *G10L 15/16* | (2006.01) | |
| *G10L 15/22* | (2006.01) | |
| *G06F 16/435* | (2019.01) | |
| *G10L 13/033* | (2013.01) | |
| *G06V 40/20* | (2022.01) | |
| *G06V 40/16* | (2022.01) | |

(Continued)

(52) U.S. Cl.
CPC ............. *G10L 15/22* (2013.01); *G06F 3/017* (2013.01); *G06F 3/167* (2013.01); *G06F 16/435* (2019.01); *G06T 13/205* (2013.01); *G06V 40/174* (2022.01); *G06V 40/28* (2022.01); *G10L 13/00* (2013.01); *G10L 13/033* (2013.01); *G10L 15/142* (2013.01); *G10L 15/16* (2013.01); *G10L 15/1815* (2013.01); *G10L 15/30* (2013.01); *G10L 25/63* (2013.01); *H04L 12/2818* (2013.01); *G10L 2015/223* (2013.01); *H04M 1/0202* (2013.01); *H04M 2250/10* (2013.01); *H04W 84/12* (2013.01); *H04W 84/18* (2013.01)

(58) Field of Classification Search
CPC ................................. G06F 16/33; G06F 16/58
USPC ...................................................... 706/15, 45
See application file for complete search history.

(56) References Cited

U.S. PATENT DOCUMENTS

| 3,494,068 A | 2/1970 | Crosman et al. |
|---|---|---|
| 4,319,229 A | 3/1982 | Kirkor |

(Continued)

FOREIGN PATENT DOCUMENTS

| JP | 2002304401 | 10/2002 |
|---|---|---|
| JP | 2007207218 | 8/2007 |

(Continued)

*Primary Examiner* — David R Vincent
(74) *Attorney, Agent, or Firm* — Hoffberg & Associates; Steven M. Hoffberg

(57) ABSTRACT

An interface device and method of use, comprising audio and image inputs; a processor for determining topics of interest, and receiving information of interest to the user from a remote resource; an audio-visual output for presenting an anthropomorphic object conveying the received information, having a selectively defined and adaptively alterable mood; an external communication device adapted to remotely communicate at least a voice conversation with a human user of the personal interface device. Also provided is a system and method adapted to receive logic for, synthesize, and engage in conversation dependent on received conversational logic and a personality.

27 Claims, 8 Drawing Sheets

Related U.S. Application Data

(60) Provisional application No. 61/334,564, filed on May 13, 2010.

(51) Int. Cl.

| | | |
|---|---|---|
| *H04L 12/28* | (2006.01) | |
| *G06F 3/01* | (2006.01) | |
| *G06F 3/16* | (2006.01) | |
| *G06T 13/20* | (2011.01) | |
| *G10L 13/00* | (2006.01) | |
| *G10L 15/18* | (2013.01) | |
| *G10L 15/30* | (2013.01) | |
| *G10L 15/14* | (2006.01) | |
| *G10L 25/63* | (2013.01) | |
| *H04W 84/18* | (2009.01) | |
| *H04M 1/02* | (2006.01) | |
| *H04W 84/12* | (2009.01) | |

(56) References Cited

U.S. PATENT DOCUMENTS

| | | |
|---|---|---|
| 4,723,159 A | 2/1988 | Imsand |
| 5,215,493 A | 6/1993 | Zgrodek et al. |
| 5,774,591 A | 6/1998 | Black et al. |
| 5,875,108 A | 2/1999 | Hoffberg et al. |
| 5,877,759 A | 3/1999 | Bauer |
| 5,901,246 A | 5/1999 | Hoffberg et al. |
| 5,902,169 A | 5/1999 | Yamakawa |
| 5,907,706 A | 5/1999 | Brodsky et al. |
| 6,070,140 A * | 5/2000 | Tran ............... G06F 1/3215 704/275 |
| 6,081,750 A | 6/2000 | Hoffberg et al. |
| 6,088,040 A | 7/2000 | Oda et al. |
| 6,108,640 A | 8/2000 | Slotznick |
| 6,138,095 A | 10/2000 | Gupta et al. |
| 6,146,721 A | 11/2000 | Freynet |
| 6,206,829 B1 | 3/2001 | Iliff |
| 6,311,159 B1 | 10/2001 | Van Tichelen et al. |
| 6,314,410 B1 | 11/2001 | Tackett et al. |
| 6,336,029 B1 | 1/2002 | Ho et al. |
| 6,400,996 B1 | 6/2002 | Hoffberg et al. |
| 6,411,687 B1 | 6/2002 | Bohacek et al. |
| 6,418,424 B1 | 7/2002 | Hoffberg et al. |
| 6,434,527 B1 | 8/2002 | Horvitz |
| 6,437,975 B1 | 8/2002 | Huang |
| 6,442,519 B1 | 8/2002 | Kanevsky et al. |
| 6,456,695 B2 | 9/2002 | Lee |
| 6,466,213 B2 | 10/2002 | Bickmore et al. |
| 6,480,698 B2 | 11/2002 | Ho et al. |
| 6,482,156 B2 | 11/2002 | Iliff |
| 6,501,937 B1 | 12/2002 | Ho et al. |
| 6,513,009 B1 | 1/2003 | Comerford et al. |
| 6,561,811 B2 | 5/2003 | Rapoza et al. |
| 6,564,261 B1 | 5/2003 | Gudjonsson et al. |
| 6,615,172 B1 | 9/2003 | Bennett et al. |
| 6,633,846 B1 | 10/2003 | Bennett et al. |
| 6,640,145 B2 | 10/2003 | Hoffberg et al. |
| 6,659,857 B2 | 12/2003 | Ryan et al. |
| 6,665,640 B1 | 12/2003 | Bennett et al. |
| 6,681,032 B2 | 1/2004 | Bortolussi et al. |
| 6,691,151 B1 | 2/2004 | Cheyer et al. |
| 6,721,706 B1 | 4/2004 | Strubbe et al. |
| 6,728,679 B1 | 4/2004 | Strubbe et al. |
| 6,731,307 B1 | 5/2004 | Strubbe et al. |
| 6,754,647 B1 | 6/2004 | Tackett et al. |
| 6,758,717 B1 | 7/2004 | Park et al. |
| 6,778,970 B2 | 8/2004 | Au |
| 6,782,364 B2 | 8/2004 | Horvitz |
| 6,785,651 B1 | 8/2004 | Wang |
| 6,795,808 B1 | 9/2004 | Strubbe et al. |
| 6,826,540 B1 | 11/2004 | Plantec et al. |
| 6,842,737 B1 | 1/2005 | Stiles et al. |
| 6,849,045 B2 | 2/2005 | Iliff |
| 6,850,252 B1 | 2/2005 | Hoffberg |
| 6,851,115 B1 | 2/2005 | Cheyer et al. |
| 6,853,971 B2 | 2/2005 | Taylor |
| 6,859,931 B1 | 2/2005 | Cheyer et al. |
| 6,865,370 B2 | 3/2005 | Ho et al. |
| 6,904,408 B1 | 6/2005 | McCarthy et al. |
| 6,961,748 B2 | 11/2005 | Murrell et al. |
| 6,970,821 B1 | 11/2005 | Shambaugh et al. |
| 6,975,970 B2 | 12/2005 | Thorisson |
| 6,988,072 B2 | 1/2006 | Horvitz |
| 7,003,139 B2 | 2/2006 | Endrikhovski et al. |
| 7,006,098 B2 | 2/2006 | Bickmore et al. |
| 7,006,881 B1 | 2/2006 | Hoffberg et al. |
| 7,007,235 B1 | 2/2006 | Hussein et al. |
| 7,019,749 B2 | 3/2006 | Guo et al. |
| 7,023,979 B1 | 4/2006 | Wu et al. |
| 7,036,128 B1 | 4/2006 | Julia et al. |
| 7,047,226 B2 | 5/2006 | Rubin |
| 7,050,977 B1 | 5/2006 | Bennett |
| 7,069,560 B1 | 6/2006 | Cheyer et al. |
| 7,076,430 B1 | 7/2006 | Cosatto et al. |
| 7,092,928 B1 | 8/2006 | Elad et al. |
| 7,115,393 B2 | 10/2006 | Shu et al. |
| 7,127,497 B2 | 10/2006 | Nonaka |
| 7,136,710 B1 | 11/2006 | Hoffberg et al. |
| 7,139,714 B2 | 11/2006 | Bennett et al. |
| 7,177,798 B2 | 2/2007 | Hsu et al. |
| 7,203,646 B2 | 4/2007 | Bennett |
| 7,206,303 B2 | 4/2007 | Karas et al. |
| 7,222,075 B2 | 5/2007 | Petrushin |
| 7,224,790 B1 | 5/2007 | Bushey et al. |
| 7,225,125 B2 | 5/2007 | Bennett et al. |
| 7,225,128 B2 | 5/2007 | Kim et al. |
| 7,240,011 B2 | 7/2007 | Horvitz |
| 7,249,117 B2 | 7/2007 | Estes |
| 7,253,817 B1 | 8/2007 | Plantec et al. |
| 7,269,568 B2 | 9/2007 | Stiles et al. |
| 7,277,854 B2 | 10/2007 | Bennett et al. |
| 7,292,979 B2 | 11/2007 | Karas et al. |
| 7,305,345 B2 | 12/2007 | Bares et al. |
| 7,306,560 B2 | 12/2007 | Iliff |
| 7,316,000 B2 | 1/2008 | Poole et al. |
| 7,330,787 B2 | 2/2008 | Agrawala et al. |
| 7,333,967 B1 | 2/2008 | Bringsjord et al. |
| 7,343,303 B2 | 3/2008 | Meyer et al. |
| 7,349,852 B2 | 3/2008 | Cosatto et al. |
| 7,353,177 B2 | 4/2008 | Cosatto et al. |
| 7,376,556 B2 | 5/2008 | Bennett |
| 7,376,632 B1 | 5/2008 | Sadek et al. |
| 7,379,071 B2 | 5/2008 | Liu et al. |
| 7,391,421 B2 | 6/2008 | Guo et al. |
| 7,392,185 B2 | 6/2008 | Bennett |
| 7,398,211 B2 | 7/2008 | Wang |
| 7,433,876 B2 | 10/2008 | Spivack et al. |
| 7,437,279 B2 | 10/2008 | Agrawala et al. |
| 7,451,005 B2 | 11/2008 | Hoffberg et al. |
| 7,478,047 B2 | 1/2009 | Loyall et al. |
| 7,480,546 B2 | 1/2009 | Kamdar et al. |
| 7,496,484 B2 | 2/2009 | Agrawala et al. |
| 7,502,730 B2 | 3/2009 | Wang |
| 7,505,921 B1 | 3/2009 | Lukas et al. |
| 7,536,323 B2 | 5/2009 | Hsieh |
| 7,539,676 B2 | 5/2009 | Aravamudan et al. |
| 7,542,882 B2 | 6/2009 | Agrawala et al. |
| 7,542,902 B2 | 6/2009 | Scahill et al. |
| 7,555,431 B2 | 6/2009 | Bennett |
| 7,555,448 B2 | 6/2009 | Hsieh |
| 7,574,332 B2 | 8/2009 | Ballin et al. |
| 7,580,908 B1 | 8/2009 | Horvitz et al. |
| 7,610,556 B2 | 10/2009 | Guo et al. |
| 7,613,663 B1 | 11/2009 | Commons et al. |
| 7,624,007 B2 | 11/2009 | Bennett |
| 7,624,076 B2 | 11/2009 | Movellan et al. |
| 7,627,475 B2 | 12/2009 | Petrushin |
| 7,631,032 B1 | 12/2009 | Refuah et al. |
| 7,631,317 B2 | 12/2009 | Caron |
| 7,643,985 B2 | 1/2010 | Horvitz |
| 7,647,225 B2 | 1/2010 | Bennett et al. |
| 7,657,424 B2 | 2/2010 | Bennett |
| 7,657,434 B2 | 2/2010 | Thompson et al. |

(56) References Cited

U.S. PATENT DOCUMENTS

| | | |
|---|---|---|
| 7,672,841 B2 | 3/2010 | Bennett |
| 7,672,846 B2 | 3/2010 | Washio et al. |
| 7,672,847 B2 | 3/2010 | He et al. |
| 7,676,034 B1 | 3/2010 | Wu et al. |
| 7,676,363 B2 | 3/2010 | Chengalvarayan et al. |
| 7,680,514 B2 | 3/2010 | Cook et al. |
| 7,680,658 B2 | 3/2010 | Chung et al. |
| 7,680,661 B2 | 3/2010 | Co et al. |
| 7,680,662 B2 | 3/2010 | Shu et al. |
| 7,680,663 B2 | 3/2010 | Deng |
| 7,680,666 B2 | 3/2010 | Manabe et al. |
| 7,680,667 B2 | 3/2010 | Sonoura et al. |
| 7,684,556 B1 | 3/2010 | Jaiswal |
| 7,684,983 B2 | 3/2010 | Shikano et al. |
| 7,684,998 B1 | 3/2010 | Charles |
| 7,685,252 B1 | 3/2010 | Maes et al. |
| 7,689,404 B2 | 3/2010 | Khasin |
| 7,689,415 B1 | 3/2010 | Jochumson |
| 7,689,420 B2 | 3/2010 | Paek et al. |
| 7,689,424 B2 | 3/2010 | Monne et al. |
| 7,689,425 B2 | 3/2010 | Kim et al. |
| 7,693,717 B2 | 4/2010 | Kahn et al. |
| 7,693,718 B2 | 4/2010 | Jan et al. |
| 7,698,131 B2 | 4/2010 | Bennett |
| 7,698,136 B1 | 4/2010 | Nguyen et al. |
| 7,698,137 B2 | 4/2010 | Kashima et al. |
| 7,702,505 B2 | 4/2010 | Jung |
| 7,702,508 B2 | 4/2010 | Bennett |
| 7,702,512 B2 | 4/2010 | Gopinath et al. |
| 7,702,665 B2 | 4/2010 | Huet et al. |
| 7,707,029 B2 | 4/2010 | Seltzer et al. |
| 7,711,103 B2 | 5/2010 | Culbertson et al. |
| 7,711,559 B2 | 5/2010 | Kuboyama et al. |
| 7,711,560 B2 | 5/2010 | Yamada et al. |
| 7,711,569 B2 | 5/2010 | Takeuchi et al. |
| 7,711,571 B2 | 5/2010 | Heiner et al. |
| 7,716,066 B2 | 5/2010 | Rosow et al. |
| 7,720,695 B2 | 5/2010 | Rosow et al. |
| 7,720,784 B1 | 5/2010 | Froloff |
| 7,725,307 B2 | 5/2010 | Bennett |
| 7,725,320 B2 | 5/2010 | Bennett |
| 7,725,321 B2 | 5/2010 | Bennett |
| 7,729,904 B2 | 6/2010 | Bennett |
| 7,734,479 B2 | 6/2010 | Rosow et al. |
| 7,747,785 B2 | 6/2010 | Baker, III et al. |
| 7,751,285 B1 | 7/2010 | Cain |
| 7,752,152 B2 | 7/2010 | Paek et al. |
| 7,756,723 B2 | 7/2010 | Rosow et al. |
| 7,762,665 B2 | 7/2010 | Vertegaal et al. |
| 7,769,809 B2 | 8/2010 | Samdadiya et al. |
| 7,774,215 B2 | 8/2010 | Rosow et al. |
| 7,775,885 B2 | 8/2010 | Van Luchene et al. |
| 7,778,632 B2 | 8/2010 | Kurlander et al. |
| 7,778,948 B2 | 8/2010 | Johnson et al. |
| 7,813,822 B1 | 10/2010 | Hoffberg |
| 7,814,048 B2 | 10/2010 | Zhou et al. |
| 7,831,426 B2 | 11/2010 | Bennett |
| 7,844,467 B1 | 11/2010 | Cosatto et al. |
| 7,849,034 B2 | 12/2010 | Visel |
| 7,855,977 B2 | 12/2010 | Morrison et al. |
| 7,860,921 B2 | 12/2010 | Murrell et al. |
| 7,873,519 B2 | 1/2011 | Bennett |
| 7,873,654 B2 | 1/2011 | Bernard |
| 7,877,349 B2 | 1/2011 | Huet et al. |
| 7,882,055 B2 | 2/2011 | Estes |
| 7,890,347 B2 | 2/2011 | Rosow et al. |
| 7,904,187 B2 | 3/2011 | Hoffberg et al. |
| 7,912,702 B2 | 3/2011 | Bennett |
| 7,925,743 B2 | 4/2011 | Neely et al. |
| 7,940,914 B2 | 5/2011 | Petrushin |
| 7,941,536 B2 | 5/2011 | Murrell et al. |
| 7,941,540 B2 | 5/2011 | Murrell et al. |
| 7,949,552 B2 | 5/2011 | Korenblit et al. |
| 7,953,219 B2 | 5/2011 | Freedman et al. |
| 7,953,610 B2 | 5/2011 | Rosow et al. |
| 7,962,578 B2 | 6/2011 | Makar et al. |
| 7,966,078 B2 | 6/2011 | Hoffberg et al. |
| 7,970,664 B2 | 6/2011 | Linden et al. |
| 7,974,714 B2 | 7/2011 | Hoffberg |
| 7,983,411 B2 | 7/2011 | Huet et al. |
| 7,987,003 B2 | 7/2011 | Hoffberg et al. |
| 7,991,649 B2 | 8/2011 | Libman |
| 7,991,770 B2 | 8/2011 | Covell et al. |
| 8,001,067 B2 | 8/2011 | Visel et al. |
| 8,005,720 B2 | 8/2011 | King et al. |
| 8,015,138 B2 | 9/2011 | Iliff |
| 8,015,143 B2 | 9/2011 | Estes |
| 8,019,648 B2 | 9/2011 | King et al. |
| 8,022,831 B1 | 9/2011 | Wood-Eyre |
| 8,027,839 B2 | 9/2011 | Da Palma et al. |
| 8,027,945 B1 | 9/2011 | Elad et al. |
| 8,031,060 B2 | 10/2011 | Hoffberg et al. |
| 8,032,375 B2 | 10/2011 | Chickering et al. |
| 8,037,125 B2 | 10/2011 | Murrell et al. |
| 8,041,570 B2 | 10/2011 | Mirkovic et al. |
| 8,046,313 B2 | 10/2011 | Hoffberg et al. |
| 8,063,929 B2 | 11/2011 | Kurtz et al. |
| 8,069,131 B1 | 11/2011 | Luechtefeld et al. |
| 8,082,353 B2 | 12/2011 | Huber et al. |
| 8,094,551 B2 | 1/2012 | Huber et al. |
| 8,096,660 B2 | 1/2012 | Vertegaal et al. |
| 8,121,618 B2 | 2/2012 | Rhoads et al. |
| 8,121,653 B2 | 2/2012 | Marti et al. |
| 8,135,128 B2 | 3/2012 | Marti et al. |
| 8,135,472 B2 | 3/2012 | Fowler et al. |
| 8,150,872 B2 | 4/2012 | Bernard |
| 8,154,578 B2 | 4/2012 | Kurtz et al. |
| 8,154,583 B2 | 4/2012 | Kurtz et al. |
| 8,156,054 B2 | 4/2012 | Donovan et al. |
| 8,156,060 B2 | 4/2012 | Borzestowski et al. |
| 8,159,519 B2 | 4/2012 | Kurtz et al. |
| 8,165,916 B2 | 4/2012 | Hoffberg et al. |
| RE43,433 E | 5/2012 | Iliff |
| 8,167,826 B2 | 5/2012 | Oohashi et al. |
| 8,175,617 B2 | 5/2012 | Rodriguez |
| 8,195,430 B2 | 6/2012 | Lawler et al. |
| 8,200,493 B1 | 6/2012 | Cosatto et al. |
| 8,204,182 B2 | 6/2012 | Da Palma et al. |
| 8,204,884 B2 | 6/2012 | Freedman et al. |
| RE43,548 E | 7/2012 | Iliff |
| 8,214,214 B2 | 7/2012 | Bennett |
| 8,224,906 B2 | 7/2012 | Mikkonen et al. |
| 8,229,734 B2 | 7/2012 | Bennett |
| 8,234,184 B2 | 7/2012 | Libman |
| 8,237,771 B2 | 8/2012 | Kurtz et al. |
| 8,239,204 B2 | 8/2012 | Da Palma et al. |
| 8,239,335 B2 | 8/2012 | Schmidtler et al. |
| 8,243,893 B2 | 8/2012 | Hayes, Jr. et al. |
| 8,249,886 B2 | 8/2012 | Meyer et al. |
| 8,253,770 B2 | 8/2012 | Kurtz et al. |
| 8,260,920 B2 | 9/2012 | Murrell et al. |
| 8,262,714 B2 | 9/2012 | Hulvershorn et al. |
| 8,274,544 B2 | 9/2012 | Kurtz et al. |
| 8,275,117 B2 | 9/2012 | Huet et al. |
| 8,275,546 B2 | 9/2012 | Xiao et al. |
| 8,275,796 B2 | 9/2012 | Spivack et al. |
| 8,281,246 B2 | 10/2012 | Xiao et al. |
| 8,285,652 B2 | 10/2012 | Biggs et al. |
| 8,289,283 B2 | 10/2012 | Kida et al. |
| 8,291,319 B2 | 10/2012 | Li et al. |
| 8,292,433 B2 | 10/2012 | Vertegaal |
| 8,296,383 B2 | 10/2012 | Lindahl |
| 8,311,838 B2 | 11/2012 | Lindahl et al. |
| 8,311,863 B1 | 11/2012 | Kemp |
| 8,322,856 B2 | 12/2012 | Vertegaal et al. |
| 8,326,690 B2 | 12/2012 | Dicker et al. |
| 8,331,228 B2 | 12/2012 | Huber et al. |
| 8,345,665 B2 | 1/2013 | Vieri et al. |
| 8,346,563 B1 | 1/2013 | Hjelm et al. |
| 8,346,800 B2 | 1/2013 | Szummer et al. |
| 8,352,268 B2 | 1/2013 | Naik et al. |
| 8,352,272 B2 | 1/2013 | Rogers et al. |
| 8,352,277 B2 | 1/2013 | Bennett |
| 8,352,388 B2 | 1/2013 | Estes |

(56) References Cited

U.S. PATENT DOCUMENTS

| | | |
|---|---|---|
| 8,355,919 B2 | 1/2013 | Silverman et al. |
| 8,364,136 B2 | 1/2013 | Hoffberg et al. |
| 8,364,694 B2 | 1/2013 | Volkert |
| 8,369,967 B2 | 2/2013 | Hoffberg et al. |
| 8,370,203 B2 | 2/2013 | Dicker et al. |
| 8,380,503 B2 | 2/2013 | Gross |
| 8,380,507 B2 | 2/2013 | Herman et al. |
| 8,385,971 B2 | 2/2013 | Rhoads et al. |
| 8,386,482 B2 | 2/2013 | Gopalakrishnan |
| 8,396,714 B2 | 3/2013 | Rogers et al. |
| 8,401,527 B2 | 3/2013 | Weltlinger |
| 8,407,105 B2 | 3/2013 | Linden et al. |
| 8,411,700 B2 | 4/2013 | Mani |
| 8,422,994 B2 | 4/2013 | Rhoads et al. |
| 8,428,908 B2 | 4/2013 | Lawler et al. |
| 8,433,621 B2 | 4/2013 | Linden et al. |
| 8,442,125 B2 | 5/2013 | Covell et al. |
| 8,452,859 B2 | 5/2013 | Long et al. |
| 8,457,959 B2 | 6/2013 | Kaiser |
| 8,457,967 B2 | 6/2013 | Audhkhasi et al. |
| 8,458,052 B2 | 6/2013 | Libman |
| 8,458,278 B2 | 6/2013 | Christie et al. |
| 8,463,726 B2 | 6/2013 | Jerram et al. |
| 8,464,159 B2 | 6/2013 | Refuah et al. |
| 8,473,420 B2 | 6/2013 | Bohus et al. |
| 8,473,449 B2 | 6/2013 | Visel |
| 8,479,225 B2 | 7/2013 | Covell et al. |
| 8,489,115 B2 | 7/2013 | Rodriguez et al. |
| 8,489,399 B2 | 7/2013 | Gross |
| 8,489,769 B2 | 7/2013 | Chuah |
| 8,494,854 B2 | 7/2013 | Gross |
| 8,510,801 B2 | 8/2013 | Majmundar et al. |
| 8,516,266 B2 | 8/2013 | Hoffberg et al. |
| 8,522,312 B2 | 8/2013 | Huber et al. |
| 8,527,861 B2 | 9/2013 | Mercer |
| 8,553,849 B2 | 10/2013 | Michaelis et al. |
| 8,566,097 B2 | 10/2013 | Nakano et al. |
| 8,566,413 B2 | 10/2013 | Horvitz |
| 8,572,076 B2 | 10/2013 | Xiao et al. |
| 8,574,075 B2 | 11/2013 | Dickins et al. |
| 8,583,263 B2 | 11/2013 | Hoffberg et al. |
| 8,583,418 B2 | 11/2013 | Silverman et al. |
| 8,586,360 B2 | 11/2013 | Abbot et al. |
| 8,600,743 B2 | 12/2013 | Lindahl et al. |
| 8,600,941 B1 | 12/2013 | Raj et al. |
| 8,602,794 B2 | 12/2013 | Cohen |
| 8,612,603 B2 | 12/2013 | Murrell et al. |
| 8,614,431 B2 | 12/2013 | Huppi et al. |
| 8,620,662 B2 | 12/2013 | Bellegarda |
| 8,620,767 B2 | 12/2013 | Linden et al. |
| 8,638,908 B2 | 1/2014 | Leeds et al. |
| 8,639,516 B2 | 1/2014 | Lindahl et al. |
| 8,639,638 B2 | 1/2014 | Shae et al. |
| 8,639,716 B2 | 1/2014 | Volkert |
| 8,645,137 B2 | 2/2014 | Bellegarda et al. |
| 8,649,500 B1 | 2/2014 | Cohen et al. |
| 8,654,940 B2 | 2/2014 | Da Palma et al. |
| 8,660,355 B2 | 2/2014 | Rodriguez et al. |
| 8,660,849 B2 | 2/2014 | Gruber et al. |
| 8,666,928 B2 | 3/2014 | Tunstall-Pedoe |
| 8,670,979 B2 | 3/2014 | Gruber et al. |
| 8,670,985 B2 | 3/2014 | Lindahl et al. |
| 8,672,482 B2 | 3/2014 | Vertegaal et al. |
| 8,676,565 B2 | 3/2014 | Larcheveque et al. |
| 8,676,807 B2 | 3/2014 | Xiao et al. |
| 8,676,904 B2 | 3/2014 | Lindahl |
| 8,677,377 B2 | 3/2014 | Cheyer et al. |
| 8,682,649 B2 | 3/2014 | Bellegarda |
| 8,682,667 B2 | 3/2014 | Haughay |
| 8,688,446 B2 | 4/2014 | Yanagihara |
| 8,694,304 B2 | 4/2014 | Larcheveque et al. |
| 8,696,364 B2 | 4/2014 | Cohen |
| 8,700,428 B2 | 4/2014 | Rosow et al. |
| 8,700,641 B2 | 4/2014 | Covell et al. |
| 8,702,432 B2 | 4/2014 | Cohen |
| 8,702,433 B2 | 4/2014 | Cohen |
| 8,706,472 B2 | 4/2014 | Ramerth et al. |
| 8,706,503 B2 | 4/2014 | Cheyer et al. |
| 8,712,776 B2 | 4/2014 | Bellegarda et al. |
| 8,713,021 B2 | 4/2014 | Bellegarda |
| 8,713,119 B2 | 4/2014 | Lindahl |
| 8,714,987 B2 | 5/2014 | Cohen |
| 8,718,047 B2 | 5/2014 | Vieri et al. |
| 8,719,006 B2 | 5/2014 | Bellegarda |
| 8,719,014 B2 | 5/2014 | Wagner |
| 8,719,114 B2 | 5/2014 | Libman |
| 8,719,197 B2 | 5/2014 | Schmidtler et al. |
| 8,719,200 B2 | 5/2014 | Beilby et al. |
| 8,719,318 B2 | 5/2014 | Tunstall-Pedoe |
| 8,731,942 B2 | 5/2014 | Cheyer et al. |
| 8,737,986 B2 | 5/2014 | Rhoads et al. |
| 8,744,850 B2 | 6/2014 | Gross |
| 8,750,098 B2 | 6/2014 | Fan et al. |
| 8,751,238 B2 | 6/2014 | James et al. |
| 8,751,428 B2 | 6/2014 | Jerram et al. |
| 8,755,837 B2 | 6/2014 | Rhoads et al. |
| 8,762,152 B2 | 6/2014 | Bennett et al. |
| 8,762,156 B2 | 6/2014 | Chen |
| 8,762,316 B2 | 6/2014 | Jerram et al. |
| 8,762,469 B2 | 6/2014 | Lindahl |
| 8,768,313 B2 | 7/2014 | Rodriguez |
| 8,768,702 B2 | 7/2014 | Mason et al. |
| 8,768,934 B2 | 7/2014 | Jones et al. |
| 8,775,195 B2 | 7/2014 | Stiles et al. |
| 8,775,442 B2 | 7/2014 | Moore et al. |
| 8,781,836 B2 | 7/2014 | Foo et al. |
| 8,782,069 B2 | 7/2014 | Jockish et al. |
| 8,792,419 B2 | 7/2014 | Wohlert et al. |
| 8,799,000 B2 | 8/2014 | Guzzoni et al. |
| 8,805,110 B2 | 8/2014 | Rhoads et al. |
| 8,805,698 B2 | 8/2014 | Stiles et al. |
| 8,812,171 B2 | 8/2014 | Filev et al. |
| 8,812,294 B2 | 8/2014 | Kalb et al. |
| 8,831,205 B1 | 9/2014 | Wu et al. |
| 8,838,659 B2 | 9/2014 | Tunstall-Pedoe |
| 8,849,259 B2 | 9/2014 | Rhoads et al. |
| 8,850,048 B2 | 9/2014 | Huber et al. |
| 8,855,375 B2 | 10/2014 | Macciola et al. |
| 8,855,712 B2 | 10/2014 | Lord et al. |
| 8,856,878 B2 | 10/2014 | Wohlert et al. |
| 8,862,252 B2 | 10/2014 | Rottler et al. |
| 8,863,198 B2 | 10/2014 | Sirpal et al. |
| 8,873,813 B2 | 10/2014 | Tadayon et al. |
| 8,874,447 B2 | 10/2014 | Da Palma et al. |
| 8,879,120 B2 | 11/2014 | Thrasher et al. |
| 8,885,229 B1 | 11/2014 | Amtrup et al. |
| 8,886,206 B2 | 11/2014 | Lord et al. |
| 8,886,222 B1 | 11/2014 | Rodriguez et al. |
| 8,892,419 B2 | 11/2014 | Lundberg et al. |
| 8,892,446 B2 | 11/2014 | Cheyer et al. |
| 8,897,437 B1 | 11/2014 | Tan et al. |
| 8,898,098 B1 | 11/2014 | Luechtefeld |
| 8,898,568 B2 | 11/2014 | Bull et al. |
| 8,903,711 B2 | 12/2014 | Lundberg et al. |
| 8,903,716 B2 | 12/2014 | Chen et al. |
| 8,908,003 B2 | 12/2014 | Raffle et al. |
| 8,929,877 B2 | 1/2015 | Rhoads et al. |
| 8,930,191 B2 | 1/2015 | Gruber et al. |
| 8,934,617 B2 | 1/2015 | Haserodt et al. |
| 8,935,167 B2 | 1/2015 | Bellegarda |
| 8,942,849 B2 | 1/2015 | Maisonnier et al. |
| 8,942,986 B2 | 1/2015 | Cheyer et al. |
| 8,943,089 B2 | 1/2015 | Volkert |
| 8,948,372 B1 | 2/2015 | Beall et al. |
| 8,949,126 B2 | 2/2015 | Gross |
| 8,949,377 B2 | 2/2015 | Makar et al. |
| 8,958,605 B2 | 2/2015 | Amtrup et al. |
| 8,959,082 B2 | 2/2015 | Davis et al. |
| 8,963,916 B2 | 2/2015 | Reitan |
| 8,965,770 B2 | 2/2015 | Petrushin |
| 8,971,587 B2 | 3/2015 | Macciola et al. |
| 8,972,313 B2 | 3/2015 | Ahn et al. |
| 8,972,445 B2 | 3/2015 | Gorman et al. |
| 8,972,840 B2 | 3/2015 | Karas et al. |

(56) References Cited

U.S. PATENT DOCUMENTS

| | | |
|---|---|---|
| 8,977,255 B2 | 3/2015 | Freeman et al. |
| 8,977,293 B2 | 3/2015 | Rodriguez et al. |
| 8,977,584 B2 | 3/2015 | Jerram et al. |
| 8,977,632 B2 | 3/2015 | Xiao et al. |
| 8,989,515 B2 | 3/2015 | Shustorovich et al. |
| 8,990,235 B2 | 3/2015 | King et al. |
| 8,992,227 B2 | 3/2015 | Al Bandar et al. |
| 8,995,972 B1 | 3/2015 | Cronin |
| 8,996,376 B2 | 3/2015 | Fleizach et al. |
| 8,996,429 B1 | 3/2015 | Francis, Jr. et al. |
| 9,005,119 B2 | 4/2015 | Iliff |
| 9,008,724 B2 | 4/2015 | Lord |
| 9,019,819 B2 | 4/2015 | Huber et al. |
| 9,020,487 B2 | 4/2015 | Brisebois et al. |
| 9,021,517 B2 | 4/2015 | Selim |
| 9,026,660 B2 | 5/2015 | Murrell et al. |
| 9,031,838 B1 | 5/2015 | Nash et al. |
| 9,053,089 B2 | 6/2015 | Bellegarda |
| 9,055,254 B2 | 6/2015 | Selim |
| 9,055,255 B2 | 6/2015 | Burdzinski et al. |
| 9,058,515 B1 | 6/2015 | Amtrup et al. |
| 9,058,580 B1 | 6/2015 | Amtrup et al. |
| 9,060,152 B2 | 6/2015 | Sirpal et al. |
| 9,064,006 B2 | 6/2015 | Hakkani-Tur et al. |
| 9,064,211 B2 | 6/2015 | Visel |
| 9,066,040 B2 | 6/2015 | Selim et al. |
| 9,070,087 B2 | 6/2015 | Hatami-Hanza |
| 9,070,156 B2 | 6/2015 | Linden et al. |
| 9,075,783 B2 | 7/2015 | Wagner |
| 9,075,977 B2 | 7/2015 | Gross |
| 9,076,448 B2 | 7/2015 | Bennett et al. |
| 9,077,928 B2 | 7/2015 | Milano et al. |
| 9,081,411 B2 | 7/2015 | Kalns et al. |
| 9,085,303 B2 | 7/2015 | Wolverton et al. |
| 9,098,492 B2 | 8/2015 | Tunstall-Pedoe |
| 9,100,402 B2 | 8/2015 | Lawler et al. |
| 9,100,481 B2 | 8/2015 | O'Connor et al. |
| 9,104,670 B2 | 8/2015 | Wadycki et al. |
| 9,106,866 B2 | 8/2015 | de Paz et al. |
| 9,110,882 B2 | 8/2015 | Overell et al. |
| 9,117,447 B2 | 8/2015 | Gruber et al. |
| 9,118,771 B2 | 8/2015 | Rodriguez |
| 9,118,864 B2 | 8/2015 | Sirpal et al. |
| 9,118,967 B2 | 8/2015 | Sirpal et al. |
| 9,131,053 B1 | 9/2015 | Tan et al. |
| 9,137,417 B2 | 9/2015 | Macciola et al. |
| 9,141,926 B2 | 9/2015 | Kilby et al. |
| 9,142,217 B2 | 9/2015 | Miglietta et al. |
| 9,154,626 B2 | 10/2015 | Uba et al. |
| 9,158,841 B2 | 10/2015 | Hu et al. |
| 9,158,967 B2 | 10/2015 | Shustorovich et al. |
| 9,161,080 B2 | 10/2015 | Crowe et al. |
| 9,165,187 B2 | 10/2015 | Macciola et al. |
| 9,165,188 B2 | 10/2015 | Thrasher et al. |
| 9,167,186 B2 | 10/2015 | Csiki |
| 9,167,187 B2 | 10/2015 | Dourado et al. |
| 9,172,896 B2 | 10/2015 | de Paz et al. |
| 9,177,257 B2 | 11/2015 | Kozloski et al. |
| 9,177,318 B2 | 11/2015 | Shen et al. |
| 9,183,560 B2 | 11/2015 | Abelow |
| 9,185,323 B2 | 11/2015 | Sirpal |
| 9,185,324 B2 | 11/2015 | Shoykher et al. |
| 9,185,325 B2 | 11/2015 | Selim |
| 9,189,479 B2 | 11/2015 | Spivack et al. |
| 9,189,742 B2 | 11/2015 | London |
| 9,189,749 B2 | 11/2015 | Estes |
| 9,189,879 B2 | 11/2015 | Filev et al. |
| 9,190,062 B2 | 11/2015 | Haughay |
| 9,190,063 B2 | 11/2015 | Bennett et al. |
| 9,190,075 B1 | 11/2015 | Cronin |
| 9,191,604 B2 | 11/2015 | de Paz et al. |
| 9,191,708 B2 | 11/2015 | Soto et al. |
| 9,196,245 B2 | 11/2015 | Larcheveque et al. |
| 9,197,736 B2 | 11/2015 | Davis et al. |
| 9,202,171 B2 | 12/2015 | Kuhn |
| 9,204,038 B2 | 12/2015 | Lord et al. |
| 9,208,536 B2 | 12/2015 | Macciola et al. |
| 9,213,936 B2 | 12/2015 | Visel |
| 9,213,940 B2 | 12/2015 | Beilby et al. |
| 9,215,393 B2 | 12/2015 | Voth |
| 9,223,776 B2 | 12/2015 | Bernard |
| 9,232,064 B1 | 1/2016 | Skiba et al. |
| 9,232,168 B2 | 1/2016 | Sirpal |
| 9,234,744 B2 | 1/2016 | Rhoads et al. |
| 9,237,291 B2 | 1/2016 | Selim |
| 9,239,951 B2 | 1/2016 | Hoffberg et al. |
| 9,244,894 B1 | 1/2016 | Dale et al. |
| 9,244,984 B2 | 1/2016 | Heck et al. |
| 9,247,174 B2 | 1/2016 | Sirpal et al. |
| 9,248,172 B2 | 2/2016 | Srivastava et al. |
| 9,253,349 B2 | 2/2016 | Amtrup et al. |
| 9,255,248 B2 | 2/2016 | Abbot et al. |
| 9,256,806 B2 | 2/2016 | Aller et al. |
| 9,258,421 B2 | 2/2016 | Matula et al. |
| 9,258,423 B1 | 2/2016 | Beall et al. |
| 9,262,612 B2 | 2/2016 | Cheyer |
| 9,264,503 B2 | 2/2016 | Donovan et al. |
| 9,264,775 B2 | 2/2016 | Milano |
| 9,268,852 B2 | 2/2016 | King et al. |
| 9,271,039 B2 | 2/2016 | Sirpal et al. |
| 9,271,133 B2 | 2/2016 | Rodriguez |
| 9,274,595 B2 | 3/2016 | Reitan |
| 9,275,042 B2 | 3/2016 | Larcheveque et al. |
| 9,275,341 B2 | 3/2016 | Cruse et al. |
| 9,275,641 B1 | 3/2016 | Gelfenbeyn et al. |
| 9,280,610 B2 | 3/2016 | Gruber et al. |
| 9,292,254 B2 | 3/2016 | Simpson et al. |
| 9,292,952 B2 | 3/2016 | Giuli et al. |
| 9,298,287 B2 | 3/2016 | Heck et al. |
| 9,299,268 B2 | 3/2016 | Aravkin et al. |
| 9,300,784 B2 | 3/2016 | Roberts et al. |
| 9,301,003 B2 | 3/2016 | Soto et al. |
| 9,305,101 B2 | 4/2016 | Volkert |
| 9,311,043 B2 | 4/2016 | Rottler et al. |
| 9,311,531 B2 | 4/2016 | Amtrup et al. |
| 9,318,108 B2 | 4/2016 | Gruber et al. |
| 9,319,964 B2 | 4/2016 | Huber et al. |
| 9,323,784 B2 | 4/2016 | King et al. |
| 9,330,381 B2 | 5/2016 | Anzures et al. |
| 9,330,720 B2 | 5/2016 | Lee |
| 9,335,904 B2 | 5/2016 | Junqua et al. |
| 9,336,302 B1 | 5/2016 | Swamy |
| 9,338,493 B2 | 5/2016 | Van Os et al. |
| 9,342,742 B2 | 5/2016 | Amtrup et al. |
| 9,349,100 B2 | 5/2016 | Kozloski et al. |
| 9,355,312 B2 | 5/2016 | Amtrup et al. |
| 9,361,886 B2 | 6/2016 | Yanagihara |
| 9,363,457 B2 | 6/2016 | Dourado |
| 9,367,490 B2 | 6/2016 | Huang et al. |
| 9,368,114 B2 | 6/2016 | Larson et al. |
| 9,369,578 B2 | 6/2016 | Michaelis et al. |
| 9,369,654 B2 | 6/2016 | Shoykher et al. |
| 9,374,468 B2 | 6/2016 | George |
| 9,374,546 B2 | 6/2016 | Milano |
| 9,378,202 B2 | 6/2016 | Larcheveque et al. |
| 9,380,017 B2 | 6/2016 | Gelfenbeyn et al. |
| 9,380,334 B2 | 6/2016 | Selim et al. |
| 9,384,334 B2 | 7/2016 | Burba et al. |
| 9,384,335 B2 | 7/2016 | Hunt et al. |
| 9,389,729 B2 | 7/2016 | Huppi et al. |
| 9,392,461 B2 | 7/2016 | Huber et al. |
| 9,396,388 B2 | 7/2016 | Amtrup et al. |
| 9,412,392 B2 | 8/2016 | Lindahl |
| 9,413,835 B2 | 8/2016 | Chen et al. |
| 9,413,836 B2 | 8/2016 | Wohlert et al. |
| 9,413,868 B2 | 8/2016 | Cronin |
| 9,413,891 B2 | 8/2016 | Dwyer et al. |
| 9,414,108 B2 | 8/2016 | Sirpal et al. |
| 9,418,663 B2 | 8/2016 | Chen et al. |
| 9,424,861 B2 | 8/2016 | Jerram et al. |
| 9,424,862 B2 | 8/2016 | Jerram et al. |
| 9,426,515 B2 | 8/2016 | Sirpal |
| 9,426,527 B2 | 8/2016 | Selim et al. |
| 9,430,463 B2 | 8/2016 | Futrell et al. |

(56) References Cited

U.S. PATENT DOCUMENTS

| | | |
|---|---|---|
| 9,430,570 B2 | 8/2016 | Button et al. |
| 9,430,667 B2 | 8/2016 | Burba et al. |
| 9,431,006 B2 | 8/2016 | Bellegarda |
| 9,431,028 B2 | 8/2016 | Jerram et al. |
| 9,432,742 B2 | 8/2016 | Sirpal et al. |
| 9,432,908 B2 | 8/2016 | Wohlert et al. |
| RE46,139 E | 9/2016 | Kida et al. |
| 9,444,924 B2 | 9/2016 | Rodriguez et al. |
| 9,450,901 B1 | 9/2016 | Smullen et al. |
| 9,454,760 B2 | 9/2016 | Klemm et al. |
| 9,454,962 B2 | 9/2016 | Tur et al. |
| 9,456,086 B1 | 9/2016 | Wu et al. |
| 9,462,107 B2 | 10/2016 | Rhoads et al. |
| 9,474,076 B2 | 10/2016 | Fan et al. |
| 9,477,625 B2 | 10/2016 | Huang et al. |
| 9,483,461 B2 | 11/2016 | Fleizach et al. |
| 9,483,794 B2 | 11/2016 | Amtrup et al. |
| 9,489,039 B2 | 11/2016 | Donovan et al. |
| 9,489,625 B2 | 11/2016 | Kalns et al. |
| 9,489,679 B2 | 11/2016 | Mays |
| 9,489,854 B2 | 11/2016 | Haruta et al. |
| 9,491,293 B2 | 11/2016 | Matula et al. |
| 9,491,295 B2 | 11/2016 | Shaffer et al. |
| 9,495,129 B2 | 11/2016 | Fleizach et al. |
| 9,495,331 B2 | 11/2016 | Govrin et al. |
| 9,495,787 B2 | 11/2016 | Gusikhin et al. |
| 9,501,666 B2 | 11/2016 | Lockett et al. |
| 9,501,741 B2 | 11/2016 | Cheyer et al. |
| 9,502,031 B2 | 11/2016 | Paulik et al. |
| 9,509,701 B2 | 11/2016 | Wohlert et al. |
| 9,509,799 B1 | 11/2016 | Cronin |
| 9,509,838 B2 | 11/2016 | Leeds et al. |
| 9,510,040 B2 | 11/2016 | Selim et al. |
| 9,514,357 B2 | 12/2016 | Macciola et al. |
| 9,514,748 B2 * | 12/2016 | Reddy ............ G10L 25/30 |
| 9,516,069 B2 | 12/2016 | Hymus et al. |
| 9,519,681 B2 | 12/2016 | Tunstall-Pedoe |
| 9,521,252 B2 | 12/2016 | Leeds et al. |
| 9,524,291 B2 | 12/2016 | Teodosiu et al. |
| 9,531,862 B1 | 12/2016 | Vadodaria |
| 9,535,563 B2 | 1/2017 | Hoffberg et al. |
| 9,535,906 B2 | 1/2017 | Lee et al. |
| 9,547,647 B2 | 1/2017 | Badaskar |
| 9,548,050 B2 | 1/2017 | Gruber et al. |
| 9,557,162 B2 | 1/2017 | Rodriguez et al. |
| 9,558,337 B2 | 1/2017 | Gross |
| RE46,310 E | 2/2017 | Hoffberg et al. |
| 9,565,512 B2 | 2/2017 | Rhoads et al. |
| 9,569,439 B2 | 2/2017 | Davis et al. |
| 9,571,651 B2 | 2/2017 | Hp et al. |
| 9,571,652 B1 | 2/2017 | Zeppenfeld et al. |
| 9,575,963 B2 | 2/2017 | Pasupalak et al. |
| 9,576,574 B2 | 2/2017 | van Os |
| 9,578,384 B2 | 2/2017 | Selim et al. |
| 9,582,608 B2 | 2/2017 | Bellegarda |
| 9,582,762 B1 | 2/2017 | Cosic |
| 9,584,984 B2 | 2/2017 | Huber et al. |
| 9,591,427 B1 | 3/2017 | Lyren et al. |
| 9,595,002 B2 | 3/2017 | Leeman-Munk et al. |
| 9,601,115 B2 | 3/2017 | Chen et al. |
| 9,606,986 B2 | 3/2017 | Bellegarda |
| 9,607,023 B1 | 3/2017 | Swamy |
| 9,607,046 B2 | 3/2017 | Hakkani-Tur et al. |
| 9,609,107 B2 | 3/2017 | Rodriguez et al. |
| 9,614,724 B2 | 4/2017 | Menezes et al. |
| 9,619,079 B2 | 4/2017 | Huppi et al. |
| 9,620,104 B2 | 4/2017 | Naik et al. |
| 9,620,105 B2 | 4/2017 | Mason |
| 9,621,669 B2 | 4/2017 | Crowe et al. |
| 9,626,152 B2 | 4/2017 | Kim et al. |
| 9,626,955 B2 | 4/2017 | Fleizach et al. |
| 9,633,004 B2 | 4/2017 | Giuli et al. |
| 9,633,660 B2 | 4/2017 | Haughay |
| 9,633,674 B2 | 4/2017 | Sinha |
| 9,634,855 B2 | 4/2017 | Poltorak |
| 9,640,180 B2 | 5/2017 | Chen et al. |
| 9,641,470 B2 | 5/2017 | Smullen et al. |
| 9,646,609 B2 | 5/2017 | Naik et al. |
| 9,646,614 B2 | 5/2017 | Bellegarda et al. |
| 9,647,968 B2 | 5/2017 | Smullen et al. |
| 9,653,068 B2 | 5/2017 | Gross |
| 9,654,634 B2 | 5/2017 | Fedorov et al. |
| 9,668,024 B2 | 5/2017 | Os et al. |
| 9,668,121 B2 | 5/2017 | Naik et al. |
| 9,672,467 B2 | 6/2017 | Gilbert |
| 9,679,495 B2 | 6/2017 | Cohen |
| 9,684,678 B2 | 6/2017 | Hatami-Hanza |
| 9,686,582 B2 | 6/2017 | Sirpal et al. |
| 9,691,383 B2 | 6/2017 | Mason et al. |
| 9,692,984 B2 | 6/2017 | Lord |
| 9,697,198 B2 | 7/2017 | Davis Jones et al. |
| 9,697,477 B2 | 7/2017 | Oh et al. |
| 9,697,820 B2 | 7/2017 | Jeon |
| 9,697,822 B1 | 7/2017 | Naik et al. |
| 9,697,823 B1 | 7/2017 | Kuo et al. |
| 9,697,835 B1 | 7/2017 | Kuo et al. |
| 9,704,097 B2 | 7/2017 | Devarajan et al. |
| 9,704,103 B2 | 7/2017 | Suskind et al. |
| 9,711,141 B2 | 7/2017 | Henton et al. |
| 9,715,875 B2 | 7/2017 | Piernot et al. |
| 9,721,257 B2 | 8/2017 | Navaratnam |
| 9,721,563 B2 | 8/2017 | Naik |
| 9,721,566 B2 | 8/2017 | Newendorp et al. |
| 9,722,957 B2 | 8/2017 | Dymetman et al. |
| 9,727,874 B2 | 8/2017 | Navaratnam |
| 9,733,821 B2 | 8/2017 | Fleizach |
| 9,734,046 B2 | 8/2017 | Karle et al. |
| 9,734,193 B2 | 8/2017 | Rhoten et al. |
| 9,736,308 B1 | 8/2017 | Wu et al. |
| 9,740,677 B2 | 8/2017 | Kim et al. |
| 9,749,766 B2 | 8/2017 | Lyren et al. |
| 9,760,559 B2 | 9/2017 | Dolfing et al. |
| 9,760,566 B2 | 9/2017 | Heck et al. |
| 9,774,918 B2 | 9/2017 | Sirpal et al. |
| 9,775,036 B2 | 9/2017 | Huber et al. |
| 9,785,630 B2 | 10/2017 | Willmore et al. |
| 9,785,891 B2 | 10/2017 | Agarwal et al. |
| 9,792,279 B2 | 10/2017 | Kim et al. |
| 9,792,903 B2 | 10/2017 | Kim et al. |
| 9,792,909 B2 | 10/2017 | Kim et al. |
| 9,798,393 B2 | 10/2017 | Neels et al. |
| 9,798,799 B2 | 10/2017 | Wolverton et al. |
| 9,802,125 B1 | 10/2017 | Suskind et al. |
| 9,805,020 B2 | 10/2017 | Gorman et al. |
| 9,805,309 B2 | 10/2017 | Donovan et al. |
| 9,807,446 B2 | 10/2017 | Sirpal et al. |
| 9,811,519 B2 | 11/2017 | Perez |
| 9,811,935 B2 | 11/2017 | Filev et al. |
| 9,812,127 B1 | 11/2017 | Perez et al. |
| 9,818,400 B2 | 11/2017 | Paulik et al. |
| 9,819,986 B2 | 11/2017 | Shoykher et al. |
| 9,820,003 B2 | 11/2017 | Milano et al. |
| 9,823,811 B2 | 11/2017 | Brown et al. |
| 9,830,039 B2 | 11/2017 | Stifelman et al. |
| 9,830,044 B2 | 11/2017 | Brown et al. |
| 9,836,453 B2 | 12/2017 | Radford et al. |
| 9,836,700 B2 | 12/2017 | Bohus et al. |
| 9,842,101 B2 | 12/2017 | Wang et al. |
| 9,842,105 B2 | 12/2017 | Bellegarda |
| 9,842,168 B2 | 12/2017 | Heck et al. |
| 9,848,271 B2 | 12/2017 | Lyren et al. |
| 9,852,136 B2 | 12/2017 | Venkataraman et al. |
| 9,854,049 B2 | 12/2017 | Kelly et al. |
| 9,858,343 B2 | 1/2018 | Heck et al. |
| 9,858,925 B2 | 1/2018 | Gruber et al. |
| 9,860,391 B1 | 1/2018 | Wu et al. |
| 9,865,248 B2 | 1/2018 | Fleizach et al. |
| 9,865,260 B1 | 1/2018 | Vuskovic et al. |
| 9,865,280 B2 | 1/2018 | Sumner et al. |
| 9,866,693 B2 | 1/2018 | Tamblyn et al. |
| 9,871,881 B2 | 1/2018 | Crowe et al. |
| 9,871,927 B2 | 1/2018 | Perez et al. |
| 9,874,914 B2 | 1/2018 | Obie et al. |
| 9,876,886 B1 | 1/2018 | McLaren et al. |

(56) References Cited

U.S. PATENT DOCUMENTS

| | | |
|---|---|---|
| 9,881,614 B1 | 1/2018 | Thirukovalluru et al. |
| 9,886,432 B2 | 2/2018 | Bellegarda et al. |
| 9,886,845 B2 | 2/2018 | Rhoads et al. |
| 9,886,953 B2 | 2/2018 | Lemay et al. |
| 9,888,105 B2 | 2/2018 | Rhoads |
| 9,899,019 B2 | 2/2018 | Bellegarda et al. |
| 9,904,370 B2 | 2/2018 | Selim et al. |
| 9,912,810 B2 | 3/2018 | Segre et al. |
| 9,913,130 B2 | 3/2018 | Brisebois et al. |
| 9,916,519 B2 | 3/2018 | Rodriguez et al. |
| 9,916,538 B2 | 3/2018 | Zadeh et al. |
| 9,918,183 B2 | 3/2018 | Rhoads et al. |
| 9,922,210 B2 | 3/2018 | Oberg et al. |
| 9,922,642 B2 | 3/2018 | Pitschel et al. |
| 9,927,879 B2 | 3/2018 | Sirpal et al. |
| 9,928,383 B2 | 3/2018 | York et al. |
| 9,929,982 B2 | 3/2018 | Morris et al. |
| 9,934,775 B2 | 4/2018 | Raitio et al. |
| 9,934,786 B2 | 4/2018 | Miglietta et al. |
| 9,940,390 B1 | 4/2018 | Seiber et al. |
| 9,942,783 B2 | 4/2018 | Fan et al. |
| 9,946,706 B2 | 4/2018 | Davidson et al. |
| 9,946,985 B2 | 4/2018 | Macciola et al. |
| 9,948,583 B2 | 4/2018 | Smullen et al. |
| 9,953,088 B2 | 4/2018 | Gruber et al. |
| 9,955,012 B2 | 4/2018 | Stolyar et al. |
| 9,956,393 B2 | 5/2018 | Perez et al. |
| 9,958,987 B2 | 5/2018 | Huppi et al. |
| 9,959,870 B2 | 5/2018 | Hunt et al. |
| 9,965,553 B2 | 5/2018 | Lyren |
| 9,965,748 B2 | 5/2018 | Chen et al. |
| 9,966,060 B2 | 5/2018 | Naik et al. |
| 9,966,065 B2 | 5/2018 | Gruber et al. |
| 9,966,068 B2 | 5/2018 | Cash et al. |
| 9,967,211 B2 | 5/2018 | Galley et al. |
| 9,967,799 B2 | 5/2018 | Wohlert et al. |
| 9,971,766 B2 | 5/2018 | Pasupalak et al. |
| 9,971,774 B2 | 5/2018 | Badaskar |
| 9,972,304 B2 | 5/2018 | Paulik et al. |
| 9,977,779 B2 | 5/2018 | Winer |
| 9,978,361 B2 | 5/2018 | Sarikaya et al. |
| 9,980,072 B2 | 5/2018 | Lyren et al. |
| 9,986,076 B1 | 5/2018 | McLaren et al. |
| 9,986,419 B2 | 5/2018 | Naik et al. |
| 9,996,532 B2 | 6/2018 | Sarikaya et al. |
| 9,997,158 B2 | 6/2018 | Chen et al. |
| 2001/0044751 A1 | 11/2001 | Pugliese, III et al. |
| 2002/0005865 A1 | 1/2002 | Hayes-Roth |
| 2002/0010000 A1 | 1/2002 | Chern et al. |
| 2002/0077726 A1 | 6/2002 | Thorisson |
| 2002/0111811 A1 | 8/2002 | Bares et al. |
| 2002/0151992 A1 | 10/2002 | Hoffberg et al. |
| 2002/0154124 A1 | 10/2002 | Han |
| 2002/0194002 A1 | 12/2002 | Petrushin |
| 2003/0017439 A1 | 1/2003 | Rapoza et al. |
| 2003/0018510 A1 | 1/2003 | Sanches |
| 2003/0018790 A1 | 1/2003 | Nonaka |
| 2003/0028380 A1 | 2/2003 | Freeland et al. |
| 2003/0028498 A1* | 2/2003 | Hayes-Roth ............ G06N 20/00 706/17 |
| 2003/0074222 A1 | 4/2003 | Rosow et al. |
| 2003/0110038 A1 | 6/2003 | Sharma et al. |
| 2003/0120593 A1 | 6/2003 | Bansal et al. |
| 2003/0135630 A1 | 7/2003 | Murrell et al. |
| 2003/0167195 A1 | 9/2003 | Fernandes et al. |
| 2003/0167209 A1 | 9/2003 | Hsieh |
| 2003/0187660 A1 | 10/2003 | Gong |
| 2003/0191627 A1 | 10/2003 | Au |
| 2003/0220799 A1 | 11/2003 | Kim et al. |
| 2003/0228658 A1 | 12/2003 | Shu et al. |
| 2004/0019560 A1 | 1/2004 | Evans et al. |
| 2004/0024724 A1 | 2/2004 | Rubin |
| 2004/0030556 A1 | 2/2004 | Bennett |
| 2004/0030741 A1 | 2/2004 | Wolton et al. |
| 2004/0054610 A1 | 3/2004 | Amstutz et al. |
| 2004/0117189 A1 | 6/2004 | Bennett |
| 2004/0179043 A1 | 9/2004 | Viellescaze et al. |
| 2004/0181145 A1 | 9/2004 | Al Bandar et al. |
| 2004/0199430 A1 | 10/2004 | Hsieh |
| 2004/0203629 A1 | 10/2004 | Dezonno et al. |
| 2004/0221224 A1* | 11/2004 | Blattner ............... H04L 12/1822 715/201 |
| 2004/0236580 A1 | 11/2004 | Bennett |
| 2004/0249635 A1 | 12/2004 | Bennett |
| 2004/0249650 A1 | 12/2004 | Freedman et al. |
| 2005/0080614 A1 | 4/2005 | Bennett |
| 2005/0080625 A1 | 4/2005 | Bennett et al. |
| 2005/0086046 A1 | 4/2005 | Bennett |
| 2005/0086049 A1 | 4/2005 | Bennett |
| 2005/0086059 A1 | 4/2005 | Bennett |
| 2005/0119896 A1 | 6/2005 | Bennett et al. |
| 2005/0119897 A1 | 6/2005 | Bennett et al. |
| 2005/0138081 A1 | 6/2005 | Alshab et al. |
| 2005/0144001 A1 | 6/2005 | Bennett et al. |
| 2005/0144004 A1 | 6/2005 | Bennett et al. |
| 2005/0213743 A1 | 9/2005 | Huet et al. |
| 2005/0246412 A1 | 11/2005 | Murrell et al. |
| 2005/0288954 A1 | 12/2005 | McCarthy et al. |
| 2006/0004703 A1 | 1/2006 | Spivack et al. |
| 2006/0010240 A1 | 1/2006 | Chuah |
| 2006/0036430 A1 | 2/2006 | Hu |
| 2006/0106637 A1 | 5/2006 | Johnson et al. |
| 2006/0111931 A1 | 5/2006 | Johnson et al. |
| 2006/0122834 A1 | 6/2006 | Bennett |
| 2006/0155398 A1 | 7/2006 | Hoffberg et al. |
| 2006/0165104 A1 | 7/2006 | Kaye |
| 2006/0200253 A1 | 9/2006 | Hoffberg et al. |
| 2006/0200258 A1 | 9/2006 | Hoffberg et al. |
| 2006/0200259 A1 | 9/2006 | Hoffberg et al. |
| 2006/0200260 A1 | 9/2006 | Hoffberg et al. |
| 2006/0200353 A1 | 9/2006 | Bennett |
| 2006/0221935 A1 | 10/2006 | Wong et al. |
| 2006/0235696 A1 | 10/2006 | Bennett |
| 2006/0282257 A1 | 12/2006 | Huet et al. |
| 2006/0293921 A1 | 12/2006 | McCarthy et al. |
| 2007/0011270 A1 | 1/2007 | Klein et al. |
| 2007/0015121 A1 | 1/2007 | Johnson et al. |
| 2007/0016476 A1 | 1/2007 | Hoffberg et al. |
| 2007/0036334 A1 | 2/2007 | Culbertson et al. |
| 2007/0053513 A1 | 3/2007 | Hoffberg |
| 2007/0061735 A1 | 3/2007 | Hoffberg et al. |
| 2007/0070038 A1 | 3/2007 | Hoffberg et al. |
| 2007/0074114 A1 | 3/2007 | Adjali et al. |
| 2007/0078294 A1 | 4/2007 | Jain et al. |
| 2007/0082324 A1 | 4/2007 | Johnson et al. |
| 2007/0094032 A1 | 4/2007 | Bennett et al. |
| 2007/0127704 A1 | 6/2007 | Marti et al. |
| 2007/0156625 A1 | 7/2007 | Visel |
| 2007/0162283 A1 | 7/2007 | Petrushin |
| 2007/0179789 A1 | 8/2007 | Bennett |
| 2007/0185716 A1 | 8/2007 | Bennett |
| 2007/0185717 A1 | 8/2007 | Bennett |
| 2007/0198261 A1 | 8/2007 | Chen |
| 2007/0203693 A1 | 8/2007 | Estes |
| 2007/0206017 A1 | 9/2007 | Johnson et al. |
| 2007/0217586 A1 | 9/2007 | Marti et al. |
| 2007/0218987 A1 | 9/2007 | Van Luchene et al. |
| 2007/0244980 A1 | 10/2007 | Baker et al. |
| 2007/0250464 A1 | 10/2007 | Hamilton |
| 2007/0255785 A1 | 11/2007 | Hayashi et al. |
| 2007/0266042 A1 | 11/2007 | Hsu et al. |
| 2007/0282765 A1 | 12/2007 | Visel et al. |
| 2008/0016020 A1 | 1/2008 | Estes |
| 2008/0021708 A1 | 1/2008 | Bennett et al. |
| 2008/0046394 A1 | 2/2008 | Zhou et al. |
| 2008/0052063 A1 | 2/2008 | Bennett et al. |
| 2008/0052077 A1 | 2/2008 | Bennett et al. |
| 2008/0052078 A1 | 2/2008 | Bennett |
| 2008/0059153 A1 | 3/2008 | Bennett |
| 2008/0065430 A1 | 3/2008 | Rosow et al. |
| 2008/0065431 A1 | 3/2008 | Rosow et al. |
| 2008/0065432 A1 | 3/2008 | Rosow et al. |
| 2008/0065433 A1 | 3/2008 | Rosow et al. |
| 2008/0065434 A1 | 3/2008 | Rosow et al. |

(56) References Cited

U.S. PATENT DOCUMENTS

| | | |
|---|---|---|
| 2008/0089490 A1 | 4/2008 | Mikkonen et al. |
| 2008/0091692 A1 | 4/2008 | Keith et al. |
| 2008/0096533 A1 | 4/2008 | Manfredi et al. |
| 2008/0101660 A1 | 5/2008 | Seo |
| 2008/0162471 A1 | 7/2008 | Bernard |
| 2008/0215327 A1 | 9/2008 | Bennett |
| 2008/0221892 A1* | 9/2008 | Nathan .................. G06F 40/35 704/257 |
| 2008/0221926 A1 | 9/2008 | Rosow et al. |
| 2008/0254419 A1 | 10/2008 | Cohen |
| 2008/0254423 A1 | 10/2008 | Cohen |
| 2008/0254424 A1 | 10/2008 | Cohen |
| 2008/0254425 A1 | 10/2008 | Cohen |
| 2008/0254426 A1 | 10/2008 | Cohen |
| 2008/0255845 A1 | 10/2008 | Bennett |
| 2008/0269958 A1 | 10/2008 | Filev et al. |
| 2008/0297515 A1 | 12/2008 | Bliss |
| 2008/0297586 A1 | 12/2008 | Kurtz et al. |
| 2008/0297587 A1 | 12/2008 | Kurtz et al. |
| 2008/0297588 A1 | 12/2008 | Kurtz et al. |
| 2008/0297589 A1 | 12/2008 | Kurtz et al. |
| 2008/0298571 A1 | 12/2008 | Kurtz et al. |
| 2008/0300878 A1 | 12/2008 | Bennett |
| 2008/0306959 A1 | 12/2008 | Spivack et al. |
| 2008/0312971 A2 | 12/2008 | Rosow et al. |
| 2008/0312972 A2 | 12/2008 | Rosow et al. |
| 2008/0312973 A2 | 12/2008 | Rosow et al. |
| 2008/0312974 A2 | 12/2008 | Rosow et al. |
| 2008/0312975 A2 | 12/2008 | Rosow et al. |
| 2009/0037398 A1* | 2/2009 | Horvitz .................. G06F 16/35 |
| 2009/0055190 A1 | 2/2009 | Filev et al. |
| 2009/0055824 A1 | 2/2009 | Rychtyckyj et al. |
| 2009/0063147 A1 | 3/2009 | Roy |
| 2009/0063154 A1 | 3/2009 | Gusikhin et al. |
| 2009/0064155 A1 | 3/2009 | Giuli et al. |
| 2009/0094517 A1 | 4/2009 | Brody et al. |
| 2009/0113033 A1 | 4/2009 | Long et al. |
| 2009/0119127 A2 | 5/2009 | Rosow et al. |
| 2009/0157401 A1 | 6/2009 | Bennett |
| 2009/0187425 A1 | 7/2009 | Thompson |
| 2009/0187455 A1 | 7/2009 | Fernandes et al. |
| 2009/0193123 A1 | 7/2009 | Mitzlaff |
| 2009/0210259 A1 | 8/2009 | Cardot et al. |
| 2009/0222551 A1 | 9/2009 | Neely et al. |
| 2009/0259619 A1 | 10/2009 | Hsieh |
| 2009/0271201 A1 | 10/2009 | Yoshizawa |
| 2009/0281804 A1 | 11/2009 | Watanabe et al. |
| 2009/0281806 A1 | 11/2009 | Parthasarathy |
| 2009/0281809 A1 | 11/2009 | Reuss |
| 2009/0281966 A1 | 11/2009 | Biggs et al. |
| 2009/0286509 A1 | 11/2009 | Huber et al. |
| 2009/0286512 A1 | 11/2009 | Huber et al. |
| 2009/0287483 A1 | 11/2009 | Co et al. |
| 2009/0287484 A1 | 11/2009 | Bushey et al. |
| 2009/0287486 A1 | 11/2009 | Chang |
| 2009/0288140 A1 | 11/2009 | Huber et al. |
| 2009/0292538 A1 | 11/2009 | Barnish |
| 2009/0292778 A1 | 11/2009 | Makar et al. |
| 2009/0299126 A1 | 12/2009 | Fowler et al. |
| 2009/0306977 A1 | 12/2009 | Takiguchi et al. |
| 2009/0326937 A1 | 12/2009 | Chitsaz et al. |
| 2009/0326941 A1 | 12/2009 | Catchpole |
| 2010/0004930 A1 | 1/2010 | Strope et al. |
| 2010/0004932 A1 | 1/2010 | Washio et al. |
| 2010/0005081 A1 | 1/2010 | Bennett |
| 2010/0010814 A1 | 1/2010 | Patel |
| 2010/0023329 A1 | 1/2010 | Onishi |
| 2010/0023331 A1 | 1/2010 | Duta et al. |
| 2010/0023332 A1 | 1/2010 | Smith et al. |
| 2010/0027431 A1 | 2/2010 | Morrison et al. |
| 2010/0030400 A1 | 2/2010 | Komer et al. |
| 2010/0030559 A1 | 2/2010 | Bou-Ghazale et al. |
| 2010/0030560 A1 | 2/2010 | Yamamoto |
| 2010/0036660 A1 | 2/2010 | Bennett |
| 2010/0040207 A1 | 2/2010 | Bushey et al. |
| 2010/0048242 A1 | 2/2010 | Rhoads et al. |
| 2010/0049516 A1 | 2/2010 | Talwar et al. |
| 2010/0049521 A1 | 2/2010 | Ruback et al. |
| 2010/0049525 A1 | 2/2010 | Paden |
| 2010/0050078 A1 | 2/2010 | Refuah et al. |
| 2010/0057450 A1 | 3/2010 | Koll |
| 2010/0057451 A1 | 3/2010 | Carraux et al. |
| 2010/0057457 A1 | 3/2010 | Ogata et al. |
| 2010/0057461 A1 | 3/2010 | Neubacher et al. |
| 2010/0057462 A1 | 3/2010 | Herbig et al. |
| 2010/0063820 A1 | 3/2010 | Seshadri |
| 2010/0070273 A1 | 3/2010 | Rodriguez et al. |
| 2010/0070274 A1 | 3/2010 | Cho et al. |
| 2010/0070448 A1* | 3/2010 | Omoigui ............ H01L 27/1463 706/47 |
| 2010/0076334 A1 | 3/2010 | Rothblatt |
| 2010/0076642 A1 | 3/2010 | Hoffberg et al. |
| 2010/0076757 A1 | 3/2010 | Li et al. |
| 2010/0076758 A1 | 3/2010 | Li et al. |
| 2010/0076764 A1 | 3/2010 | Chengalvarayan |
| 2010/0076765 A1 | 3/2010 | Zweig et al. |
| 2010/0082340 A1 | 4/2010 | Nakadai et al. |
| 2010/0082343 A1 | 4/2010 | Levit et al. |
| 2010/0088096 A1 | 4/2010 | Parsons |
| 2010/0088097 A1 | 4/2010 | Tian et al. |
| 2010/0088098 A1 | 4/2010 | Harada |
| 2010/0088101 A1 | 4/2010 | Knott et al. |
| 2010/0088262 A1 | 4/2010 | Visel et al. |
| 2010/0094626 A1 | 4/2010 | Li et al. |
| 2010/0100378 A1 | 4/2010 | Kroeker et al. |
| 2010/0100384 A1 | 4/2010 | Ju et al. |
| 2010/0100828 A1 | 4/2010 | Khandelwal et al. |
| 2010/0106497 A1 | 4/2010 | Phillips |
| 2010/0106505 A1 | 4/2010 | Shu |
| 2010/0145890 A1 | 6/2010 | Donovan et al. |
| 2010/0152869 A1 | 6/2010 | Morrison et al. |
| 2010/0180030 A1 | 7/2010 | Murrell et al. |
| 2010/0191521 A1 | 7/2010 | Huet et al. |
| 2010/0205541 A1* | 8/2010 | Rapaport ............... G06Q 10/10 715/753 |
| 2010/0211683 A1 | 8/2010 | Murrell et al. |
| 2010/0228540 A1 | 9/2010 | Bennett |
| 2010/0228565 A1 | 9/2010 | Rosow et al. |
| 2010/0235175 A1 | 9/2010 | Donovan et al. |
| 2010/0235341 A1 | 9/2010 | Bennett |
| 2010/0238262 A1 | 9/2010 | Kurtz et al. |
| 2010/0245532 A1 | 9/2010 | Kurtz et al. |
| 2010/0250196 A1 | 9/2010 | Lawler et al. |
| 2010/0251147 A1 | 9/2010 | Donovan et al. |
| 2010/0265834 A1 | 10/2010 | Michaelis et al. |
| 2010/0266115 A1 | 10/2010 | Fedorov et al. |
| 2010/0266116 A1 | 10/2010 | Stolyar et al. |
| 2010/0274847 A1 | 10/2010 | Anderson et al. |
| 2010/0322391 A1 | 12/2010 | Michaelis et al. |
| 2010/0324926 A1 | 12/2010 | Rosow et al. |
| 2010/0332231 A1 | 12/2010 | Nakano et al. |
| 2010/0332648 A1 | 12/2010 | Bohus et al. |
| 2010/0332842 A1* | 12/2010 | Kalaboukis ......... G06F 16/9535 713/186 |
| 2011/0010367 A1 | 1/2011 | Jockish et al. |
| 2011/0014932 A1 | 1/2011 | Estevez |
| 2011/0034176 A1 | 2/2011 | Lord et al. |
| 2011/0055186 A1 | 3/2011 | Gopalakrishnan |
| 2011/0063404 A1 | 3/2011 | Raffle et al. |
| 2011/0093271 A1 | 4/2011 | Bernard |
| 2011/0093913 A1 | 4/2011 | Wohlert et al. |
| 2011/0098029 A1 | 4/2011 | Rhoads et al. |
| 2011/0098056 A1 | 4/2011 | Rhoads et al. |
| 2011/0116505 A1 | 5/2011 | Hymus et al. |
| 2011/0125793 A1 | 5/2011 | Erhart et al. |
| 2011/0143811 A1 | 6/2011 | Rodriguez |
| 2011/0152729 A1 | 6/2011 | Oohashi et al. |
| 2011/0156896 A1 | 6/2011 | Hoffberg et al. |
| 2011/0161076 A1 | 6/2011 | Davis et al. |
| 2011/0165945 A1 | 7/2011 | Dickins |
| 2011/0167078 A1* | 7/2011 | Benjamin ............ G06Q 10/107 707/769 |
| 2011/0167110 A1 | 7/2011 | Hoffberg et al. |
| 2011/0178803 A1 | 7/2011 | Petrushin |

(56) References Cited

U.S. PATENT DOCUMENTS

| | | |
|---|---|---|
| 2011/0206198 A1 | 8/2011 | Freedman et al. |
| 2011/0208798 A1 | 8/2011 | Murrell et al. |
| 2011/0212717 A1 | 9/2011 | Rhoads et al. |
| 2011/0213642 A1 | 9/2011 | Makar et al. |
| 2011/0231203 A1 | 9/2011 | Rosow et al. |
| 2011/0235530 A1 | 9/2011 | Mani |
| 2011/0235797 A1 | 9/2011 | Huet et al. |
| 2011/0238408 A1 | 9/2011 | Larcheveque et al. |
| 2011/0238409 A1 | 9/2011 | Larcheveque et al. |
| 2011/0238410 A1 | 9/2011 | Larcheveque et al. |
| 2011/0244919 A1 | 10/2011 | Aller et al. |
| 2011/0249658 A1 | 10/2011 | Wohlert et al. |
| 2011/0250895 A1 | 10/2011 | Wohlert et al. |
| 2011/0252011 A1 | 10/2011 | Morris et al. |
| 2011/0275350 A1 | 11/2011 | Weltlinger |
| 2011/0283190 A1 | 11/2011 | Poltorak |
| 2011/0307496 A1 | 12/2011 | Jones et al. |
| 2011/0313919 A1 | 12/2011 | Evans et al. |
| 2011/0320277 A1 | 12/2011 | Isaacs |
| 2011/0320951 A1 | 12/2011 | Paillet et al. |
| 2012/0026865 A1 | 2/2012 | Fan et al. |
| 2012/0036016 A1 | 2/2012 | Hoffberg et al. |
| 2012/0047261 A1 | 2/2012 | Murrell et al. |
| 2012/0052476 A1 | 3/2012 | Graesser et al. |
| 2012/0059776 A1 | 3/2012 | Estes |
| 2012/0066259 A1 | 3/2012 | Huber et al. |
| 2012/0069131 A1 | 3/2012 | Abelow |
| 2012/0078700 A1 | 3/2012 | Pugliese et al. |
| 2012/0083246 A1 | 4/2012 | Huber et al. |
| 2012/0089394 A1 | 4/2012 | Teodosiu et al. |
| 2012/0094643 A1 | 4/2012 | Brisebois et al. |
| 2012/0101865 A1 | 4/2012 | Zhakov |
| 2012/0102050 A1 | 4/2012 | Button et al. |
| 2012/0134480 A1 | 5/2012 | Leeds et al. |
| 2012/0150651 A1 | 6/2012 | Hoffberg et al. |
| 2012/0165046 A1 | 6/2012 | Rhoads et al. |
| 2012/0191629 A1 | 7/2012 | Shae et al. |
| 2012/0191716 A1 | 7/2012 | Omoigui |
| 2012/0197824 A1 | 8/2012 | Donovan et al. |
| 2012/0210171 A1 | 8/2012 | Lawler et al. |
| 2012/0218436 A1 | 8/2012 | Rhoads et al. |
| 2012/0220311 A1 | 8/2012 | Rodriguez et al. |
| 2012/0221502 A1 | 8/2012 | Jerram et al. |
| 2012/0232907 A1 | 9/2012 | Ivey |
| 2012/0258776 A1 | 10/2012 | Lord et al. |
| 2012/0259891 A1 | 10/2012 | Edoja |
| 2012/0265531 A1 | 10/2012 | Bennett |
| 2012/0271625 A1 | 10/2012 | Bernard |
| 2012/0317294 A1 | 12/2012 | Murrell et al. |
| 2012/0330869 A1 | 12/2012 | Durham |
| 2012/0330874 A1 | 12/2012 | Jerram et al. |
| 2013/0031476 A1 | 1/2013 | Coin et al. |
| 2013/0050260 A1 | 2/2013 | Reitan |
| 2013/0079002 A1 | 3/2013 | Huber et al. |
| 2013/0091090 A1 | 4/2013 | Spivack et al. |
| 2013/0106682 A1 | 5/2013 | Davis et al. |
| 2013/0106683 A1 | 5/2013 | Davis et al. |
| 2013/0106685 A1 | 5/2013 | Davis et al. |
| 2013/0106695 A1 | 5/2013 | Davis et al. |
| 2013/0106892 A1 | 5/2013 | Davis et al. |
| 2013/0106893 A1 | 5/2013 | Davis et al. |
| 2013/0106894 A1 | 5/2013 | Davis et al. |
| 2013/0110565 A1 | 5/2013 | Means, Jr. et al. |
| 2013/0110804 A1 | 5/2013 | Davis et al. |
| 2013/0124435 A1 | 5/2013 | Estes |
| 2013/0128060 A1 | 5/2013 | Rhoads et al. |
| 2013/0132318 A1 | 5/2013 | Tanimoto et al. |
| 2013/0135332 A1 | 5/2013 | Davis et al. |
| 2013/0138665 A1 | 5/2013 | Hu et al. |
| 2013/0148525 A1 | 6/2013 | Sanchez et al. |
| 2013/0159235 A1 | 6/2013 | Hatami-Hanza |
| 2013/0173281 A1 | 7/2013 | Rosow et al. |
| 2013/0204619 A1 | 8/2013 | Berman et al. |
| 2013/0204813 A1 | 8/2013 | Master et al. |
| 2013/0212501 A1 | 8/2013 | Anderson et al. |
| 2013/0217440 A1 | 8/2013 | Lord et al. |
| 2013/0218339 A1 | 8/2013 | Maisonnier et al. |
| 2013/0219357 A1 | 8/2013 | Reitan |
| 2013/0222371 A1 | 8/2013 | Reitan |
| 2013/0226758 A1 | 8/2013 | Reitan |
| 2013/0226847 A1 | 8/2013 | Cruse et al. |
| 2013/0229433 A1 | 9/2013 | Reitan |
| 2013/0232430 A1 | 9/2013 | Reitan |
| 2013/0234933 A1 | 9/2013 | Reitan |
| 2013/0235034 A1 | 9/2013 | Reitan |
| 2013/0235079 A1 | 9/2013 | Reitan |
| 2013/0238778 A1 | 9/2013 | Reitan |
| 2013/0246392 A1 | 9/2013 | Farmaner et al. |
| 2013/0246512 A1 | 9/2013 | Lawler et al. |
| 2013/0249947 A1 | 9/2013 | Reitan |
| 2013/0249948 A1 | 9/2013 | Reitan |
| 2013/0252604 A1 | 9/2013 | Huber et al. |
| 2013/0262096 A1 | 10/2013 | Wilhelms-Tricarico et al. |
| 2013/0262107 A1 | 10/2013 | Bernard |
| 2013/0266925 A1 | 10/2013 | Nunamaker, Jr. et al. |
| 2013/0268260 A1 | 10/2013 | Lundberg et al. |
| 2013/0273968 A1 | 10/2013 | Rhoads et al. |
| 2013/0294648 A1 | 11/2013 | Rhoads et al. |
| 2013/0295881 A1 | 11/2013 | Wohlert et al. |
| 2013/0295894 A1 | 11/2013 | Rhoads et al. |
| 2013/0303119 A1 | 11/2013 | Huber et al. |
| 2013/0317826 A1 | 11/2013 | Jerram et al. |
| 2013/0324161 A1 | 12/2013 | Rhoads et al. |
| 2013/0335407 A1 | 12/2013 | Reitan |
| 2013/0346066 A1 | 12/2013 | Deoras et al. |
| 2014/0012574 A1 | 1/2014 | Pasupalak et al. |
| 2014/0019116 A1 | 1/2014 | Lundberg et al. |
| 2014/0029472 A1 | 1/2014 | Michaelis et al. |
| 2014/0040312 A1 | 2/2014 | Gorman et al. |
| 2014/0049651 A1 | 2/2014 | Voth |
| 2014/0049691 A1 | 2/2014 | Burdzinski et al. |
| 2014/0049692 A1 | 2/2014 | Sirpal et al. |
| 2014/0049693 A1 | 2/2014 | Selim et al. |
| 2014/0049696 A1 | 2/2014 | Sirpal et al. |
| 2014/0052785 A1 | 2/2014 | Sirpal |
| 2014/0052786 A1 | 2/2014 | de Paz |
| 2014/0053176 A1 | 2/2014 | Milano et al. |
| 2014/0053177 A1 | 2/2014 | Voth |
| 2014/0053178 A1 | 2/2014 | Voth et al. |
| 2014/0053179 A1 | 2/2014 | Voth |
| 2014/0053180 A1 | 2/2014 | Shoykher |
| 2014/0053190 A1 | 2/2014 | Sirpal |
| 2014/0053191 A1 | 2/2014 | Selim |
| 2014/0053192 A1 | 2/2014 | Sirpal |
| 2014/0053193 A1 | 2/2014 | Selim et al. |
| 2014/0053194 A1 | 2/2014 | Shoykher et al. |
| 2014/0053195 A1 | 2/2014 | Sirpal et al. |
| 2014/0053196 A1 | 2/2014 | Selim |
| 2014/0053197 A1 | 2/2014 | Shoykher et al. |
| 2014/0053198 A1 | 2/2014 | Sirpal et al. |
| 2014/0053200 A1 | 2/2014 | de Paz et al. |
| 2014/0053202 A1 | 2/2014 | Selim |
| 2014/0053203 A1 | 2/2014 | Csiki |
| 2014/0053204 A1 | 2/2014 | Milano |
| 2014/0053205 A1 | 2/2014 | Sirpal et al. |
| 2014/0053206 A1 | 2/2014 | Shoykher |
| 2014/0053207 A1 | 2/2014 | Shoykher et al. |
| 2014/0053208 A1 | 2/2014 | Sirpal et al. |
| 2014/0053211 A1 | 2/2014 | Milano |
| 2014/0053212 A1 | 2/2014 | Shoykher et al. |
| 2014/0053221 A1 | 2/2014 | Sirpal et al. |
| 2014/0053222 A1 | 2/2014 | Shoykher et al. |
| 2014/0053225 A1 | 2/2014 | Shoykher et al. |
| 2014/0055673 A1 | 2/2014 | Sirpal et al. |
| 2014/0059480 A1 | 2/2014 | de Paz et al. |
| 2014/0059578 A1 | 2/2014 | Voth et al. |
| 2014/0059589 A1 | 2/2014 | Sirpal |
| 2014/0059596 A1 | 2/2014 | Dourado |
| 2014/0059598 A1 | 2/2014 | Milano |
| 2014/0059599 A1 | 2/2014 | Sirpal et al. |
| 2014/0059600 A1 | 2/2014 | Dourado |
| 2014/0059601 A1 | 2/2014 | Sirpal |
| 2014/0059602 A1 | 2/2014 | Sirpal |
| 2014/0059603 A1 | 2/2014 | Lee et al. |

(56) References Cited

U.S. PATENT DOCUMENTS

| | | |
|---|---|---|
| 2014/0059605 A1 | 2/2014 | Sirpal et al. |
| 2014/0059606 A1 | 2/2014 | Selim et al. |
| 2014/0059609 A1 | 2/2014 | Dourado |
| 2014/0059610 A1 | 2/2014 | Sirpal et al. |
| 2014/0059612 A1 | 2/2014 | Selim |
| 2014/0059613 A1 | 2/2014 | Burdzinski et al. |
| 2014/0059614 A1 | 2/2014 | Shoykher et al. |
| 2014/0059615 A1 | 2/2014 | Sirpal et al. |
| 2014/0059625 A1 | 2/2014 | Dourado et al. |
| 2014/0059626 A1 | 2/2014 | Selim |
| 2014/0059635 A1 | 2/2014 | Sirpal et al. |
| 2014/0059637 A1 | 2/2014 | Chen et al. |
| 2014/0063061 A1 | 3/2014 | Reitan |
| 2014/0067375 A1 | 3/2014 | Wooters |
| 2014/0067954 A1 | 3/2014 | Sirpal |
| 2014/0068673 A1 | 3/2014 | Sirpal et al. |
| 2014/0068674 A1 | 3/2014 | Sirpal et al. |
| 2014/0068682 A1 | 3/2014 | Selim et al. |
| 2014/0068683 A1 | 3/2014 | Selim et al. |
| 2014/0068685 A1 | 3/2014 | Selim et al. |
| 2014/0068689 A1 | 3/2014 | Sirpal et al. |
| 2014/0071272 A1 | 3/2014 | Rodriguez et al. |
| 2014/0075475 A1 | 3/2014 | Sirpal et al. |
| 2014/0075476 A1 | 3/2014 | de Paz et al. |
| 2014/0075477 A1 | 3/2014 | de Paz et al. |
| 2014/0075479 A1 | 3/2014 | Soto et al. |
| 2014/0075483 A1 | 3/2014 | de Paz et al. |
| 2014/0075484 A1 | 3/2014 | Selim et al. |
| 2014/0075487 A1 | 3/2014 | Selim |
| 2014/0079297 A1 | 3/2014 | Tadayon et al. |
| 2014/0080428 A1 | 3/2014 | Rhoads et al. |
| 2014/0086399 A1 | 3/2014 | Haserodt et al. |
| 2014/0089241 A1 | 3/2014 | Hoffberg et al. |
| 2014/0093849 A1 | 4/2014 | Ahn et al. |
| 2014/0101319 A1 | 4/2014 | Murrell et al. |
| 2014/0114886 A1 | 4/2014 | Mays |
| 2014/0115633 A1 | 4/2014 | Selim et al. |
| 2014/0129418 A1 | 5/2014 | Jerram et al. |
| 2014/0129651 A1 | 5/2014 | Gelfenbeyn et al. |
| 2014/0136013 A1 | 5/2014 | Wolverton et al. |
| 2014/0136187 A1 | 5/2014 | Wolverton et al. |
| 2014/0146644 A1 | 5/2014 | Chen |
| 2014/0161250 A1 | 6/2014 | Leeds et al. |
| 2014/0172899 A1 | 6/2014 | Hakkani-Tur et al. |
| 2014/0173452 A1 | 6/2014 | Hoffberg et al. |
| 2014/0177813 A1 | 6/2014 | Leeds et al. |
| 2014/0180159 A1 | 6/2014 | Rothblatt |
| 2014/0200891 A1 | 7/2014 | Larcheveque et al. |
| 2014/0201126 A1 | 7/2014 | Zadeh et al. |
| 2014/0207441 A1 | 7/2014 | Larcheveque et al. |
| 2014/0229405 A1 | 8/2014 | Govrin et al. |
| 2014/0235261 A1 | 8/2014 | Fan et al. |
| 2014/0250145 A1 | 9/2014 | Jones et al. |
| 2014/0254776 A1 | 9/2014 | O'Connor et al. |
| 2014/0254790 A1 | 9/2014 | Shaffer et al. |
| 2014/0255895 A1 | 9/2014 | Shaffer et al. |
| 2014/0270138 A1 | 9/2014 | Uba et al. |
| 2014/0279719 A1 | 9/2014 | Bohus et al. |
| 2014/0287767 A1 | 9/2014 | Wohlert et al. |
| 2014/0297268 A1 | 10/2014 | Govrin et al. |
| 2014/0297568 A1 | 10/2014 | Beilby et al. |
| 2014/0313208 A1 | 10/2014 | Filev et al. |
| 2014/0316785 A1 | 10/2014 | Bennett et al. |
| 2014/0317030 A1 | 10/2014 | Shen et al. |
| 2014/0317193 A1 | 10/2014 | Mitzlaff |
| 2014/0323142 A1 | 10/2014 | Rodriguez et al. |
| 2014/0333794 A1 | 11/2014 | Rhoads et al. |
| 2014/0337266 A1 | 11/2014 | Kalns et al. |
| 2014/0337733 A1 | 11/2014 | Rodriguez et al. |
| 2014/0337814 A1 | 11/2014 | Kalns et al. |
| 2014/0342703 A1 | 11/2014 | Huber et al. |
| 2014/0343950 A1 | 11/2014 | Simpson et al. |
| 2014/0351765 A1 | 11/2014 | Rodriguez et al. |
| 2014/0358549 A1 | 12/2014 | O'Connor et al. |
| 2014/0359439 A1 | 12/2014 | Lyren |
| 2014/0370852 A1 | 12/2014 | Wohlert et al. |
| 2014/0379923 A1 | 12/2014 | Oberg et al. |
| 2014/0380425 A1 | 12/2014 | Lockett et al. |
| 2015/0003595 A1 | 1/2015 | Yaghi et al. |
| 2015/0011194 A1 | 1/2015 | Rodriguez |
| 2015/0012464 A1 | 1/2015 | Gilbert |
| 2015/0022675 A1 | 1/2015 | Lord et al. |
| 2015/0024800 A1 | 1/2015 | Rodriguez et al. |
| 2015/0066479 A1 | 3/2015 | Pasupalak et al. |
| 2015/0072321 A1 | 3/2015 | Cohen |
| 2015/0081361 A1 | 3/2015 | Lee et al. |
| 2015/0089399 A1 | 3/2015 | Megill et al. |
| 2015/0100157 A1 | 4/2015 | Houssin et al. |
| 2015/0112666 A1 | 4/2015 | Jerram et al. |
| 2015/0112895 A1 | 4/2015 | Jerram et al. |
| 2015/0127558 A1 | 5/2015 | Erhart et al. |
| 2015/0134325 A1 | 5/2015 | Skiba et al. |
| 2015/0142704 A1 | 5/2015 | London |
| 2015/0142706 A1 | 5/2015 | Gilbert |
| 2015/0156548 A1 | 6/2015 | Sirpal et al. |
| 2015/0156554 A1 | 6/2015 | Sirpal et al. |
| 2015/0161651 A1 | 6/2015 | Rodriguez et al. |
| 2015/0161656 A1 | 6/2015 | Rodriguez et al. |
| 2015/0163358 A1 | 6/2015 | Klemm et al. |
| 2015/0163361 A1 | 6/2015 | George |
| 2015/0163537 A1 | 6/2015 | Sirpal et al. |
| 2015/0170236 A1 | 6/2015 | O'Connor et al. |
| 2015/0170671 A1 | 6/2015 | Jerram et al. |
| 2015/0172765 A1 | 6/2015 | Shoykher et al. |
| 2015/0178392 A1 | 6/2015 | Jockisch et al. |
| 2015/0185996 A1 | 7/2015 | Brown et al. |
| 2015/0186154 A1 | 7/2015 | Brown et al. |
| 2015/0186155 A1 | 7/2015 | Brown et al. |
| 2015/0186156 A1 | 7/2015 | Brown et al. |
| 2015/0186504 A1 | 7/2015 | Gorman et al. |
| 2015/0189390 A1 | 7/2015 | Sirpal et al. |
| 2015/0189585 A1 | 7/2015 | Huber et al. |
| 2015/0195406 A1 | 7/2015 | Dwyer et al. |
| 2015/0201147 A1 | 7/2015 | Sirpal et al. |
| 2015/0207938 A1 | 7/2015 | Shaffer et al. |
| 2015/0208135 A1 | 7/2015 | Sirpal et al. |
| 2015/0208231 A1 | 7/2015 | Brisebois et al. |
| 2015/0227559 A1 | 8/2015 | Hatami-Hanza |
| 2015/0244850 A1 | 8/2015 | Rodriguez et al. |
| 2015/0262016 A1 | 9/2015 | Rothblatt |
| 2015/0281760 A1 | 10/2015 | Sirpal et al. |
| 2015/0302536 A1 | 10/2015 | Wahl et al. |
| 2015/0304797 A1 | 10/2015 | Rhoads et al. |
| 2015/0319305 A1 | 11/2015 | Matula et al. |
| 2015/0324727 A1 | 11/2015 | Erhart et al. |
| 2015/0356127 A1 | 12/2015 | Pierre et al. |
| 2015/0358525 A1 | 12/2015 | Lord |
| 2016/0006875 A1 | 1/2016 | Burmeister et al. |
| 2016/0012123 A1 | 1/2016 | Hu et al. |
| 2016/0014222 A1 | 1/2016 | Chen et al. |
| 2016/0014233 A1 | 1/2016 | Chen et al. |
| 2016/0035353 A1 | 2/2016 | Chen et al. |
| 2016/0037207 A1 | 2/2016 | Soto et al. |
| 2016/0044362 A1 | 2/2016 | Shoykher et al. |
| 2016/0044380 A1 | 2/2016 | Barrett |
| 2016/0050462 A1 | 2/2016 | Sirpal et al. |
| 2016/0055563 A1 | 2/2016 | Grandhi |
| 2016/0057480 A1 | 2/2016 | Selim et al. |
| 2016/0057502 A1 | 2/2016 | Sirpal et al. |
| 2016/0066022 A1 | 3/2016 | Sirpal et al. |
| 2016/0066023 A1 | 3/2016 | Selim et al. |
| 2016/0066047 A1 | 3/2016 | Sirpal et al. |
| 2016/0071517 A1 | 3/2016 | Beaver et al. |
| 2016/0078866 A1 | 3/2016 | Gelfenbeyn et al. |
| 2016/0086108 A1 | 3/2016 | Abelow |
| 2016/0092522 A1 | 3/2016 | Harden et al. |
| 2016/0092567 A1 | 3/2016 | Li et al. |
| 2016/0094490 A1 | 3/2016 | Li et al. |
| 2016/0094492 A1 | 3/2016 | Li et al. |
| 2016/0094506 A1 | 3/2016 | Harden et al. |
| 2016/0094507 A1 | 3/2016 | Li et al. |
| 2016/0098663 A1 | 4/2016 | Skiba et al. |
| 2016/0112567 A1 | 4/2016 | Matula et al. |
| 2016/0117593 A1 | 4/2016 | London |

(56) References Cited

U.S. PATENT DOCUMENTS

| | | |
|---|---|---|
| 2016/0117598 A1 | 4/2016 | Donovan et al. |
| 2016/0119675 A1 | 4/2016 | Voth et al. |
| 2016/0124945 A1 | 5/2016 | Cruse et al. |
| 2016/0125200 A1 | 5/2016 | York et al. |
| 2016/0127282 A1 | 5/2016 | Nezarati et al. |
| 2016/0140236 A1 | 5/2016 | Estes |
| 2016/0154631 A1 | 6/2016 | Cruse et al. |
| 2016/0165316 A1 | 6/2016 | Selim et al. |
| 2016/0170946 A1 | 6/2016 | Lee |
| 2016/0171387 A1 | 6/2016 | Suskind |
| 2016/0182958 A1 | 6/2016 | Milano et al. |
| 2016/0205621 A1 | 7/2016 | Huber et al. |
| 2016/0210116 A1 | 7/2016 | Kim et al. |
| 2016/0210117 A1 | 7/2016 | Kim et al. |
| 2016/0210279 A1 | 7/2016 | Kim et al. |
| 2016/0210962 A1 | 7/2016 | Kim et al. |
| 2016/0210963 A1 | 7/2016 | Kim et al. |
| 2016/0217784 A1 | 7/2016 | Gelfenbeyn et al. |
| 2016/0218933 A1 | 7/2016 | Porras et al. |
| 2016/0219048 A1 | 7/2016 | Porras et al. |
| 2016/0219078 A1 | 7/2016 | Porras et al. |
| 2016/0220903 A1 | 8/2016 | Miller et al. |
| 2016/0225372 A1 | 8/2016 | Cheung et al. |
| 2016/0239480 A1 | 8/2016 | Larcheveque et al. |
| 2016/0259767 A1 | 9/2016 | Gelfenbeyn et al. |
| 2016/0259775 A1 | 9/2016 | Gelfenbeyn et al. |
| 2016/0260029 A1 | 9/2016 | Gelfenbeyn et al. |
| 2016/0285798 A1 | 9/2016 | Smullen et al. |
| 2016/0285881 A1 | 9/2016 | Huber et al. |
| 2016/0293043 A1 | 10/2016 | Lacroix et al. |
| 2016/0294739 A1 | 10/2016 | Stoehr et al. |
| 2016/0316055 A1 | 10/2016 | Wohlert et al. |
| 2016/0328667 A1 | 11/2016 | Macciola et al. |
| 2016/0335606 A1 | 11/2016 | Chen et al. |
| 2016/0343378 A1 | 11/2016 | Chen et al. |
| 2016/0349935 A1 | 12/2016 | Gelfenbeyn et al. |
| 2016/0350101 A1 | 12/2016 | Gelfenbeyn et al. |
| 2016/0351193 A1 | 12/2016 | Chen et al. |
| 2016/0352656 A1 | 12/2016 | Galley et al. |
| 2016/0352657 A1 | 12/2016 | Galley et al. |
| 2016/0352903 A1 | 12/2016 | Hp et al. |
| 2016/0360970 A1 | 12/2016 | Tzvieli et al. |
| 2016/0379082 A1 | 12/2016 | Rodriguez et al. |
| 2017/0004645 A1 | 1/2017 | Donovan et al. |
| 2017/0011232 A1 | 1/2017 | Xue et al. |
| 2017/0011233 A1 | 1/2017 | Xue et al. |
| 2017/0011745 A1 | 1/2017 | Navaratnam |
| 2017/0012907 A1 | 1/2017 | Smullen et al. |
| 2017/0013127 A1 | 1/2017 | Xue et al. |
| 2017/0013536 A1 | 1/2017 | Wohlert et al. |
| 2017/0026514 A1 | 1/2017 | Dwyer et al. |
| 2017/0032377 A1 | 2/2017 | Navaratnam |
| 2017/0034718 A1 | 2/2017 | Fan et al. |
| 2017/0041797 A1 | 2/2017 | Wohlert et al. |
| 2017/0048170 A1 | 2/2017 | Smullen et al. |
| 2017/0060835 A1 | 3/2017 | Radford et al. |
| 2017/0068551 A1 | 3/2017 | Vadodaria |
| 2017/0070478 A1 | 3/2017 | Park et al. |
| 2017/0075877 A1 | 3/2017 | Lepeltier |
| 2017/0075944 A1 | 3/2017 | Overman |
| 2017/0075979 A1 | 3/2017 | Overman |
| 2017/0076111 A1 | 3/2017 | Overman |
| 2017/0078374 A1 | 3/2017 | Overman |
| 2017/0078448 A1 | 3/2017 | Overman |
| 2017/0080207 A1 | 3/2017 | Perez et al. |
| 2017/0091171 A1 | 3/2017 | Perez |
| 2017/0091312 A1 | 3/2017 | Ajmera et al. |
| 2017/0097928 A1 | 4/2017 | Davis Jones et al. |
| 2017/0099521 A1 | 4/2017 | Sirpal et al. |
| 2017/0103329 A1 | 4/2017 | Reddy |
| 2017/0116982 A1 | 4/2017 | Gelfenbeyn et al. |
| 2017/0119295 A1 | 5/2017 | Twyman et al. |
| 2017/0124457 A1 | 5/2017 | Jerram et al. |
| 2017/0124460 A1 | 5/2017 | Jerram et al. |
| 2017/0148431 A1 | 5/2017 | Catanzaro et al. |
| 2017/0148433 A1 | 5/2017 | Catanzaro et al. |
| 2017/0148434 A1 | 5/2017 | Monceaux et al. |
| 2017/0160813 A1 | 6/2017 | Divakaran et al. |
| 2017/0161372 A1 | 6/2017 | Fern Ndez et al. |
| 2017/0164037 A1 | 6/2017 | Selim et al. |
| 2017/0173262 A1 | 6/2017 | Veltz |
| 2017/0178005 A1 | 6/2017 | Kumar et al. |
| 2017/0178144 A1 | 6/2017 | Follett et al. |
| 2017/0180284 A1 | 6/2017 | Smullen et al. |
| 2017/0180499 A1 | 6/2017 | Gelfenbeyn et al. |
| 2017/0185582 A1 | 6/2017 | Gelfenbeyn et al. |
| 2017/0185945 A1 | 6/2017 | Matula et al. |
| 2017/0186115 A1 | 6/2017 | Sheppard et al. |
| 2017/0188168 A1 | 6/2017 | Lyren et al. |
| 2017/0193997 A1 | 7/2017 | Chen et al. |
| 2017/0199909 A1 | 7/2017 | Hakkani-Tur et al. |
| 2017/0200075 A1 | 7/2017 | Suskind et al. |
| 2017/0214701 A1 | 7/2017 | Hasan |
| 2017/0214799 A1 | 7/2017 | Perez et al. |
| 2017/0215028 A1 | 7/2017 | Rhoads et al. |
| 2017/0221483 A1 | 8/2017 | Poltorak |
| 2017/0221484 A1 | 8/2017 | Poltorak |
| 2017/0228367 A1 | 8/2017 | Pasupalak et al. |
| 2017/0236407 A1 | 8/2017 | Rhoads et al. |
| 2017/0236524 A1 | 8/2017 | Ray et al. |
| 2017/0245081 A1 | 8/2017 | Lyren et al. |
| 2017/0249387 A1 | 8/2017 | Hatami-Hanza |
| 2017/0250930 A1 | 8/2017 | Ben-Itzhak |
| 2017/0251985 A1 | 9/2017 | Howard |
| 2017/0256257 A1 | 9/2017 | Froelich |
| 2017/0256258 A1 | 9/2017 | Froelich |
| 2017/0256259 A1 | 9/2017 | Froelich |
| 2017/0256261 A1 | 9/2017 | Froelich |
| 2017/0257474 A1 | 9/2017 | Rhoads et al. |
| 2017/0269946 A1 | 9/2017 | Mays |
| 2017/0270822 A1 | 9/2017 | Cohen |
| 2017/0285641 A1 | 10/2017 | Goldman-Shenhar et al. |
| 2017/0287469 A1 | 10/2017 | Kuo et al. |
| 2017/0288942 A1 | 10/2017 | Plumb et al. |
| 2017/0288943 A1 | 10/2017 | Plumb et al. |
| 2017/0289069 A1 | 10/2017 | Plumb et al. |
| 2017/0289070 A1 | 10/2017 | Plumb et al. |
| 2017/0289341 A1 | 10/2017 | Rodriguez et al. |
| 2017/0299426 A1 | 10/2017 | Lee et al. |
| 2017/0300648 A1 | 10/2017 | Charlap |
| 2017/0308904 A1 | 10/2017 | Navaratnam |
| 2017/0308905 A1 | 10/2017 | Navaratnam |
| 2017/0316777 A1 | 11/2017 | Perez et al. |
| 2017/0324866 A1 | 11/2017 | Segre et al. |
| 2017/0324867 A1 | 11/2017 | Tamblyn et al. |
| 2017/0324868 A1 | 11/2017 | Tamblyn et al. |
| 2017/0334066 A1 | 11/2017 | Levine et al. |
| 2017/0339503 A1 | 11/2017 | Lyren et al. |
| 2017/0344532 A1 | 11/2017 | Zhou et al. |
| 2017/0344886 A1 | 11/2017 | Tong |
| 2017/0344889 A1 | 11/2017 | Sengupta et al. |
| 2017/0345334 A1 | 11/2017 | DiGiorgio |
| 2017/0347146 A1 | 11/2017 | Selim et al. |
| 2017/0353405 A1 | 12/2017 | O'Driscoll et al. |
| 2017/0353582 A1 | 12/2017 | Zavesky et al. |
| 2017/0364336 A1 | 12/2017 | Khan et al. |
| 2017/0364505 A1 | 12/2017 | Sarikaya et al. |
| 2017/0365250 A1 | 12/2017 | Sarikaya et al. |
| 2017/0366478 A1 | 12/2017 | Mohammed et al. |
| 2017/0366479 A1 | 12/2017 | Ladha et al. |
| 2017/0366842 A1 | 12/2017 | Shoykher et al. |
| 2017/0371885 A1 | 12/2017 | Aggarwal et al. |
| 2017/0372703 A1 | 12/2017 | Sung et al. |
| 2017/0373992 A1 | 12/2017 | Nair |
| 2018/0000347 A1 | 1/2018 | Perez et al. |
| 2018/0006978 A1 | 1/2018 | Smullen et al. |
| 2018/0007199 A1 | 1/2018 | Quilici et al. |
| 2018/0011843 A1 | 1/2018 | Lee et al. |
| 2018/0024644 A1 | 1/2018 | Sirpal et al. |
| 2018/0025275 A1 | 1/2018 | Jerram et al. |
| 2018/0025726 A1 | 1/2018 | Gatte de Bayser et al. |
| 2018/0032889 A1 | 2/2018 | Donovan et al. |
| 2018/0046923 A1 | 2/2018 | Jerram et al. |
| 2018/0047201 A1 | 2/2018 | Filev et al. |

(56) References Cited

U.S. PATENT DOCUMENTS

| | | |
|---|---|---|
| 2018/0048594 A1 | 2/2018 | de Silva et al. |
| 2018/0052664 A1 | 2/2018 | Zhang et al. |
| 2018/0053119 A1 | 2/2018 | Zeng et al. |
| 2018/0054464 A1 | 2/2018 | Zhang et al. |
| 2018/0054523 A1 | 2/2018 | Zhang et al. |
| 2018/0060301 A1 | 3/2018 | Li et al. |
| 2018/0060303 A1 | 3/2018 | Sarikaya et al. |
| 2018/0061408 A1 | 3/2018 | Andreas et al. |
| 2018/0063568 A1 | 3/2018 | Shoykher et al. |
| 2018/0068234 A1 | 3/2018 | Bohus et al. |
| 2018/0075335 A1 | 3/2018 | Braz et al. |
| 2018/0075847 A1 | 3/2018 | Lee et al. |
| 2018/0077131 A1 | 3/2018 | Averboch et al. |
| 2018/0078215 A1 | 3/2018 | Park et al. |
| 2018/0078754 A1 | 3/2018 | Perez et al. |
| 2018/0084359 A1 | 3/2018 | Lyren et al. |
| 2018/0085580 A1 | 3/2018 | Perez et al. |
| 2018/0089163 A1 | 3/2018 | Ben Ami et al. |
| 2018/0089315 A1 | 3/2018 | Seiber et al. |
| 2018/0090135 A1 | 3/2018 | Schlesinger et al. |
| 2018/0090141 A1 | 3/2018 | Periorellis et al. |
| 2018/0096686 A1 | 4/2018 | Borsutsky et al. |
| 2018/0098030 A1 | 4/2018 | Morabia et al. |
| 2018/0101854 A1 | 4/2018 | Jones-McFadden et al. |
| 2018/0108050 A1 | 4/2018 | Halstvedt et al. |
| 2018/0108343 A1 | 4/2018 | Stevans et al. |
| 2018/0113854 A1 | 4/2018 | Vig et al. |
| 2018/0121062 A1 | 5/2018 | Beaver et al. |
| 2018/0121678 A1 | 5/2018 | York et al. |
| 2018/0122363 A1 | 5/2018 | Braz et al. |
| 2018/0125689 A1 | 5/2018 | Perez et al. |
| 2018/0129484 A1 | 5/2018 | Kannan et al. |
| 2018/0129648 A1 | 5/2018 | Chakravarthy et al. |
| 2018/0129941 A1 | 5/2018 | Gustafson et al. |
| 2018/0129959 A1 | 5/2018 | Gustafson et al. |
| 2018/0130067 A1 | 5/2018 | Lindsay |
| 2018/0130156 A1 | 5/2018 | Grau |
| 2018/0130372 A1 | 5/2018 | Vinkers et al. |
| 2018/0130463 A1 | 5/2018 | Jeon et al. |
| 2018/0131904 A1 | 5/2018 | Segal |
| 2018/0137179 A1 | 5/2018 | Kawanabe |
| 2018/0137203 A1 | 5/2018 | Hennekey et al. |
| 2018/0137424 A1 | 5/2018 | Gabaldon Royval et al. |
| 2018/0139069 A1 | 5/2018 | Rawlins et al. |
| 2018/0144738 A1 | 5/2018 | Yasavur et al. |
| 2018/0158068 A1 | 6/2018 | Ker |
| 2018/0165581 A1 | 6/2018 | Hwang et al. |
| 2018/0165723 A1 | 6/2018 | Wright et al. |
| 2018/0173322 A1 | 6/2018 | de Paz et al. |
| 2018/0173714 A1 | 6/2018 | Moussa et al. |
| 2018/0173999 A1 | 6/2018 | Renard |
| 2018/0174055 A1 | 6/2018 | Tirumale et al. |
| 2018/0181558 A1 | 6/2018 | Emery et al. |
| 2018/0183735 A1 | 6/2018 | Naydonov |
| 2018/0189400 A1 | 7/2018 | Gordon |
| 2018/0189408 A1 | 7/2018 | O'Driscoll et al. |
| 2018/0189695 A1 | 7/2018 | Macciola et al. |
| 2018/0190253 A1 | 7/2018 | O'Driscoll et al. |
| 2018/0191654 A1 | 7/2018 | O'Driscoll et al. |
| 2018/0192082 A1 | 7/2018 | O'Driscoll et al. |
| 2018/0192286 A1 | 7/2018 | Brisebois et al. |
| 2018/0196874 A1 | 7/2018 | Seiber et al. |
| 2018/0197104 A1 | 7/2018 | Marin et al. |
| 2018/0203852 A1 | 7/2018 | Goyal et al. |
| 2018/0204107 A1 | 7/2018 | Tucker |
| 2018/0204111 A1 | 7/2018 | Zadeh et al. |
| 2018/0212904 A1 | 7/2018 | Smullen et al. |
| 2018/0218042 A1 | 8/2018 | Krishnan et al. |
| 2018/0218080 A1 | 8/2018 | Krishnamurthy et al. |
| 2018/0218734 A1 | 8/2018 | Somech et al. |
| 2018/0225365 A1 | 8/2018 | Altaf et al. |
| 2018/0226066 A1 | 8/2018 | Harris et al. |
| 2018/0226068 A1 | 8/2018 | Hall et al. |
| 2018/0227422 A1 | 8/2018 | Stolyar et al. |
| 2018/0227690 A1 | 8/2018 | Lyren et al. |
| 2018/0232376 A1 | 8/2018 | Zhu et al. |
| 2018/0233028 A1 | 8/2018 | Rhoads et al. |
| 2018/0239758 A1 | 8/2018 | Cruse et al. |
| 2018/0239815 A1 | 8/2018 | Yi et al. |
| 2018/0240162 A1 | 8/2018 | Krishnaswamy et al. |
| 2018/0246954 A1 | 8/2018 | Andreas et al. |
| 2018/0247649 A1 | 8/2018 | Chen et al. |
| 2018/0248995 A1 | 8/2018 | Rhoads |

FOREIGN PATENT DOCUMENTS

| | | |
|---|---|---|
| WO | WO2004017596 | 2/2004 |
| WO | WO2009077901 | 6/2009 |

\* cited by examiner

ELECTRONIC PERSONAL INTERACTIVE DEVICE

CROSS-REFERENCE TO RELATED PROVISIONAL APPLICATION

This application is a Continuation of U.S. patent application Ser. No. 13/106,575, filed May 12, 2011, now U.S. Pat. No. 9,634,855, issued Apr. 25, 2017, which claims priority benefit of provisional U.S. Patent Application Ser. No. 61/334,564, entitled ELECTRONIC PERSONAL INTERACTIVE DEVICE, filed on May 13, 2010, which applications are hereby incorporated by reference in their entirety, including all Figures, Tables, and Claims.

FIELD OF THE INVENTION

The present invention relates generally to consumer electronics and telecommunications, and, more particularly, to personal devices having social human-machine user interfaces.

BACKGROUND OF THE INVENTION

Many systems and methods intended for use by elderly people are known in the art. Elderly people as a group have less developed technological skills than younger generations. These people may also have various disabilities or degraded capabilities as compared to their youth. Further, elderly people tend to be retired, and thus do not spend their time focused on an avocation.

Speech recognition technologies, as described, for example in Gupta, U.S. Pat. No. 6,138,095, incorporated herein by reference, are programmed or trained to recognize the words that a person is saying. Various methods of implementing these speech recognition technologies include either associating the words spoken by a human with a dictionary lookup and error checker or through the use of neural networks which are trained to recognize words.

See also: U.S. Pat. Nos. 7,711,569, 7,711,571, 7,711,560, 7,711,559, 7,707,029, 7,702,512, 7,702,505, 7,698,137, 7,698,136, 7,698,131, 7,693,718, 7,693,717, 7,689,425, 7,689,424, 7,689,415, 7,689,404, 7,684,998, 7,684,983, 7,684,556, 7,680,667, 7,680,666, 7,680,663, 7,680,662, 7,680,661, 7,680,658, 7,680,514, 7,676,363, 7,672,847, 7,672,846, 7,672,841, US Patent App. Nos. 2010/0106505, 2010/0106497, 2010/0100384, 2010/0100378, 2010/0094626, 2010/0088101, 2010/0088098, 2010/0088097, 2010/0088096, 2010/0082343, 2010/0082340, 2010/0076765, 2010/0076764, 2010/0076758, 2010/0076757, 2010/0070274, 2010/0070273, 2010/0063820, 2010/0057462, 2010/0057461, 2010/0057457, 2010/0057451, 2010/0057450, 2010/0049525, 2010/0049521, 2010/0049516, 2010/0040207, 2010/0030560, 2010/0030559, 2010/0030400, 2010/0023332, 2010/0023331, 2010/0023329, 2010/0010814, 2010/0004932, 2010/0004930, 2009/0326941, 2009/0326937, 2009/0306977, 2009/0292538, 2009/0287486, 2009/0287484, 2009/0287483, 2009/0281809, 2009/0281806, 2009/0281804, 2009/0271201, each of which is expressly incorporated herein by reference.

The current scholarly trend is to use statistical modeling to determine whether a sound is a phoneme and whether a certain set of phonemes corresponds to a word. This method is discussed in detail in Turner, Statistical Methods for Natural Sounds (Thesis, University of London, 2010), incorporated herein by reference. Other scholars have applied Hidden Markov Models (HMM) to speech recognitions. Hidden Markov Models are probabilistic models that assume that at any given time, the system is in a state (e.g. uttering the first phoneme). In the next time-step, the system moves to another state with a certain probability (e.g., uttering the second phoneme, completing a word, or completing a sentence). The model keeps track of the current state and attempts to determine the next state in accordance with a set of rules. See, generally, Brown, Decoding HMMs using the k best paths: algorithms and applications, BMC Bioinformatics (2010), incorporated herein by reference, for a more complete discussion of the application of HMMs.

In addition to recognizing the words that a human has spoken, speech recognition software can also be programmed to determine the mood of a speaker, or to determine basic information that is apparent from the speaker's voice, tone, and pronunciation, such as the speaker's gender, approximate age, accent, and language. See, for example, Bohacek, U.S. Pat. No. 6,411,687, incorporated herein by reference, describing an implementation of these technologies. See also, Leeper, Speech Fluency, Effect of Age, Gender and Context, International Journal of Phoniatrics, Speech Therapy and Communication Pathology (1995), incorporated herein by reference, discussing the relationship between the age of the speaker, the gender of the speaker, and the context of the speech, in the fluency and word choice of the speaker. In a similar field of endeavor, Taylor, U.S. Pat. No. 6,853,971, teaches an application of speech recognition technology to determine the speaker's accent or dialect. See also: US App. 2007/0198261, US App. 2003/0110038, and U.S. Pat. No. 6,442,519, all incorporated herein by reference.

In addition, a computer with a camera attached thereto can be programmed to recognize facial expressions and facial gestures in order to ascertain the mood of a human. See, for example, Black, U.S. Pat. No. 5,774,591, incorporated herein by reference. One implementation of Black's technique is by comparing facial images with a library of known facial images that represent certain moods or emotions. An alternative implementation would ascertain the facial expression through neural networks trained to do so. Similarly, Kodachi, U.S. Pat. No. 6,659,857, incorporated herein by reference, teaches about the use of a "facial expression determination table" in a gaming situation so that a user's emotions can be determined. See also U.S. Pat. Nos. 6,088,040, 7,624,076, 7,003,139, 6,681,032, and US App. 2008/0101660.

Takeuchi, "Communicative Facial Displays as a New Conversational Modality," (1993) incorporated herein by reference, notes that facial expressions themselves could be communicative. Takeuchi's study compared a group of people who heard a voice only and a group of people who viewed a face saying the same words as the voice. The people who saw the face had a better understanding of the message, suggesting a communicative element in human facial expressions. Catrambone, "Anthropomorphic Agents as a User Interface Paradigm: Exponential Findings and a Framework for Research," incorporated herein by reference, similarly, notes that users who learn computing with a human face on the computer screen guiding them through the process feel more comfortable with the machines as a result.

Lester goes even further, noting that "animated pedagogical agents" can be used to show a face to students as a complex task is demonstrated on a video or computer screen. The computer (through the face and the speaker) can interact with the students through a dialog. Lester, "Animated Pedagogical Agents: Face-to-Face Interaction in Interactive Learning Environments," North Carolina State University (1999), incorporated herein by reference. Cassell, similarly, teaches about conversational agents. Cassell's "embodied conversational agents" (ECAs) are computer interfaces that are represented by human or animal bodies and are lifelike or believable in their interaction with the human user. Cassell requires ECAs to have the following features: the ability to recognize and respond to verbal and nonverbal input; the ability to generate verbal and nonverbal output; the ability to deal with conversational functions such as turn taking, feedback, and repair mechanisms; and the ability to give signals that indicate the state of the conversation, as well as to contribute new propositions to the discourse. Cassell, "Conversation as a System Framework: Designing Embodied Conversational Agents," incorporated herein by reference.

Massaro continues the work on conversation theory by developing Baldi, a computer animated talking head. When speaking, Baldi imitates the intonations and facial expressions of humans. Baldi has been used in language tutoring for children with hearing loss. Massaro, "Developing and Evaluating Conversational Agents," Perpetual Science Laboratory, University of California. In later developments, Baldi was also given a body so as to allow for communicative gesturing and was taught to speak multiple languages. Massaro, "A Multilingual Embodied Conversational Agent," University of California, Santa Cruz (2005), incorporated herein by reference.

Bickmore continues Cassell's work on embodied conversational agents. Bickmore finds that, in ECAs, the nonverbal channel is crucial for social dialogue because it is used to provide social cues, such as attentiveness, positive affect, and liking and attraction. Facial expressions also mark shifts into and out of social activities. Also, there are many gestures, e.g. waving one's hand to hail a taxi, crossing one's arms and shaking one's head to say "No," etc. that are essentially communicative in nature and could serve as substitutes for words.

Bickmore further developed a computerized real estate agent, Rea, where, "Rea has a fully articulated graphical body, can sense the user passively through cameras and audio input, and is capable of speech with intonation, facial display, and gestural output. The system currently consists of a large projection screen on which Rea is displayed and which the user stands in front of. Two cameras mounted on top of the projection screen track the user's head and hand positions in space. Users wear a microphone for capturing speech input." Bickmore & Cassell, "Social Dialogue with Embodied Conversational Agents," incorporated herein by reference.

Similar to the work of Bickmore and Cassell, Beskow at the Royal Institute of Technology in Stockholm, Sweden created Olga, a conversational agent with gestures that is able to engage in conversations with users, interpret gestures, and make its own gestures. Beskow, "Olga—A Conversational Agent with Gestures," Royal Institute of Technology, incorporated herein by reference.

In "Social Cues in Animated Conversational Agents," Louwerse et al. note that people who interact with ECAs tend to react to them just as they do to real people. People tend to follow traditional social rules and to express their personality in usual ways in conversations with computer-based agents. Louwerse, M. M., Graesser, A. C., Lu, S., & Mitchell, H. H. (2005). Social cues in animated conversational agents. Applied Cognitive Psychology, 19, 1-12, incorporated herein by reference.

In another paper, Beskow further teaches how to model the dynamics of articulation for a parameterized talking head based on the phonetic input. Beskow creates four models of articulation (and the corresponding facial movements). To achieve this result, Beskow makes use of neural networks. Beskow further notes several uses of "talking heads." These include virtual language tutors, embodied conversational agents in spoken dialogue systems, and talking computer game characters. In the computer game area, proper visual speech movements are essential for the realism of the characters. (This factor also causes "dubbed" foreign films to appear unrealistic.) Beskow, "Trainable Articulatory Control Models for Visual Speech Synthesis" (2004), incorporated herein by reference.

Ezzat goes even further, presenting a technique where a human subject is recorded uttering a predetermined speech corpus by a video camera. A visual speech model is created from this recording. Now, the computer can allow the person to make novel utterances and show how she would move her head while doing so. Ezzat creates a "multidimensional morpheme model" to synthesize new, previously unseen mouth configurations from a small set of mouth image prototypes.

In a similar field of endeavor, Picard proposes computer that can respond to user's emotions. Picard's ECAs can be used as an experimental emotional aid, as a pre-emptive tool to avert user frustration, and as an emotional skill-building mirror.

In the context of a customer call center, Bushey, U.S. Pat. No. 7,224,790, incorporated herein by reference, discusses conducting a "verbal style analysis" to determine a customer's level of frustration and the customer's goals in calling customer service. The "verbal style analysis" takes into account the number of words that the customer uses and the method of contact. Based in part on the verbal style analysis, customers are segregated into behavioral groups, and each behavioral group is treated differently by the customer service representatives. Gong, US App. 2003/0187660, incorporated herein by reference, goes further than Bushey, teaching an "intelligent social agent" that receives a plurality of physiological data and forms a hypothesis regarding the "affective state of the user" based on this data. Gong also analyzes vocal and verbal content and integrates the analysis to ascertain the user's physiological state.

Mood can be determined by various biometrics. For example, the tone of a voice or music is suggestive of the mood. See, Liu et al., Automatic Mood Detection from Acoustic Music Data, Johns Hopkins University Scholarship Library (2003). The mood can also be ascertained based on a person's statements. For example, if a person says, "I am angry," then the person is most likely telling the truth. See Kent et al., Detection of Major and Minor Depression in Children and Adolescents, Journal of Child Psychology (2006). One's facial expression is another strong indicator of one's mood. See, e.g., Cloud, How to Lift Your Mood? Try Smiling Time Magazine (Jan. 16, 2009).

Therefore, it is feasible for a human user to convey his mood to a machine with an audio and a visual input by speaking to the machine, thereby allowing the machine to read his voice tone and words, and by looking at the machine, thereby allowing the machine to read his facial expressions.

It is also possible to change a person's mood through a conversational interface. For example, when people around one are smiling and laughing, one is more likely to forget one's worries and to smile and laugh oneself. In order to change a person's mood through a conversational interface, the machine implementing the interface must first determine the starting mood of the user. The machine would then go through a series of "optimal transitions" seeking to change the mood of the user. This might not be a direct transition. Various theories discuss how a person's mood might be changed by people or other external influences. For example, Neumann, "Mood Contagion": The Automatic Transfer of Mood Between persons, Journal of Personality and Social Psychology (2000), suggests that if people around one are openly experiencing a certain mood, one is likely to join them in experiencing said mood. Other scholars suggest that logical mood mediation might be used to persuade someone to be happy. See, e.g., DeLongis, The Impact of Daily Stress on Health and Mood: Psychological and Social Resources as Mediators, Journal of Personality and Social Psychology (1988). Schwarz notes that mood can be impacted by presenting stimuli that were previously associated with certain moods, e.g. the presentation of chocolate makes one happy because one was previously happy when one had chocolate. Schwarz, Mood and Persuasion: Affective States Influence the Processing of Persuasive Communications, in Advances in Experimental Social Psychology, Vol. 24 (Academic Press 1991). Time Magazine suggests that one can improve one's mood merely by smiling or changing one's facial expression to imitate the mood one wants to experience. Cloud, How to Lift Your Mood? Try Smiling. Time Magazine (Jan. 16, 2009).

Liquid crystal display (LCD) screens are known in the art as well. An LCD screen is a thin, flat electronic visual display that uses the light modulating properties of liquid crystals. These are used in cell phones, smartphones, laptops, desktops, and televisions. See Huang, U.S. Pat. No. 6,437,975, incorporated herein by reference, for a detailed discussion of LCD screen technology.

Many other displays are known in the art. For example, three-dimensional televisions and monitors are available from Samsung Corp. and Philips Corp. One embodiment of the operation of three-dimensional television, described by Imsand in U.S. Pat. No. 4,723,159, involves taking two cameras and applying mathematical transforms to combine the two received images of an object into a single image, which can be displayed to a viewer. On its website, Samsung notes that it's three-dimensional televisions operate by "display[ing] two separate but overlapping images of the same scene simultaneously, and at slightly different angles as well." One of the images is intended to be perceived by the viewer's left eye. The other is intended to be perceived by the right eye. The human brain should convert the combination of the views into a three-dimensional image. See, generally, Samsung 3D Learning Resource, www.samsung.com/us/learningresources3D (last accessed May 10, 2010).

Projectors are also known in the art. These devices project an image from one screen to another. Thus, for example, a small image on a cellular phone screen that is difficult for an elderly person to perceive may be displayed as a larger image on a wall by connecting the cell phone with a projector. Similarly, a netbook with a small screen may be connected by a cable to a large plasma television or plasma screen. This would allow the images from the netbook to be displayed on the plasma display device.

Devices for forming alternative facial expressions are known in the art. There are many children's toys and pictures with changeable facial expressions. For example, Freynet, U.S. Pat. No. 6,146,721, incorporated herein by reference, teaches a toy having alternative facial expression. An image of a face stored on a computer can be similarly presented on an LCD screen with a modified facial expression. See also U.S. Pat. Nos. 5,215,493, 5,902,169, 3,494,068, and U.S. Pat. No. 6,758,717, expressly incorporated herein by reference.

In addition, emergency detection systems taking input from cameras and microphones are known in the art. These systems are programmed to detect whether an emergency is ongoing and to immediately notify the relevant parties (e.g. police, ambulance, hospital or nursing home staff, etc.). One such emergency detection system is described by Lee, U.S. Pat. No. 6,456,695, expressly incorporated herein by reference. Lee suggests that an emergency call could be made when an emergency is detected, but does not explain how an automatic emergency detection would take place. However, Kirkor, U.S. Pat. No. 4,319,229, proposes a fire emergency detector comprising "three separate and diverse sensors . . . a heat detector, a smoke detector, and an infrared radiation detector." Under Kirkor's invention, when a fire emergency is detected, (through the combination of inputs to the sensors) alarm is sounded to alert individuals in the building and the local fire department is notified via PSTN. In addition, some modern devices, for example, the Emfit Movement Monitor/Nighttime Motion Detection System, www.go-southernmd.com/store/store/comersus_viewItem.asp?i-dProduct=35511, last accessed May 10, 2010, comprise a camera and a pressure sensor adapted to watch a sleeping person and to alert a caregiver when the sleeping patient is exhibiting unusual movements.

See, also (each of which is expressly incorporated herein by reference):

Andre, et al., "Employing AI Methods to Control the Behavior of Animated Interface Agents."

Andre, et al., "The Automated Design of Believable Dialogues for Animated Presentation Teams"; in J. Cassell, S. Prevost, J. Sullivan, and E. Churchill: Embodied Conversational Agents, The MIT Press, pp. 220-255, 2000.

Aravamuden, U.S. Pat. No. 7,539,676, expressly incorporated herein by reference, teaches about presenting content to a user based on how relevant it is believed to be for a user based on the text query that the user entered and how the user responded to prior search results.

Atmmarketplace.com (2003) 'New bank to bring back old ATM character,' News Article, 7 Apr. 2003

Barrow, K (2000) 'What's anthropomorphism got to with artificial intelligence? An investigation into the extent of anthropomorphism within the field of science'. Unpublished student dissertation, University of the West of England Beale, et al., "Agent-Based Interaction," in People and Computers IX: Proceedings of HCI '94, Glasgow, UK, August 1994, pp. 239-245.

Becker, et al., "Simulating the Emotion Dynamics of a Multimodal Conversational Agent."

Bentahar, et al., "Towards a Formal Framework for Conversational Agents."

Beskow, "Trainable Articulatory Control Models for Visual Speech Synthesis."

Beskow, et al., "Olga-a Conversational Agent with Gestures," In André, E. (Ed.), Proc of the IJCAI-97 Workshop on Animated Interface Agents: Making them Intelligent (pp. 39-44). Nagoya, Japan.

Beun, et al., "Embodied Conversational Agents: Effects on Memory Performance and Anthropomorphisation"; T. Rist et al. (Eds.): IVA 2003, LNAI 2792, pp. 315-319, 2003

Bickmore, et al., "Establishing and Maintaining Long-Term Human-Computer Relationships."

Bickmore, et al., "Relational Agents: A Model and Implementation of Building User Trust."

Bickmore, et al., "Social Dialogue with Embodied Conversational Agents"; T.H.E. Editor(s) (ed.), Book title, 1-6, pages 1-27.

Biever, C (2004) 'Polite computers win users' hearts and minds' News article, 17 Jul. 2004, New Scientist Brennan, S E & Ohaeri, J O (1994) 'Effects of message style on users' attributions toward agents.' Proceedings of the ACM CHI '94 Human Factors in Computing Systems: Conference Companion, Boston, 24-28 Apr. 1994, 281-282.

Brennan, S E, Laurel, B, & Shneiderman, B (1992) 'Anthropomorphism: from ELIZA to Terminator 2. Striking a balance' Proceedings of the 1992 ACM/SIGCHI Conference on Human Factors in Computing Systems, New York: ACM Press, 67-70.

Cassell, "Embodied Conversational Agents: Representation and Intelligence in User Interface"; In press, AI Magazine.

Cassell, et al., "Animated Conversation: Rule-based Generation of Facial Expression, Gesture & Spoken Intonation for Multiple Conversational Agents", Computer Graphics (1994), Volume: 28, Issue: Annual Conference Series, Publisher: ACM Press, Pages: 413-420.

Cassell, et al., "Conversation as a System Framework: Designing Embodied Conversational Agents."

Cassell, et al., "Negotiated Collusion: Modeling Social Language and its Relationship Effects in Intelligent Agents"; User Modeling and User-Adapted Interaction 13: 89-132, 2003.

Catrambone, et al., "Anthropomorphic Agents as a User Interface Paradigm: Experimental Findings and a Framework for Research."

Cole, et al., "Intelligent Animated Agents for Interactive Language Training."

Dawson, Christian, W (2000) The Essence of Computing Projects: A Student's Guide, Prentice Hall De Laere, K, Lundgren, D & Howe, S (1998) 'The Electronic Mirror: Human-Computer Interaction and Change in Self-Appraisals' Computers in Human Behavior, 14 (1) 43-59

Dix, A, Finlay, J, Abowd, G & Beale, R (2002) Human-Computer Interaction, Second Edition, Pearson Education, Harlow, Essex Egges, et al., "Generic Personality and Emotion Simulation for Conversational Agents."

Ezzat, et al., "Trainable Videorealistic Speech Animation."

Flind, Allison, (2006) "Is Anthropomorphic Design a Viable Way of Enhancing Interface Usability?", B. Sc. Thesis Apr. 14, 2005, University of West England, Bristol, www.anthropomorphism.co.uk/index.html, ww.anthropomorphism.co.uk/anthropomorphism.pdf Fogg, B J & Nass, C (1997) 'Silicon sycophants: the effects of computers that flatter,' International Journal of Human-Computer Studies 46 551-561.

Forbes (1998) 'Banks that chat and other irrelevancies' Interview with Ben Shneiderman, Gates, B. (1995) 'Bill's speech at Lakeside High-School 1995.'

Grosz, "Attention, Intentions, and the Structure of Discourse," Computational Linguistics, Volume 12, Number 3, July-September 1986, pp. 175-204.

Guthrie, S (1993) Faces in the clouds—a new theory of religion, Oxford U. Press, NY Harper, W, M (1965) Statistics, Unwin, London Harris, B (1996) 'No stamps in cyberspace' News article, August 1996, govtech.net Hartmann, et al., "Implementing Expressive Gesture Synthesis for Embodied Conversational Agents."

Hasegawa, et al., "A CG Tool for Constructing Anthropomorphic Interface Agents."

Henderson, M, E, Lyons Morris, L, Taylor Fitz-Gibbon, C (1987) How to Measure Attitudes, 2nd Edition, Sage Publications Heylen, et al., "Experimenting with the Gaze of a Conversational Agent."

Hodgkinson, T (1993) 'Radical mushroom reality,' An interview with author Terence McKenna, Fortean Times Magazine, 71, October/November 1993

Horvitz, E (2005) 'Lumiére Project: Bayesian Reasoning for Automated Assistance,' research.microsoft.com/~horvitz/lum.htm).

Horvitz, E, Breese, J, Heckerman, D, Hovel, D & Rommelse, K (1998) 'The Lumiére project: Bayesian user modeling for inferring the goals and needs of software users', Proceedings of the Fourteenth Conference on Uncertainty in Artificial Intelligence, Madison, Wis., 256-265, Morgan Kaufmann, San Francisco. http://research.microsoft.com/~horvitz/lumiere.htm.

Isbister, K & Nass, C (2000). 'Consistency of personality in interactive characters: verbal cues, non-verbal cues, and user characteristics.' International Journal of Human-Computer Studies, 53 (1), 251-267.

Johnson, et al., "Animated Pedagogical Agents: Face-to-Face Interaction in Interactive Learning Environments." International Journal of Artificial Intelligence in Education, 2000.

Ju, W, Nickell, S, Eng & Nass, C (2005) 'Influence of colearner behavior on learner performance and attitudes' Proceedings of the CHI Conference on Human Factors in Computing Systems 2005, Portland, Oreg.

Lanier, J (1995) 'Agents of alienation', Journal of Consciousness Studies, 2 (1), 76-81.

Laurel, B (1992) 'In defense of anthropomorphism,' speech delivered at the ACM SIGCHI 92, published on Laurel's website, www.tauzero.com/Brenda_Laurel/Severed_Heads/DefenseOfAnthropomorphism.html Lester, et al., "The Persona Effect: Affective Impact of Animated Pedagogical Agents."

Louwerse, et al., "Social Cues in Animated Conversational Agents"; Applied Cognitive Psychology, 19, 1-12.

Luck, Martin (1999) Your Student Research Project, Gower

Markoff, J (2000). 'Microsoft sees software "agent" as way to avoid distractions.' New York Times, Technology Section.

Massaro, et al., "A Multilingual Embodied Conversational Agent." Proceedings of the 38th Hawaii International Conference on System Sciences-2005, pp. 1-8.

Massaro, et al., "Developing and Evaluating Conversational Agents"; Paper for First Workshop on Embodied Conversational Characters (WECC) Granlibakken Resort & Conference Center, November 1998, Lake Tahoe.

Mc Breen, et al., "Evaluating Humanoid Synthetic Agents in E-Retail Applications"; IEEE Transactions on Systems, Man and Cybernetics-Part A: Systems and Humans, Vol. 31, No. 5, September 2001, pp. 394-405.

McNeil, Patrick (1990) Research Methods, 2nd Edition, Routledge

Morkes, J, Kernal, H & Nass, C 'Humour in Computer-Mediated Communication and Human-Computer Interaction'. Proceedings of the ACM CHI '98, Los Angeles, Calif., p. 215-216

Morris, "Conversational Agents for Game-Like Virtual Environments"; American Association for Artificial Intelligence, pp. 82-86.

Nass, C & Moon, Y (2000) 'Machines and mindlessness: social responses to computers,' Journal of social issues, 56 (1) 81-103

Nass, C (1998). Are computers scapegoats? Attributions of responsibility in human-computer interaction. International Journal of Human-Computer Studies, 49 (1), 79-94.

Nass, C, Moon, Y, Fogg, B J, Reeves, B, & Dryer, C (1995). 'Can computer personalities be human personalities?' International Journal of Human-Computer Studies, 43, 223-239.

Nass, C, Steuer, J & Tauber, E (1994) 'Computers are social actors. Proceeding of the CHI Conference, 72-77. Boston, Mass.

Nass, C, Steuer, J S, Henriksen, L, & Dryer, C (1994) 'Machines and social attributions: Performance assessments of computers subsequent to "self-" or "other-" evaluations,' International Journal of Human-Computer Studies, 40, 543-559

Nass, et al., "Truth is Beauty: Researching Embodied Conversational Agents."

New Scientist Archive (2004) 'Strictly non-PC,' News article about Microsoft's cultural insensitivity (22 Nov. 2004)

Office Assistant Demonstration (1996) 'From Office 97 Comdex Roll Out.'

Picard, "Affective Computing"; M.I.T. Media Laboratory Perceptual Computing Section Technical Report No. 321, pp. 1-16.

Picard, et al., "Computers that Recognise and Respond to User Emotion: Theoretical and Practical Implications," MIT Media Lab Tech Report 538, Interacting with Computers (2001).

Preece, J, Rogers, Y, Sharp, H, Benyon, D, Holland, S, Carey, T (1994) Human-Computer Interaction, Addison-Wesley Reeves, B & Nass, C. (1996), The media equation—How people treat computers, television, and new media like real people and places. CSLI Publications, Cambridge Resnik, P V & Lammers, H B (1986) 'The influence of self-esteem on cognitive Responses to machine-like versus human-like computer feedback,' The Journal of Social Psychology, 125 (6), 761-769

Rickenberg, R & Reeves, B (2000) The effects of animated characters on anxiety, task performance, and evaluations of user interfaces. Proceedings of CHI 2000-Conference on Human Factors in Computing Systems. New York, N.Y., 49-56.

Roy, US App. 2009/0063147, expressly incorporated herein by reference, teaches about phonetic, syntactic and conceptual analysis drive speech recognition.

Schneider, David I (1999) Essentials of Visual Basic 6.0 programming Prentice-Hall, NJ.

See also, each of which is expressly incorporated herein by reference:

Shneiderman, B & Plaisant, C (2004) Designing the User Interface: Strategies for Effective Human-Computer Interaction Fourth Edition, Pearson Addison Wesley, London Shneiderman, B (1992) Designing the User Interface: Strategies for Effective Human-Computer Interaction Second Edition, Addison Wesley Longman, London Swartz, L (2003) 'Why people hate the paperclip: labels, appearance, Behaviour and social responses to user interface agents,' Student thesis, symbolic systems program, Stanford University, xenon.stanford.edu/~lswartz/paperclip/

Takeuchi, et al., "Communicative Facial Displays as a New Conversational Modality."

Technovelgy.com (2005) 'Mac Mini and KITT the Knight Rider' News article about the Mac Mini, 13 Jan. 2005, www.technovelgy.com/ct/Science-Fiction-News.asp?NewsNum=311

Toastytech.com (2005) 'Microsoft Bob Version 1.00', Summary of Microsoft Bob, toastytech.com/guis/bob.html (10 Jan. 2005)

Tzeng, J-Y, (2004) 'Towards a more civilised design, studying the effects of computers that apologise,' International Journal of Human-Computer Studies, 61 319-345

Vertegaal, et al., "Why Conversational Agents Should Catch the Eye", CHI 2000, 1-6 Apr. 2000, pp. 257-258.

Wetmore, J (1999) 'Moving relationships: befriending the automobile to relieve anxiety' www.drdriving.org/misc/anthropomorph.html

SUMMARY OF THE INVENTION

The present system and method provide a conversational interactive interface for an electronic system, which communicates using traditional human communication paradigms, and employs artificial intelligence to respond to the user. Many of technologies employed by components of the system and method are available. For example, by combining the technologies of, Gupta U.S. Pat. No. 6,138,095 (word recognizer), Bohacek U.S. Pat. No. 6,411,687 (mood detector based on speech), Black U.S. Pat. No. 5,774,591 (facial expression to mood converter), and Bushey U.S. Pat. No. 7,224,790 (analysis of word use to detect the attitude of the customer), the mood of a user of a computer with a camera and a microphone who is looking into the camera and speaking into the microphone can effectively be ascertained.

Conversation is a progression of exchanges (usually oral, but occasionally written) by participants. Each participant is a "learning system," that is, a system that is adaptive and changes internally as a consequence of experience. This highly complex type of interaction is also quite powerful, for conversation is the means by which existing knowledge is conveyed, and new knowledge is generated. Conversation is different from other interactions, such as a mechanical response (e.g. door that opens when one presses a button or an Internet search query that returns a pre-determinable set of results) because conversation is not a simple reactive system. It is a uniquely personal interaction to the degree that any output response must be based on the input prior statement, as well as other information about one's dealings with the other party to the conversation and former conversation. It often involves synthesis of ideas with new information or preexisting information not previously expressed for the purpose at hand, and can also involve a form of debate, where a party adopts a position or hypothesis that it does not hold firmly, in order to continue the interaction. As a result, the thesis or topic can itself evolve, since the conversation need not be purposeful. Indeed, for social conversation, the process is not intended to resolve or convince, but rather to entertain. One would normally converse very differently with one's spouse, one's child, one's social friend, and one's business colleague, thus making conversation dependent on the counterparty. See, generally, Gordon Pask, Conversation Theory, Applications in Education and Epistemology, Elsevier, 1976; Gordon Pask, Heinz von Foerster's Self-Organisation, the Progenitor of Conversation and Interaction Theories, 1996. We say that an output response is "conversationally relevant" to an input prior statement and course of dealings if the output builds on the input, and does more than merely repeats the information that can be found in the prior course of dealings. Often, the evolution of a conversation incorporates "new" facts, such as current events or changes from a prior conversation.

In spite of a large amount of technology created for the care of elderly people, a problem which many elderly people experience is loneliness. Many elderly individuals live alone or in nursing homes and do not have as much company as they would like due to the fact that many of their friends and families are far away, unavailable, sick or deceased. In addition, a large percentage of elderly people do not drive and have difficulty walking, making it difficult for them to transport themselves to visit their friends. Social and business networking websites, such as Facebook and LinkedIn, which are popular among younger generations, are not as popular with elderly people, creating a need in the elderly community for updates regarding their friends and families One particular issue is a generation gap in technological proficiency, and comfort level with new types of man-machine interfaces. For example, older generations are more comfortable using a telephone than a computer for communications, and may also prefer "face to face" conversation to voice only paradigms.

The present invention provides, according to one aspect, an automated device that allows humans, and especially elderly people, to engage in conversational interactions, when they are alone. Such automated devices may provide users with entertainment and relevant information about the world around them. Also, preferably, this device would contribute to the safety of the elderly people by using the camera and microphone to monitor the surroundings for emergency situations, and notify the appropriate people if an emergency takes place.

A preferred embodiment of the invention provides a personal interface device. The personal interface device is, for example, particularly adapted for use by an elderly or lonely person in need of social interaction.

In a first embodiment, the personal interface device has a microphone adapted to receive audio input, and a camera adapted to receive image input. Persons having ordinary skill in the art will recognize many such devices that have a microphone and a camera and could be used to implement this invention. For example, the invention could be implemented on a cell phone, a smartphone, such as a Blackberry or Apple iPhone, a PDA, such as an Apple iPad, Apple iPod or Amazon Kindle, a laptop computer, a desktop computer, or a special purpose computing machine designed solely to implement this invention. Preferably, the interface device comprises a single integral housing, such as a cellular telephone, adapted for video conferencing, in which both a video camera and image display face the user.

In a preferred embodiment, the device is responsive to voice commands, for example supporting natural language interaction. This embodiment is preferred because many elderly people have difficulty operating the small buttons on a typical keyboard or cell phone. Thus the oral interaction features, for both communication and command and control, are helpful.

Embodiments of the invention further comprise at least one processor executing software adapted to determine the mood of the user based on at least one of the audio input and the image input. This mood determination could take into account many factors. In addition to the actual words spoken by the user, the mood might be inferred from the content of the conversation, user's tone, hand gestures, and facial expressions. The mood could be ascertained, for example, through an express input, a rule-based or logical system, through a trainable neural network, or other known means. For example, a user mood may be determined in a system according to an embodiment of the present invention which combines and together analyzes data derived from application of the technologies of Gupta (U.S. Pat. No. 6,138,095), which provides a word recognizer, Bohacek (U.S. Pat. No. 6,411,687), which provides a mood detector based on speech, Black (U.S. Pat. No. 5,774,591), which provides a system and method to ascertain mood based on facial expression, and Bushey (U.S. Pat. No. 7,224,790), which analyzes word use to detect the attitude of the customer.

In one embodiment, in order to have conversations that are interesting to the user, the device is adapted to receive information of interest to the user from at least one database or network, which is typically remote from the device, but may also include a local database and/or cache, and which may also be provided over a wireless or wired network, which may comprise a local area network, a wide area network, the Internet, or some combination. Information that is of interest to the user can also be gathered from many sources. For example, if the user is interested in finance, the device could receive information from Yahoo Finance and the Wall Street Journal. If the user is interested in sports, the device could automatically upload the latest scores and keep track of ongoing games to be able to discuss with the user. Also, many elderly people are interested in their families, but rarely communicate with them. The device might therefore also gather information about the family through social networking websites, such as Facebook and LinkedIn. Optionally, the device might also track newspaper or other news stories about family members. In one embodiment, artificial intelligence techniques may be applied to make sure that the news story is likely to be about the family member and not about someone with the same name. For example, if a grandson recently graduated from law school, it is likely that the grandson passed the local Bar Exam, but unlikely that the grandson committed an armed robbery on the other side of the country. In another embodiment, the device could notify the user when an interesting item of information is received, or indeed raise this as part of the "conversation" which is supported by other aspects of the system and method. Therefore, the device could proactively initiate a conversation with the user under such a circumstance, or respond in a contextually appropriate manner to convey the new information. A preferred embodiment of this feature would ensure that the user was present and available to talk before offering to initiate a conversation. Thus, for example, if there were other people present already engaged in conversation (as determined by the audio information input and/or image information input), an interruption might be both unwarranted and unwelcome.

The gathering of information might be done electronically, by an automatic search, RSS (most commonly expanded as "Really Simple Syndication" but sometimes "Rich Site Summary") feed, or similar technique. The automatic information gathering could take place without a prompt or other action from the user. Alternatively, in one embodiment, the device communicates with a remote entity, (e.g. call center employee) who may be someone other than the user-selected person who is displayed on the screen, that communicates information in response to the requests of the user. In one embodiment, the remote entity is a human being who is responsible for keeping the conversation interesting for the user and for ensuring the truth and veracity of the information being provided. This embodiment is useful because it ensures that a software bug would not report something that is upsetting or hurtful to the user.

In various embodiments, the device has a display. The display may, for example, present an image of a face of a person. The person could be, for example, anyone of whom a photograph or image is available, or even a synthetic person (avatar). It could be a spouse, a relative, or a friend who is living or dead. The image is preferably animated in an anthropomorphically accurate manner, thus producing an anthropomorphic interface. The interface may adopt mannerisms from the person depicted, or the mood and presentation may be completely synthetic.

The device preferably also has at least one speaker. The speaker is adapted to speak in a voice associated with the gender of the person on the display. In one embodiment, the voice could also be associated with the race, age, accent, profession, and background of the person in the display. In one embodiment, if samples of the person's voice and speech are available, the device could be programmed to imitate the voice.

Also, the invention features at least one programmable processor that is programmed with computer executable code, stored in a non-transitory computer-readable medium such as flash memory or magnetic media, which when executed is adapted to respond to the user's oral requests with at least audio output that is conversationally relevant to the audio input. As noted above, the audio output is preferably in the voice of the person whose image appears on the display, and both of these may be user selected. In one embodiment, the processor stores information of interest to the user locally, and is able to respond to the user's queries quickly, even if remote communication is unavailable. For example, a user might ask about a score in the recent Yankees game. Because the device "knows" (from previous conversations) that the user is a Yankees fan, the processor will have already uploaded the information and is able to report it to the user. In another embodiment, the device is connected to a remote system, such as a call center, where the employees look up information in response to user requests. Under this "concierge" embodiment, the device does not need to predict the conversation topics, and the accuracy of the information provided is verified by a human being.

In a preferred embodiment, the processor implementing the invention is further adapted to receive input from the microphone and/or the camera and to process the input to determine the existence of an emergency. The emergency could be detected either based on a rule-based (logical) system or based on a neural network trained by detecting various emergency scenarios. If an emergency is detected, the processor might inform an emergency assistance services center which is contact, for example, through a cellular telephone network (e.g., e911), cellular data network, the Internet, or produce a local audio and/or visual alert. Emergency assistance services may include, for example, police, fire, ambulance, nursing home staff, hospital staff, and/or family members. The device could be further adapted to provide information about the emergency to emergency assistance personnel. For example, the device could store a video recording of events taking place immediately before the accident, and/or communicate live audio and/or video.

Another embodiment of the invention is directed to a machine-implemented method of engaging in a conversation with a user. In the first step, the machine receives audio and visual input from the user. Such input could come from a microphone and camera connected to the machine. Next, the machine determines the mood of the user based on at least one of the audio input and the visual input. To do this, the machine considers features including facial expressions and gestures, hand gestures, voice tone, etc. In the following step, the machine presents to the user a face of a user-selected person or another image, wherein the facial expression of the person depends on, or is responsive to, the user's mood. The person could be anyone of whom a photograph is available, for example, a dead spouse or friend or relative with whom the user wishes that she were speaking. Alternatively, the user-selected person could be a famous individual, such as the President. If the user does not select a person, a default will be provided. The device may develop its own "personality" based on a starting state, and the various interactions with the user.

In a preferred embodiment, the machine receives information of interest to a user from a database or network. For example, if a user is interested in weather, the machine might upload weather data to be able to "discuss" the weather intelligently. If the user is interested in college football, the machine might follow recent games and "learn" about key plays. In one embodiment, the current conversation could also be taken into account in determining the information that is relevant to the machine's data mining.

Finally, the last step involves providing audio output in a voice associated with a gender of the user-selected person, the tone of the voice being dependent on at least the mood of the user, wherein the audio output is conversationally relevant to the audio input from the user.

In an embodiment of the invention where the machine initiates a conversation with the user, the first step is to receive information of interest from at least one database or network, such as the Internet. The next step is to request to initiate a conversation with the user. Optionally, the machine could check that the user is present and available before offering to initiate a conversation. The machine would then receive from the user an audio input (words spoken into a microphone) and visual input (the user would look on the screen and into a camera). The user would then be presented with an image of the person he selected to view on the screen. The facial expression on the person would be dependent on the mood of the user. In one embodiment the machine would either imitate the mood of the user or try to cheer up the user and improve his mood. Finally, the machine would provide audio output in a voice associated with the gender of the user-selected person on the screen. The tone of the voice will be dependent on the mood of the user. The audio output will be conversationally relevant to the audio input from the user.

Persons skilled in the art will recognize many forms of hardware which could implement this invention. For example, a user interface system may be provided by an HP Pavilion dv4t laptop computer, which has a microphone, video camera, display screen, speakers, processor, and wireless local area network communications, with capacity for Bluetooth communication to a headset and wide area networking (cellular data connection), and thus features key elements of various embodiments of the invention in the body of the computer. If the laptop or desktop computer does not have any of these features, an external screen, webcam, microphone, and speakers could be used. Alternatively, aspects of the invention could be implemented on a smartphone, such as the Apple iPhone or a Google//Motorola Android "Droid." However, an inconvenience in these devices is that the camera usually faces away from the user, such that the user cannot simultaneously look at the screen and into the camera. This problem can be remedied by connecting an iPhone 3G with an external camera or screen or by positioning mirrors such that the user can see the screen while the camera is facing a reflection of the user.

Almost any modern operating system can be used to implement this invention. For example, one embodiment can run on Windows 7. Another embodiment can run on Linux. Yet another embodiment can be implemented on Apple Mac Os X. Also, an embodiment can be run as an Apple iPhone App, a Windows Mobile 6.5 or 7.0 App, a RIM Blackberry App, an Android App or a Palm App. The system need not be implemented as a single application, except on systems which limit multitasking, e.g., Apple iPhone, and therefore may be provided as a set of cooperating software modules. The advantage of a modular architecture, especially with an open application programming interface, is that it allows replacement and/or upgrade of different modules without replacing the entire suite of software. Likewise, this permits competition between providers for the best module, operating within a common infrastructure.

Thus, for example, the conversation logic provided to synthesize past communications and external data sources may be designed in different ways. Rather than mandating a single system, this module may be competitively provided from different providers, such as Google, Microsoft, Yahoo!, or other providers with proprietary databases and/or algorithms. Likewise, in some cases, a commercial subsidy may be available from a sponsor or advertiser for display or discussion of its products, presumably within the context of the conversation. Thus, for example, if the subject of "vacation" is raised, the agent within the device might respond by discussing a sponsor's vacation offering. The user might say: "I hate sitting here—I want to go on vacation somewhere fun!". The device, recognizing the word "vacation" in the context of an open-ended declarative, might respond: "early summer is a great time to go to Florida, before the hurricane season. Hilton Hotels are having a timeshare promotion like the one you went on last year. You can invite grandson Jimmy, who did well in school this year." The user may respond: "that's a great idea. How much does it cost? And I don't want to sit in an endless timeshare sales pitch!" The device might then respond: "If you sit in the sales pitch, which is 90 minutes, you get $300 off the hotel rate, plus it keeps you out of the sun midday. Besides, your friend Wendy Montclair owns a timeshare there and wrote goods things about it on her blog. You always liked Wendy." The user might respond: "I don't like her anymore. She's going out with Snidely Whiplash!" The device might then respond, "You're joking. Snidely Whiplash is a cartoon character from Dudley Do-Right. Besides, the timeshare you now own went up in value, and you can sell it at a profit to buy this one." The user might respond, "I bought the last one to be near Harry. He's a good friend." The conversational interface might respond: "I just checked; Harry Lefkowitz passed away last month at age 79. His obituary is in the Times. Would you like me to read it to you?"

As can be seen from this exchange, the conversational interface seeks to synthesize information, some of which can be gathered in real time based on the context of the conversation, and may optionally have commercial motivation. This motivation or biasing is generally not too strong, since that might undermine the conversational value of the device, but the commercial biasing might be used to reduce the acquisition and/or usage costs of the device, and adaptively provide useful information to the user.

In another embodiment, ads and incentives may be brokered in real time by a remote database. That is, there is no predetermined commercial biasing, but after the user interacts with the device to trigger a "search," a commercial response may be provided, perhaps accompanied by "organic" responses, which can then be presented to the user or synthesized into the conversation. For example, the remote system may have "ads" that are specifically generated for this system and are communicated with sophisticated logic and perhaps images or voices. An example of this is a T-Mobile ad presented conversationally by a Catherine Zeta Jones avatar, talking with the user about the service and products, using her voice and likeness. Assuming the user is a fan, this "personalized" communication may be welcomed, in place of the normal images and voices of the interface. Special rules may be provided regarding what information is uploaded from the device to a remote network, in order to preserve privacy, but in general, an ad-hoc persona provided to the device may inherit the knowledge base and user profile database of the system. Indeed, this paradigm may form a new type of "website," in which the information is conveyed conversationally, and not as a set of static or database-driven visual or audio-visual depictions.

Yet another embodiment does not require the use of a laptop or desktop computer. Instead, the user could dial a phone number from a home, office, or cellular phone and turn on television to a prearranged channel. The television would preferably be connected to the cable or telephone company's network, such that the cable or telephone company would know which video output to provide. The telephone would be used to obtain audio input from the user. Note that video input from the user is not provided here.

The software for running this app could be programmed in almost any programming language, such as Java or C++. Microphones, speakers, and video cameras typically have drivers for providing input or output. Also, Skype provides a video calling platform. This technology requires receiving video and audio input from a user. Skype can be modified such that, instead of calling a second user, a user would "call" an avatar implementing the present invention, which would apply the words the user speaks, as well as the audio and video input provided from the user by the Skype software in order to make conversationally relevant responses to the user.

It is therefore an object to provide a method, and system for performing the method comprising: receiving audio-visual information; determining at least one of a topic of interest to a user and a query by a user, dependent on received audio-visual information; presenting an anthropomorphic object through an audio-visual output controlled by at least one automated processor, conveying information of interest to the user, dependent on at least one of the determined topic of interest and the query; and telecommunicating audio-visual information through a telecommunication interface. The anthropomorphic object may have an associated anthropomorphic mood which is selectively varied in dependence on at least one of the audio-visual information input, the topic of interest, and the received information.

The receiving, presenting and telecommunicating may be performed using a self-contained cellular telephone communication device. The system may respond to spoken commands. The system may determine an existence of an emergency condition. The system may automatically telecommunicate information about the emergency condition without required human intervention. The emergency condition may be automatically telecommunicated with a responder selected from one or more of the group consisting police, fire, and emergency medical. The query or topic of interest may be automatically derived from the audio-visual information input and communicated remotely from the device through the Internet. The system may automatically interact with a social networking website and/or an Internet search engine and/or a call center through the telecommunication interface. The system may respond to the social networking website, Internet search engine, or call center by transmitting audio-visual information. The system may automatically receive at least one unit of information of interest to the user from a resource remote from the device substantially without requiring an express request from the user, and may further proactively interact with the user in response to receiving said at least one unit of information. The anthropomorphic object may be modified to emulate a received image of a person. The audio-visual output may be configured to emulate a voice corresponding to characteristics of the person represented in the received image of the person. The system may present at least one advertisement responsive to at least one of the topic of interest and the query, and financially accounting for at least one of a presentation of the at least one advertisement and a user interaction with the at least one advertisement. The system may generate structured light, and capture three-dimensional information based at least on the generated structured light. The system may capture a user gesture, and control the anthropomorphic object in dependence on the user gesture. The system may automatically generate a user profile generated based on at least prior interaction with the user.

It is a further object to provide a user interface device, and method of use, comprising: an audio-visual information input configured to receive information sufficient to determine at least one of a topic of interest to a user and a query by a user, dependent on received audio-visual information; at least one audio-visual output configured to present an anthropomorphic object controlled by at least one automated processor, conveying information of interest to the user, dependent on at least one of the determined topic of interest and the query; and an audio-visual telecommunication interface. The at least one automated processor may control the anthropomorphic object to have an associated anthropomorphic mood which is selectively varied in dependence on at least one of the audio-visual information input, the topic of interest, and the received information.

The audio-visual information input and audio-visual output may be implemented on a self-contained cellular telephone communication device. The at least one automated processor may be configured to respond to spoken commands, and to process the received information and to determine an emergency condition. The at least one processor may be configured to automatically telecommunicate information about the determined emergency condition without required human intervention. The determined emergency condition may be automatically telecommunicated with a responder selected from one or more of the group consisting police, fire, and emergency medical. The system may automatically interact with a social networking website based on at least an implicit user command may be provided. The system may be configured to automatically interact with a call center, and to automatically respond to the call center to transmit audio-visual information may be provided. The at least one processor may be configured to automatically receive at least one unit of information of interest to the user from a resource remote from the device substantially without requiring an express request from the user and to initiate an interaction with the user in response to receiving said at least one unit of information. The anthropomorphic object may be configured to represent a received image of a person and to provide an audio output in a voice corresponding to a characteristic of the received image of the person. The at least one processor may be configured to present at least one advertisement responsive to at least one of the topic of interest and the query and to permit the user to interact with the advertisement. The audio-visual information input may comprise a structured light image capture device. The at least one processor may be configured to automatically generate a user profile generated based on the at least prior interaction of the user. The mood may correspond to a human emotional state, and the at least one processor may be configured to determine a user emotional state based on at least the audio-visual information.

It is a further object to provide a method comprising: defining an automated interactive interface having an anthropomorphic personality characteristic, for semantically interacting with a human user to receive user input and present information in a conversational style; determining at least one of a topic of interest to a user dependent on the received user input; automatically generating a query seeking information corresponding to the topic of interest from a database; receiving information of interest to the user from the database, comprising at least a set of facts or information; and providing at least a portion of the received facts or information to the user through the automated interactive interface, in accordance with the conversational style, responsive to the received user input, and the information of interest. The conversational style may be defined by a set of conversational logic comprising at least a persistent portion and an information of interest responsive portion. The anthropomorphic personality characteristic may comprise an automatically controlled human emotional state, the human emotional state being controlled responsive to at least the received user input. Telecommunications with the database may be conducted through a wireless network interface.

It is another object to provide a user interface system comprising an interactive interface; and at least one automated processor configured to control the interactive interface to provide an anthropomorphic personality characteristic, configured to semantically interact with a human user to receive user input and present information in a conversational style; determine at least one of a topic of interest to a user dependent on the received user input; automatically generate a query seeking information corresponding to the topic of interest from a database; receive information of interest to the user from the database, comprising at least a set of facts or information; and provide at least a portion of the received facts or information to the user through the interactive interface, in accordance with the conversational style, responsive to the received user input, and the information of interest. The conversational style may be defined by a set of conversational logic comprising at least a persistent portion and an information of interest responsive portion. The anthropomorphic personality characteristic may comprise a human emotional state, the human emotional state being controlled responsive to at least the received user input. A wireless network interface telecommunications port may be provided, configured to communicate with the database.

Another object provides a method comprising: defining an automated interactive interface having an artificial intelligence-based anthropomorphic personality, configured to semantically interact with a human user through an audio-visual interface, to receive user input and present information in a conversational style; determining at least one of a topic of interest to a user dependent on at least the received user input and a history of interaction with the user; automatically generating a query seeking information corresponding to the topic of interest from a remote database through a telecommunication port; receiving information of interest to the user from the remote database through the telecommunication port, comprising at least a set of facts or information; and controlling the automated interactive interface to convey the facts or information to the user in the conversation style, subject to user interruption and modification of the topic of interest.

A still further object provides a system, comprising: a user interface, comprising a video output port, an audio output port, a camera, a structured lighting generator, and an audio input port; a telecommunication interface, configured to communicate at least a voice conversation through an Internet interface; and at least one processor, configured to receive user input from the user interface, to generate signals for presentation through the user interface, and to control the telecommunication interface, the at least one processor being responsive to at least one user gesture captured by the camera in conjunction with the structured lighting generator to provide control commands for voice conversation communication.

Another object provides a system and method for presenting information to a user, comprising: generating a data file corresponding to a topic of information, the data file comprising facts and conversational logic; communicating the data file to a conversational processor system, having a human user interface configured to communicate a conversational semantic dialog with a user; processing the data file in conjunction with a past state of the conversational semantic dialog with the conversational processor; outputting through the human user interface a first semantic construct in dependence on at least the data file; receiving, after outputting said first semantic construct, through the human user interface a semantic user input; and outputting, after receiving said semantic user input, through the human user interface, a conversationally appropriate second semantic construct in dependence on at least the data file and said semantic user input. The method may further comprise receiving a second data file comprising at least one additional fact, after said receiving said semantic user input, wherein said conversationally appropriate second semantic construct is generated in dependence on at least the second data file.

These and other objects will become apparent from a review of the preferred embodiments and figures.

DETAILED DESCRIPTION OF THE PREFERRED EMBODIMENTS

Example 1

Cell Phone

Figure 1:
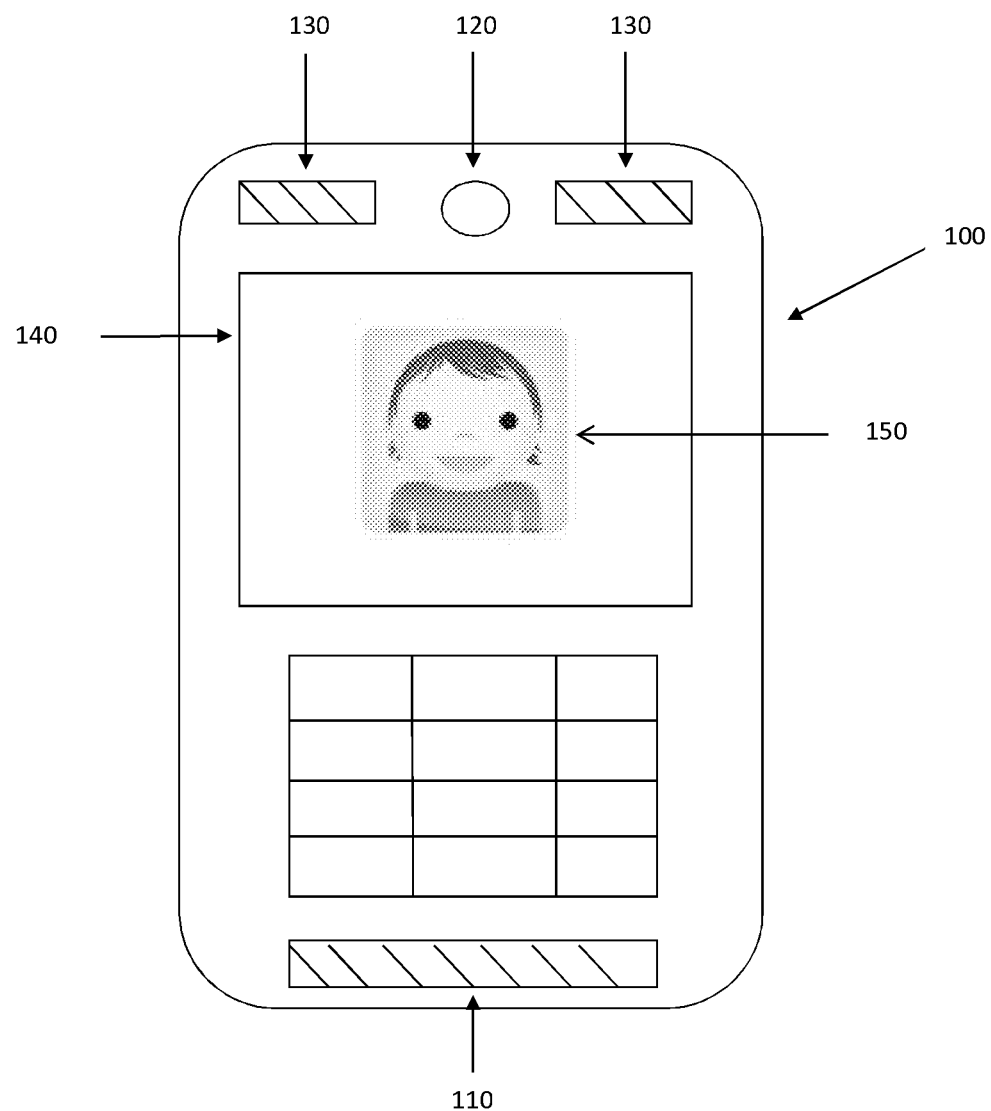
FIG. 1 illustrates an exemplary machine implementing an embodiment of the present invention.

FIG. 1 illustrates an exemplary machine 100 that can be used to implement an embodiment of the present invention. The machine comprises a microphone 110 adapted to receive audio information input and a camera 120 adapted to receive image information input. The camera 120 is preferably is facing the user. There are one or more speakers 130 for audio output (e.g., voice reproduction) and a display 140, which also preferably faces the user. There is also a processor (not illustrated in FIG. 1, but an exemplary processor appears in FIG. 4) and the machine is preferably at least sometimes able to connect to the Internet or a remote database server which stores a variety of human-interest information. The image 150 in display 140 is preferably the face of a person who is selected by the user. The face may also be of another species, or completely synthetic. In one embodiment, the lips of image 150 move as image 150 speaks, and image 150's facial expression is determined to convey an anthropomorphic mood, which itself may be responsive to the mood of the user, as signaled by the audio and image input through microphone 110 and camera 120. The mood of the user may be determined from the words spoken by the user, the voice tone of the user, the facial expression and gestures of the user, the hand gestures of the user, etc. The device 100 may be configured as a cellular telephone or so-called smartphone, but persons having ordinary skill in the art will realize that this invention could be implemented in many other form factors and configurations. For example, the device could be run on a cell phone, a smart phone (e.g. Blackberry, Apple iPhone), a PDA (e.g. Apple iPod, Apple iPad, Amazon Kindle), a laptop computer, a desktop computer, or a special purpose computing machine, with relatively minor modifications. The interface may be used for various consumer electronics devices, such as automobiles, televisions, set-top boxes, stereo equipment, kitchen appliances, thermostats and HVAC equipment, laundry appliances, and the like. The interface may be employed in public venues, such as vending machines and ATMs. In some cases, the interface may be an audio-only interface, in which imaging may be unidirectional or absent. In audio-only systems, the interface seeks to conduct an intelligent conversational dialog and may be part of a call center or interactive voice response system. Thus, for example, the technology might be employed to make waiting queues for call centers more interesting and tolerable for users.

Figure 2:
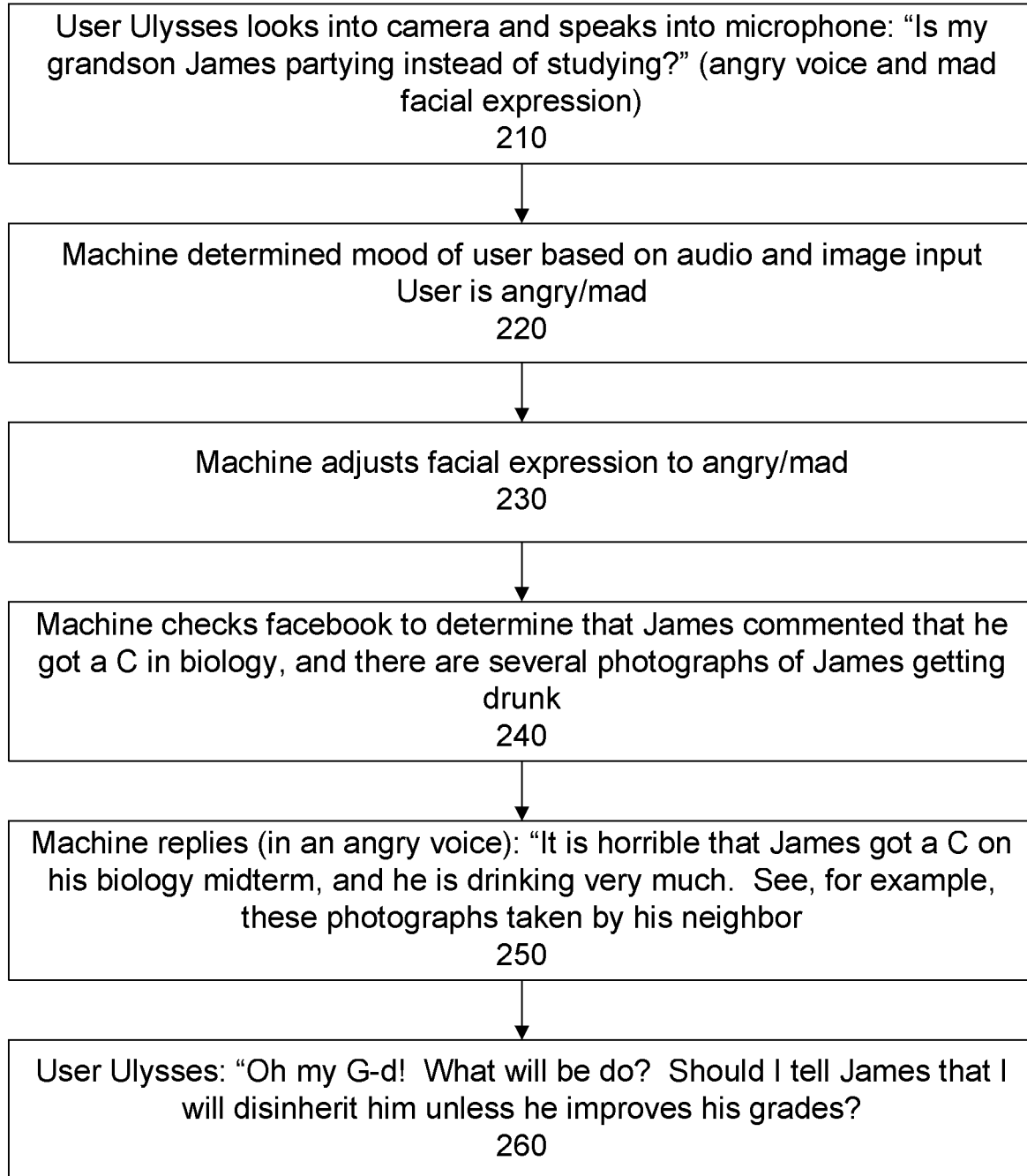
FIG. 2 illustrates a flowchart of a method implementing an embodiment of the present invention.

FIG. 2 is a flowchart 200 illustrating the operation of one embodiment of the invention. In step 210, the user Ulysses looks into the camera and speaks into the microphone. Preferably, the user would naturally be looking into the camera because it is located near the screen where an image of a person is displayed. The person could be anyone whom the user selects, of whom the user can provide a photograph. For example, it might be a deceased friend or spouse, or a friend or relative who lives far away and visits rarely. Alternatively, the image might be of a famous person. In the example, the image in the machine (not illustrated) is of Ulysses' wife, Penelope.

In the example, in step 210, Ulysses says, "Is my grandson James partying instead of studying?" Ulysses has an angry voice and a mad facial expression. In step 220, the machine detects the mood of the user (angry/mad) based on audio input (angry voice) and image input (mad facial expression). This detection is done by one or more processors, which is, for example, a Qualcomm Snapdragon processor. Also, the one or more processors are involved in detecting the meaning of the speech, such that the machine would be able to provide a conversationally relevant response that is at least partially responsive to any query or comment the user makes, and builds on the user's last statement, in the context of this conversation and the course of dealings between the machine and the user. Roy, US App. 2009/0063147, incorporated herein by reference, discusses an exemplary phonetic, syntactic and conceptual analysis drive speech recognition system. Roy's system, or a similar technology, could be used to map the words and grammatical structures uttered by the user to a "meaning", which could then be responded to, with a response converted back to speech, presented in conjunction with an anthropomorphic avatar on the screen, in order to provide a conversationally relevant output. Another embodiment of this invention might use hierarchal stacked neural networks, such as those described by Commons, U.S. Pat. No. 7,613,663, incorporated herein by reference, in order to detect the phonemes the user pronounces and to convert those phonemes into meaningful words and sentence or other grammatical structures. In one embodiment, the facial expression and/or the intonation of the user's voice are coupled with the words chosen by the user to generate the meaning. In any case, at a high level, the device may interpret the user input as a concept with a purpose, and generates a response as a related concept with a counter-purpose. The purpose need not be broader than furthering the conversation, or it may be goal-oriented. In step 230, the machine then adjusts the facial expression of the image of Penelope to angry/mad to mirror the user, as a contextually appropriate emotive response. In another embodiment, the machine might use a different facial expression in order to attempt to modify the user's mood. Thus, if the machine determines that a heated argument is an appropriate path, then a similar emotion to that of the user would carry the conversation forward. In other cases, the interface adopts a more submissive response, to defuse the aggression of the user.

Clearly, the machine has no way of knowing whether James is partying or studying without relying on external data. However, according to one embodiment of the invention, the machine can access a network, such as the Internet, or a database to get some relevant information. Here, in step 240, the machine checks the social networking website Facebook to determine James' recent activity. Facebook reveals that James got a C on his biology midterm and displays several photographs of James getting drunk and engaging in "partying" behavior. The machine then replies 250 to the user, in an angry female voice, "It is horrible. James got a C on his biology midterm, and he is drinking very heavily. Look at these photographs taken by his neighbor." The machine then proceeds to display the photographs to the user. In step 260, the user continues the conversation, "Oh my God. What will we do? Should I tell James that I will disinherit him unless he improves his grades?"

Note that a female voice was used because Penelope is a woman. In one embodiment, other features of Penelope, for example, her race, age, accent, profession, and background could be used to select an optimal voice, dialect, and intonation for her. For example, Penelope might be a 75-year-old, lifelong white Texan housewife who speaks with a strong rural Texas accent.

The machine could look up the information about James in response to the query, as illustrated here. In another embodiment, the machine could know that the user has some favorite topics that he likes to discuss (e g family, weather, etc.) The machine would then prepare for these discussions in advance or in real-time by looking up relevant information on the network and storing it. This way, the machine would be able to discuss James' college experience in a place where there was no Internet access. In accordance with this embodiment, at least one Internet search may occur automatically, without a direct request from the user. In yet another embodiment, instead of doing the lookup electronically, the machine could connect to a remote computer server or a remote person who would select a response to give the user. Note that the remote person might be different from the person whose photograph appears on the display. This embodiment is useful because it ensures that the machine will not advise the user to do something rash, such as disinheriting his grandson.

Note that both the machine's response to the user's first inquiry and the user's response to the machine are conversationally relevant, meaning that the statements respond to the queries, add to the conversation, and increase the knowledge available to the other party. In the first step, the user asked a question about what James was doing. The machine then responded that James' grades were bad and that he had been drunk on several occasions. This information added to the user's base of knowledge about James. The user then built on what the machine had to say by suggesting threatening to disinherit James as a potential solution to the problem of James' poor grades.

In one embodiment, the machine starts up and shuts down in response to the user's oral commands. This is convenient for elderly users who may have difficulty pressing buttons. A deactivation permits the machine to enter into a power saving low power consumption mode. In another embodiment, the microphone and camera monitor continuously the scene for the presence of an emergency. If an emergency is detected, emergency assistance services, selected for example from the group of one or more of police, fire, ambulance, nursing home staff, hospital staff, and family members might be called. Optionally, the device could store and provide information relevant to the emergency, to emergency assistance personnel. Information relevant to the emergency includes, for example, a video, photograph or audio recording of the circumstance causing the emergency. To the extent the machine is a telephone, an automated e911 call might be placed, which typically conveys the user's location. The machine, therefore, may include a GPS receiver, other satellite geolocation receiver, or be usable with a network-based location system.

In another embodiment of this invention, the machine provides a social networking site by providing the responses of various people to different situations. For example, Ulysses is not the first grandfather to deal with a grandson with poor grades who drinks and parties a lot. If the machine could provide Ulysses with information about how other grandparents dealt with this problem (without disinheriting their grandchildren), it might be useful to Ulysses.

In yet another embodiment (not illustrated) the machine implementing the invention could be programmed to periodically start conversations with the user itself, for example, if the machine learns of an event that would be interesting to the user. (E.g., in the above example, if James received an A+ in chemistry, the machine might be prompted to share the happy news with Ulysses.) To implement this embodiment, the machine would receive relevant information from a network or database, for example through a web crawler or an RSS feed. Alternatively, the machine could check various relevant websites, such as James' social networking pages, itself to determine if there are updates. The machine might also receive proactive communications from a remote system, such as using an SMS or MMS message, email, IP packet, or other electronic communication.

Example 2

Cell Phone with Low Processing Abilities

Figure 3:
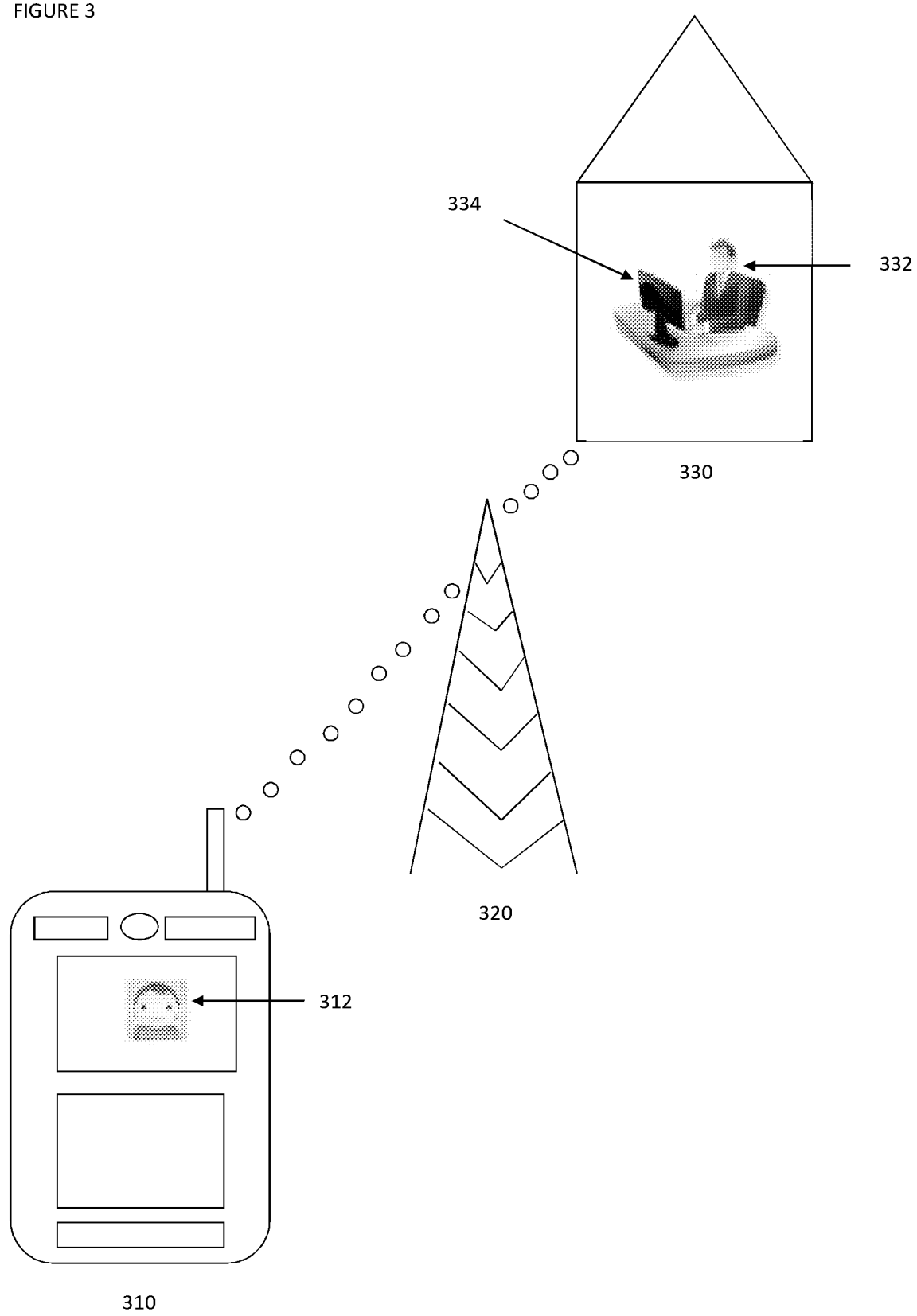
FIG. 3 illustrates an embodiment of this invention which can be run on a substantially arbitrary cell phone with low processing abilities.

This embodiment of this invention, as illustrated in FIG. 3, can be run on an arbitrary cell phone 310 connected to a cellular network, such as the GSM and CDMA networks available in the US, such as the Motorola Razr or Sony Ericsson W580. The cell phone implementing this embodiment of the invention preferably has an ability to place calls, a camera, a speakerphone, and a color screen. To use the invention, the user of the cell phone 310 places a call to a call center 330. The call could be placed by dialing a telephone number or by running an application on the phone. The call is carried over cell tower 320. In response to placing the call, an image of a person selected by the user or an avatar appears on the screen of the cell phone 310. Preferably, the call center is operated by the telephone company that provides cell phone service for cell phone 310. This way, the telephone company has control over the output on the screen of the cell phone as well as over the voice messages that are transmitted over the network.

The user says something that is heard at call center 330 by employee 332. The employee 332 can also see the user through the camera in the user's telephone. An image of the user appears on the employee's computer 334, such that the employee can look at the user and infer the user's mood. The employee then selects a conversationally relevant response, which builds on what the user said and is at least partially responsive to the query, to say to the user. The employee can control the facial expression of the avatar on the user's cell phone screen. In one embodiment, the employee sets up the facial expression on the computer screen by adjusting the face through mouse "drag and drop" techniques. In another embodiment, the computer 334 has a camera that detects the employee's facial expression and makes the same expression on the user's screen. This is processed by the call center computer 334 to provide an output to the user through cell phone's 310 speaker. If the user asks a question, such as, "What will the weather be in New York tomorrow?" the call center employee 332 can look up the answer through Google or Microsoft Bing search on computer 334.

Preferably, each call center employee is assigned to a small group of users whose calls she answers. This way, the call center employee can come to personally know the people with whom she speaks and the topic that they enjoy discussing. Conversations will thus be more meaningful to the users.

Example 3

Smart Phone, Laptop or Desktop with CPU Connected to a Network

Figure 4:
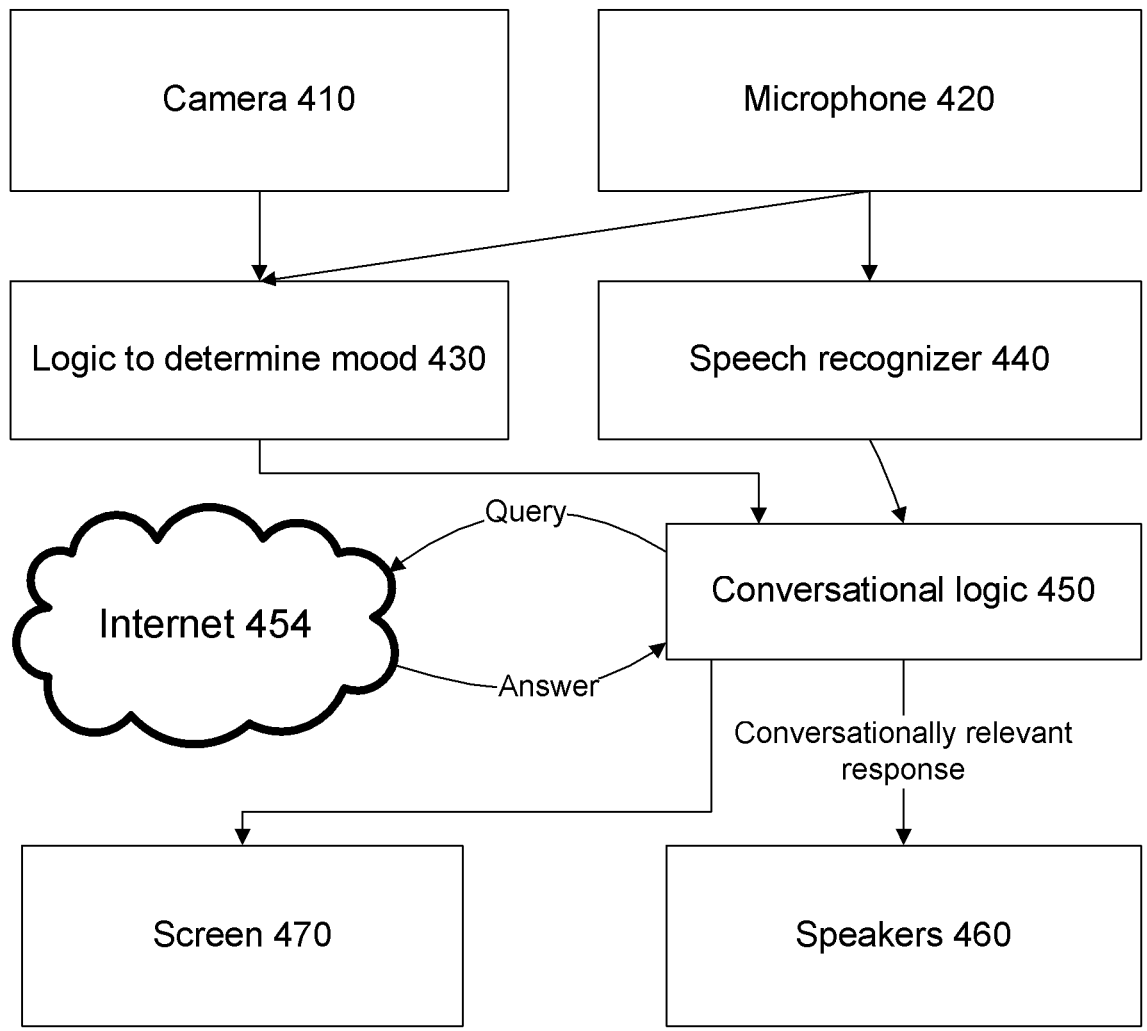
FIG. 4 illustrates a flowchart for a processor implementing an embodiment of the present invention.

Another embodiment of the invention illustrated in FIG. 4, is implemented on a smartphone, laptop computer, or desktop computer with a CPU connected to a network, such as a cellular network or an Ethernet WiFi network that is connected to the internet. The phone or computer implementing the invention has a camera 410 and a microphone 420 for receiving input from the user. The image data received by the camera and the audio data received by the microphone are fed to a logic to determine the user's mood 430 and a speech recognizer 440. The logic to determine the user's mood 430 provides as output a representation of the mood and the speech recognizer 440 provides as output a representation of the speech.

As noted above, persons skilled in the art will recognize many ways the mood-determining logic 430 could operate. For example, Bohacek, U.S. Pat. No. 6,411,687, incorporated herein by reference, teaches that a speaker's gender, age, and dialect or accent can be determined from the speech. Black, U.S. Pat. No. 5,774,591, incorporated herein by reference, teaches about using a camera to ascertain the facial expression of a user and determining the user's mood from the facial expression. Bushey, U.S. Pat. No. 7,224,790, similarly teaches about "verbal style analysis" to determine a customer's level of frustration when the customer telephones a call center. A similar "verbal style analysis" can be used here to ascertain the mood of the user. Combining the technologies taught by Bohacek, Black, and Bushey would provide the best picture of the emotional state of the user, taking many different factors into account.

Persons skilled in the art will also recognize many ways to implement the speech recognizer 440. For example, Gupta, U.S. Pat. No. 6,138,095, incorporated herein by reference, teaches a speech recognizer where the words that a person is saying are compared with a dictionary. An error checker is used to determine the degree of the possible error in pronunciation. Alternatively, in a preferred embodiment, a hierarchal stacked neural network, as taught by Commons, U.S. Pat. No. 7,613,663, incorporated herein by reference, could be used. If the neural networks of Commons are used to implement the invention, the lowest level neural network would recognize speech as speech (rather than background noise). The second level neural network would arrange speech into phonemes. The third level neural network would arrange the phonemes into words. The fourth level would arrange words into sentences. The fifth level would combine sentences into meaningful paragraphs or idea structures. The neural network is the preferred embodiment for the speech recognition software because the meanings of words (especially keywords) used by humans are often fuzzy and context sensitive. Rules, which are programmed to process clear-cut categories, are not efficient for interpreting ambiguity.

The output of the logic to determine mood 430 and the speech recognizer 440 are provided to a conversation logic 450. The conversation logic selects a conversationally relevant response 452 to the user's verbal (and preferably also image and voice tone) input to provide to the speakers 460. It also selects a facial expression for the face on the screen 470. The conversationally relevant response should expand on the user's last statement and what was previously said in the conversation. If the user's last statement included at least one query, the conversationally relevant response preferably answers at least part of the query. If necessary, the conversation logic 450 could consult the internet 454 to get an answer to the query 456. This could be necessary if the user asks a query such as "Is my grandson James partying instead of studying?" or "What is the weather in New York?"

To determine whether the user's grandson James is partying or studying, the conversation logic 450 would first convert "grandson James" into a name, such as James Kerner. The last name could be determined either through memory (stored either in the memory of the phone or computer or on a server accessible over the Internet 454) of prior conversations or by asking the user, "What is James' last name?" The data as to whether James is partying or studying could be determined using a standard search engine accessed through the Internet 454, such as Google or Microsoft Bing. While these might not provide accurate information about James, these might provide conversationally relevant information to allow the phone or computer implementing the invention to say something to keep the conversation going. Alternatively, to provide more accurate information the conversation logic 450 could search for information about James Kerner on social networking sites accessible on the Internet 454, such as Facebook, LinkedIn, Twitter, etc., as well as any public internet sites dedicated specifically to providing information about James Kerner. (For example, many law firms provide a separate web page describing each of their attorneys.) If the user is a member of a social networking site, the conversation logic could log into the site to be able to view information that is available to the user but not to the general public. For example, Facebook allows users to share some information with their "friends" but not with the general public. The conversation logic 450 could use the combination of text, photographs, videos, etc. to learn about James' activities and to come to a conclusion as to whether they constitute "partying" or "studying."

To determine the weather in New York, the conversation logic 450 could use a search engine accessed through the Internet 454, such as Google or Microsoft Bing. Alternatively, the conversation logic could connect with a server adapted to provide weather information, such as The Weather Channel, www.weather.com, or AccuWeather, www.accuweather.com, or the National Oceanic and Atmospheric Administration, www.nws.noaa.gov.

Note that, to be conversationally relevant, each statement must expand on what was said previously. Thus, if the user asks the question, "What is the weather in New York?" twice, the second response must be different from the first. For example, the first response might be, "It will rain in the morning," and the second response might be, "It sunny after the rain stops in the afternoon." However, if the second response were exactly the same as the first, it would not be conversationally relevant as it would not build on the knowledge available to the parties.

The phone or computer implementing the invention can say arbitrary phrases. In one embodiment, if the voice samples of the person on the screen are available, that voice could be used. In another embodiment, the decision as to which voice to use is made based on the gender of the speaker alone.

In a preferred embodiment, the image on the screen 470 looks like it is talking. When the image on the screen is talking, several parameters need to be modified, including jaw rotation and thrust, horizontal mouth width, lip corner and protrusion controls, lower lip tuck, vertical lip position, horizontal and vertical teeth offset, and tongue angle, width, and length. Preferably, the processor of the phone or computer that is implementing the invention will model the talking head as a 3D mesh that can be parametrically deformed (in response to facial movements during speech and facial gestures).

Example 4

Smart Clock Radio

Figure 5:
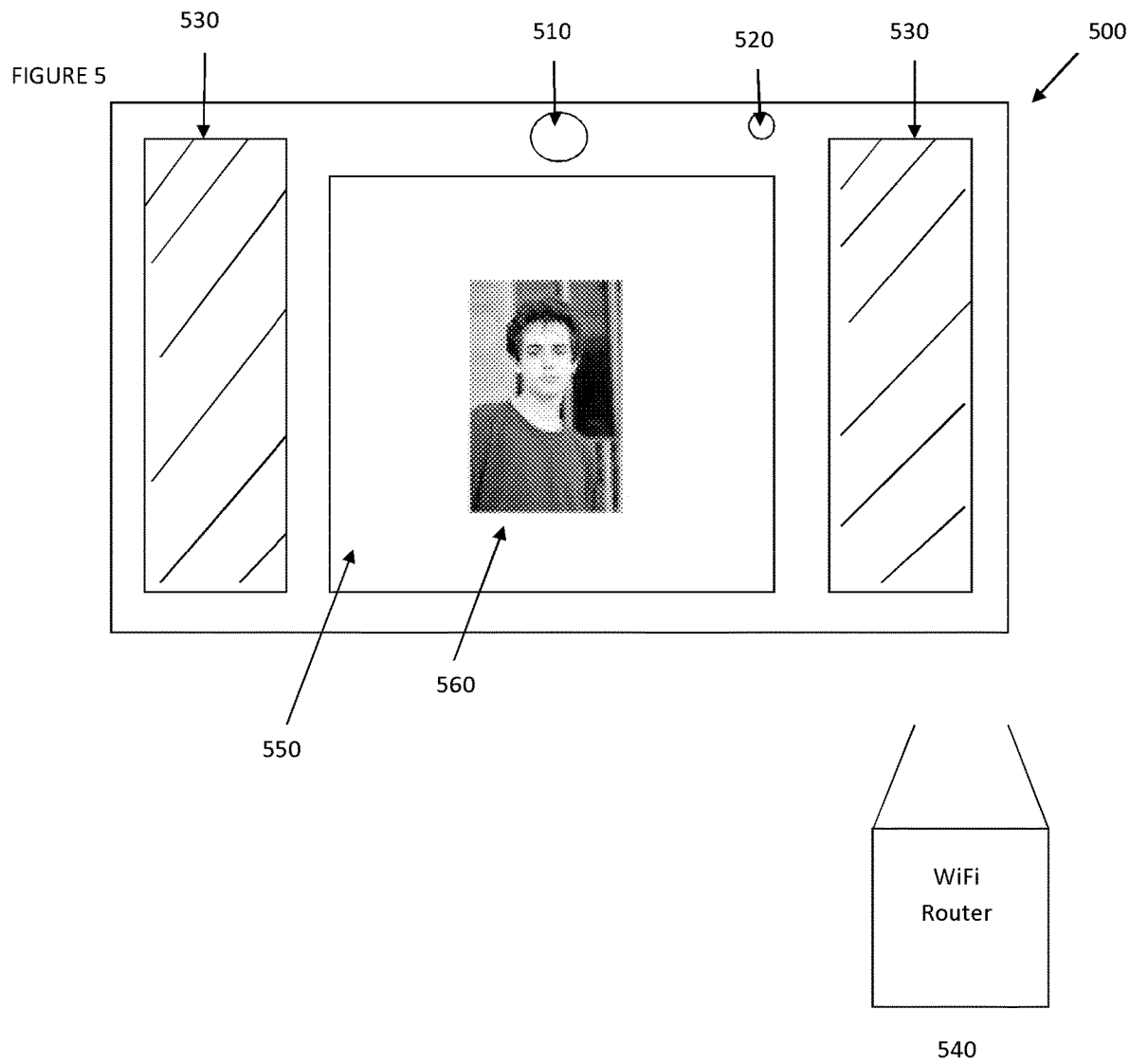
FIG. 5 illustrates a smart clock radio implementing an embodiment of the present invention.

Another embodiment of this invention illustrated in FIG. 5, includes a smart clock radio 500, such as the Sony Dash, adapted to implement the invention. The radio once again includes a camera 510 and a microphone 520 for receiving input from the user. Speakers 530 provide audio output, and a screen 550 provides visual output. The speakers 530 may also be used for other purposes, for example, to play music or news on AM, FM, XM, or Internet radio stations or to play CDs or electronic audio files. The radio is able to connect to the Internet through the home WiFi network 540. In another embodiment, an Ethernet wire or another wired or wireless connection is used to connect the radio to the Internet.

In one embodiment, the radio 500 operates in a manner equivalent to that described in the smartphone/laptop embodiment illustrated in FIG. 4. However, it should be noted that, while a user typically sits in front of a computer or cell phone while she is working with it, users typically are located further away from the clock radio. For example, the clock radio might be located in a fixed corner of the kitchen, and the user could talk to the clock radio while the user is washing the dishes, setting the table or cooking.

Therefore, in a preferred embodiment, the camera 510 is more powerful than a typical laptop camera and is adapted to viewing the user's face to determine the facial expression from a distance. Camera resolutions on the order of 8-12 megapixels are preferred, although any camera will suffice for the purposes of the invention.

Example 5

Television with Set-Top Box

Figure 6:
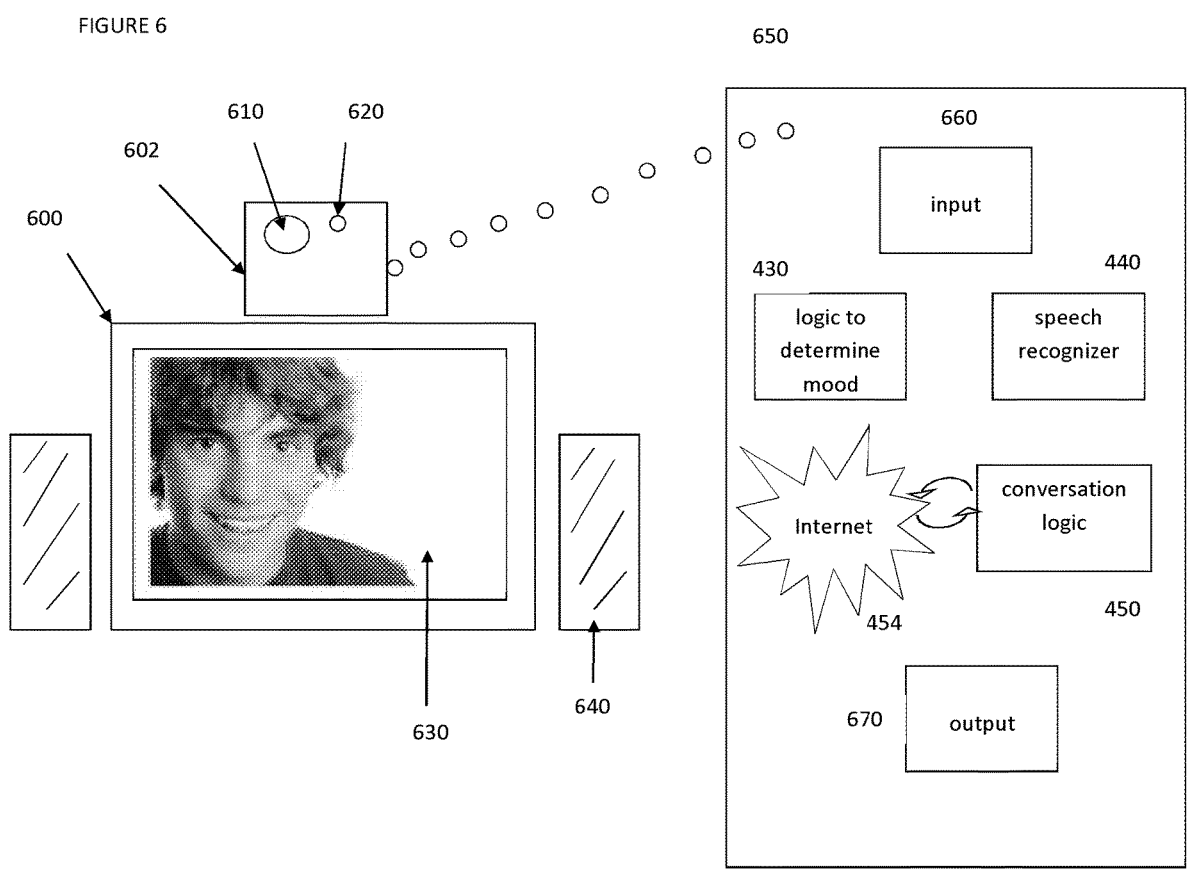
FIG. 6 illustrates a television with a set-top box implementing an embodiment of the present invention.

The next detailed embodiment of the invention illustrated in FIG. 6, is a television 600 with a set-top box (STB) 602. The STB is a standard STB, such as a cable converter box or a digital TV tuner available from many cable companies. However, the STB preferably either has or is configured to receive input from a camera 610 and microphone 620. The output is provided to the user through the TV screen 630 and speakers 640.

If the STB has a memory and is able to process machine instructions and connect to the internet (over WiFi, Ethernet or similar), the invention may be implemented on the STB (not illustrated). Otherwise, the STB may connect to a remote server 650 to implement the invention. The remote server will take as input the audio and image data gathered by the STB's microphone and camera. The output provided is an image to display in screen 630 and audio output for speakers 640.

The logic to determine mood 430, speech recognizer 440, and the conversation logic 450, which connects to the Internet 454 to provide data for discussion all operate in a manner identical to the description of FIG. 4.

When setting up the person to be displayed on the screen, the user needs to either select a default display or send a photograph of a person that the user wishes to speak with to the company implementing the invention. In one embodiment, the image is transmitted electronically over the Internet. In another embodiment, the user mails a paper photograph to an office, where the photograph is scanned, and a digital image of the person is stored.

Example 6

Robot with a Face

Figure 7:
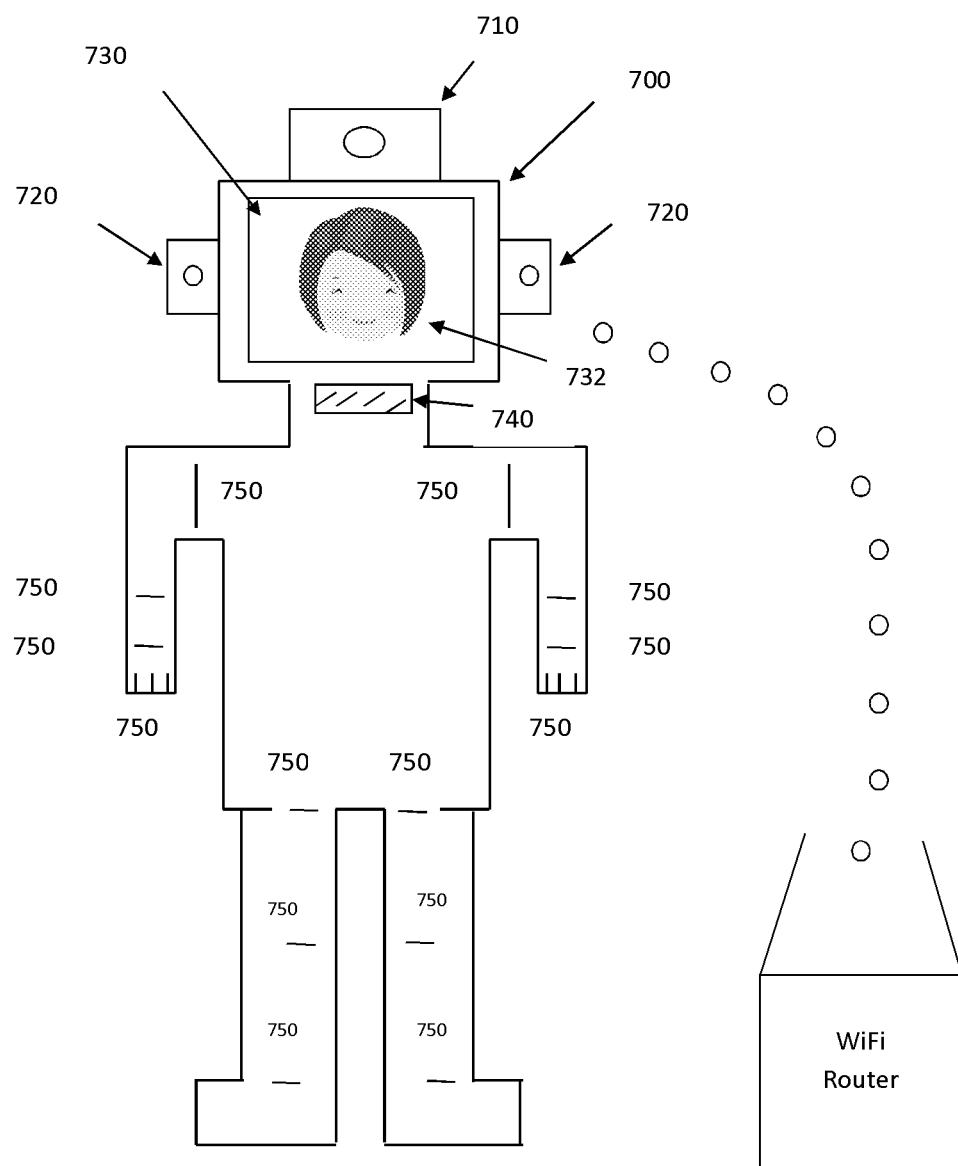
FIG. 7 illustrates a special purpose robot implementing an embodiment of the present invention.

FIG. 7 illustrates a special purpose robot 700 designed to implement an embodiment of this invention. The robot receives input through a camera 710 and at least one microphone 720. The output is provided through a screen 730, which displays the face of a person 732, or non-human being, which is either selected by the user or provided by default. There is also at least one speaker 740. The robot further has joints 750, which it can move in order to make gestures.

The logic implementing the invention operates in a manner essentially identical to that illustrated in FIG. 4. In a preferred embodiment, all of the logic is internal to the robot. However, other embodiments, such as a processor external to the robot connecting to the robot via the Internet or via a local connection, are possible.

There are some notable differences between the present embodiment and that illustrated in FIG. 4. In a preferred embodiment, the internet connection, which is essential for conversation logic 450 of FIG. 4 is provided by WiFi router 540 and the robot 700 is able to connect to WiFi. Alternatively, the robot 700 could connect to the internet through a cellular network or through an Ethernet cable. In addition to determining words, voice tone, and facial expression, the conversation logic 450 can now suggest gestures, e.g., wave the right hand, point middle finger, etc. to the robot.

In one embodiment, the camera is mobile, and the robot rotates the camera so as to continue looking at the user when the user moves. Further, the camera is a three-dimensional camera comprising a structured light illuminator. Preferably, the structured light illuminator is not in a visible frequency, thereby allowing it to ascertain the image of the user's face and all of the contours thereon.

Structured light involves projecting a known pattern of pixels (often grids or horizontal bars) on to a scene. These patterns deform when striking surfaces, thereby allowing vision systems to calculate the depth and surface information of the objects in the scene. For the present invention, this feature of structured light is useful to calculate and to ascertain the facial features of the user. Structured light could be outside the visible spectrum, for example, infrared light. This allows for the robot to effectively detect the user's facial features without the user being discomforted.

In a preferred embodiment, the robot is completely responsive to voice prompts and has very few button, all of which are rather larger. This embodiment is preferred because it makes the robot easier to use for elderly and disabled people who might have difficulty pressing small buttons.

In this disclosure, we have described several embodiments of this broad invention. Persons skilled in the art will definitely have other ideas as to how the teachings of this specification can be used. It is not our intent to limit this broad invention to the embodiments described in the specification. Rather, the invention is limited by the following claims.

Figure 8:
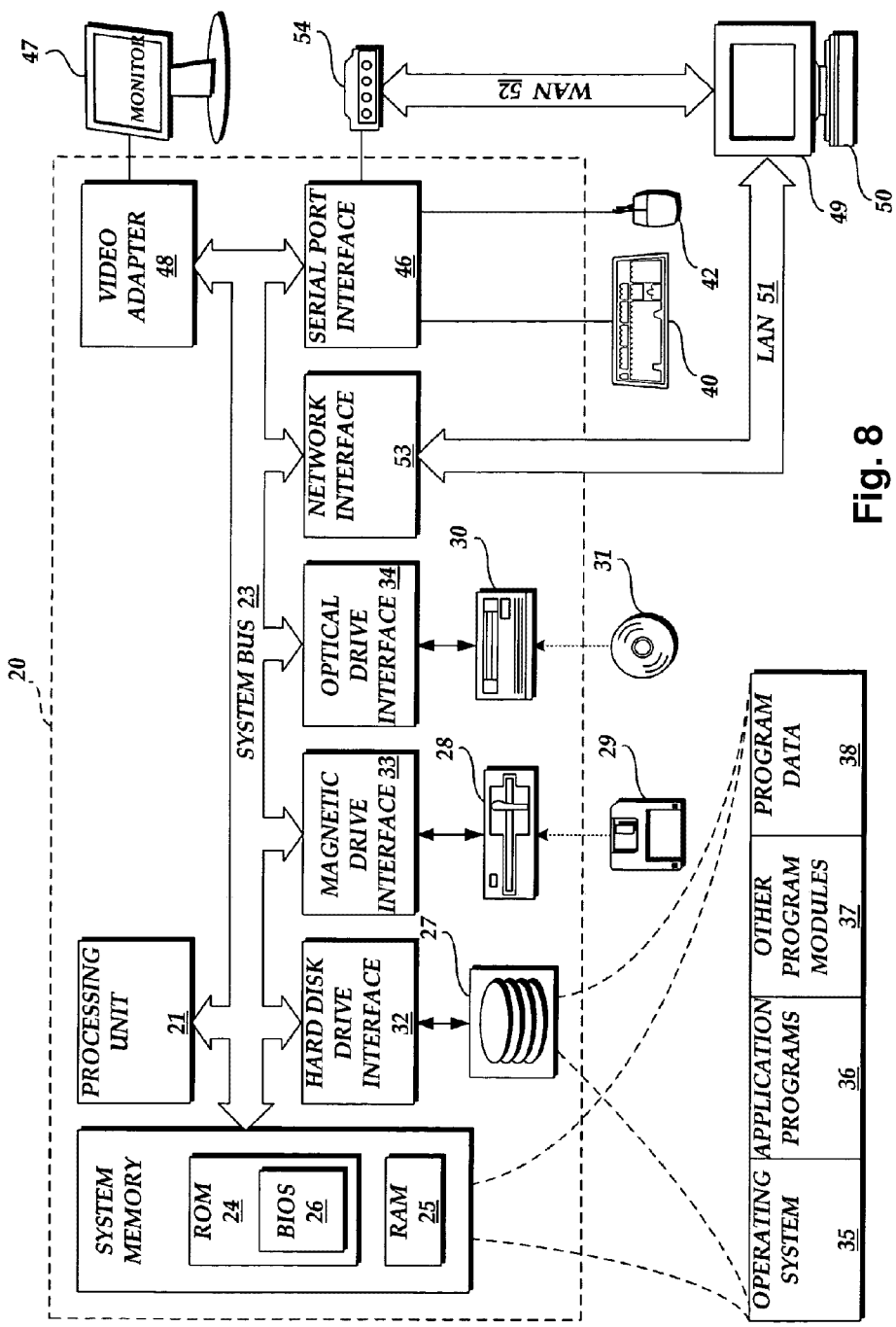
FIG. 8 shows a prior art computer system.

With reference to FIG. 8, a generic system, such as disclosed in U.S. Pat. No. 7,631,317, for processing program instructions is shown which includes a general purpose computing device in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system 26 (BIOS) containing the basic routines that help to transfer information between elements within the personal computer 20, such as during start-up, is stored in ROM 24. In one embodiment of the present invention on a server computer 20 with a remote client computer 49, commands are stored in system memory 22 and are executed by processing unit 21 for creating, sending, and using self-descriptive objects as messages over a message queuing network in accordance with the invention. The personal computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer-readable media which can store data that is accessible by a computer, such as flash memory, network storage systems, magnetic cassettes, random access memories (RAM), read only memories (ROM), and the like, may also be used in the exemplary operating environment.

A number of program modules may be stored on the hard disk, magnetic disk 29, optical disk 31, ROM 24 or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial data interface 46 that is coupled to the system bus, but may be collected by other interfaces, such as a parallel port, game port or a universal serial bus (USB). A monitor 47 or another type of display device is also connected to the system bus 23 via an interface, such as a video adapter 48. In addition to the monitor, personal computers typically include other peripheral output devices (not shown), such as speakers and printers.

The personal computer 20 may operate in a networked environment using logical connections to one or more remote computers, such as a remote computer 49, through a packet data network interface to a packet switch data network. The remote computer 49 may be another personal computer, a server, a router, a network PC, a peer device or other common network node, and typically includes many or all of the elements described above relative to the personal computer 20, although only a memory storage device 50 has been illustrated in FIG. 8. The logical connections depicted in FIG. 8 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the local network 51 through a network interface or adapter 53. When used in a WAN networking environment, the personal computer 20 typically includes a modem 54 or other elements for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other elements for establishing a communications link between the computers may be used.

Typically, a digital data stream from a superconducting digital electronic processing system may have a data rate which exceeds a capability of a room temperature processing system to handle. For example, complex (but not necessarily high data rate) calculations or user interface functions may be more efficiently executed on a general purpose computer than a specialized superconducting digital signal processing system. In that case, the data may be parallelized or decimated to provide a lower clock rate, while retaining essential information for downstream processing.

The present embodiments are to be considered in all respects as illustrative and not restrictive, and all changes which come within the meaning and range of equivalency of the claims are therefore intended to be embraced therein. The invention may be embodied in other specific forms without departing from the spirit or essential characteristics thereof. The disclosure shall be interpreted to encompass all of the various combinations and permutations of the elements, steps, and claims disclosed herein, to the extent consistent, and shall not be limited to specific combinations as provided in the detailed embodiments.

What is claimed is:

1. A user interface device comprising:
   topic
   a communication port configured to communicate a received spoken language from a user, with a communication network comprising the Internet;
   at least one processor configured to:
      control the communication port to communicate the spoken natural language input received through the input port over the Internet to an automated data processing system;
      analyze the spoken natural language input and a past history of interaction to determine a topic of interest to the user;
      automatically generate a query seeking information corresponding to the topic of interest;
      generate a search request for communication to a database through the Internet based on the query and the topic of interest;
      receive at least one response from the database through the Internet comprising information selectively dependent on the generated search request;
      automatically gather information relating to the topic of interest and the query from a plurality of sources dependent on the at least one response from the database, without a prompt or other action from the user;
      receiving sponsored or advertising content related to the generated search request through the Internet;
      determine a context of the spoken natural language input based on at least prior spoken natural language inputs from the user received as part of an interactive conversation about the topic of interest to the user and the query;
      select information from the gathered information in a context-sensitive manner; and
      formulate a context-appropriate interactive spoken natural language output, dependent on the spoken natural language input and a past history of interaction, comprising the sponsored or advertising content and the selected information, as a response to the spoken natural language input; and
   the communication port being further configured to communicate the context-appropriate interactive spoken natural language output to the user,
   wherein the communication port is controlled by the at least one processor to engage in a context-appropriate interactive spoken natural language conversation with the user comprising the topic of interest to the user, the query, the selected information, the gathered information, and the received sponsored or advertising content related to the generated search request.

2. The user interface device of claim 1, wherein the spoken natural language output is presented according to an associated user mood, which is inferred-depending on at least one of the spoken natural language input, the topic of interest, the query, and the determined context.

3. The user interface device of claim 1, wherein the input port is configured to continuously receive audio and image information to monitor surroundings for presence of an emergency.

4. The user interface device of claim 1, wherein the input port, a portion of said at least one processor sufficient to process the spoken natural language input to selectively start up a communication over the communication port, and said at least one output port are together implemented in a mobile communication device, and the input port receives the spoken natural language input from a microphone of the mobile communication device.

5. The user interface device of claim 1, wherein said at least one processor is configured to respond to a request for establishment of an interactive speech communication channel in the spoken natural language input, to automatically initiate the interactive communication channel through the communication port.

6. The user interface device of claim 1, further comprising a geolocation receiver for determining a geolocation of the user, and the at least one processor is further configured to have at least one mode of operation in which the geolocation of the user is communicated through the communication port and wherein the at least one response is dependent on the communicated geolocation.

7. The user interface device of claim 1 further comprising a display, wherein a portion of said at least one automated processor proximate to the input port and the at least one output port is further configured to control the display to produce an avatar which selectively corresponds to the selected information.

8. The user interface of claim 1, wherein the database comprises a remote social networking service.

9. The user interface device of claim 1, wherein a portion of said at least one processor is configured to recognize speech, and the at least one processor is further configured to:
   process the oral command to selectively start up the user interface device from a low power consumption mode in which data from the input port is not communicated through the communication port, to a non-low power consumption mode in which data from the input port is communicated through the communication port; and
   shut down up the user interface device from a non-low power consumption mode in which data from the input port is communicated through the communication port to a low power consumption mode in which data from the input port is not communicated through the communication port.

10. The user interface device of claim 1, wherein said at least one processor is further configured to capture spatial information about the user derived from at least one of an acoustic data input device and an image data input device.

11. The user interface device of claim 1, wherein said at least one processor is further configured to automatically generate a user profile of the user based on at least one prior interaction of the user with the user interface device.

12. The user interface device of claim 1, further comprising a digital video receiver, and an image output port for driving an image display device proximate to the user with media from the digital video receiver.

13. The user interface device of claim 1, wherein said at least one processor is further configured to receive at least an audio program from the communication network representing at least one of music and a talk show, and to present said at least one of music and a talk show through the at least one output port, controlled according to the spoken natural language input.

14. The user interface device of claim 1, further comprising at least one camera, wherein a first portion of said at least one processor is further configured to control acquisition of at least one image through said at least one camera and to communicate the at least one image through the communication port to a second portion of the at least one processor.

15. The user interface device of claim 1, wherein the contextually-appropriate interactive natural language output is generated by a multilayered neural network.

16. The user interface device of claim 1, wherein the communication network comprises a cellular wireless network.

17. The user interface device of claim 1, the communication network comprises a WiFi network.

18. The user interface device of claim 1, wherein the input port is configured to receive spoken language input from a microphone within a device selected from the group consisting of a smartphone, a tablet, a laptop and a personal digital assistant.

19. The user interface device of claim 1, wherein the database is an Internet search engine, and the at least one automated processor financially accounts for a presentation of the sponsored or advertising content.

20. A user interface method, comprising:
receiving audio information comprising a spoken natural language input through a microphone of a user interface device, of a topic of interest to a user and a query;
communicating processed audio information representing the topic of interest to the user and the query to a remotely located automated data processing system through the Internet;
automatically analyzing the communicated processed audio information and a past history of interaction, at the remotely located automated data processing system, to determine a topic of interest and the query;
automatically generating a search request for a database outside of the remotely located automated data processing system through the Internet, based on the query and the topic of interest;
automatically gathering information relating to the topic of interest and the query from a plurality of sources dependent on the at least one response to the search request from the database, without a prompt or other action from the user;
receiving at least one response through the Internet selectively dependent on the search request;
receiving sponsored or advertising content related to the generated search request through the Internet;
determining a context of the spoken natural language input based on at least prior spoken natural language inputs from the user, representing an interactive conversation about the topic of interest to the user and the query;
selecting information from the gathered information in a context-sensitive manner;
formulating a context-dependent interactive spoken natural language output, dependent on the spoken natural language input and a past history of interaction, from the selected information, the gathered information, and the received sponsored or advertising content related to the generated search request; and
presenting the formulated context-dependent interactive spoken natural language output to the user through a speaker of the user interface device.

21. The method of claim 20, further comprising inferring a mood of the user, and presenting the spoken natural language output selectively dependent on the inferred mood of the user.

22. The method of claim 20, further comprising determining a user mood associated with the user, and presenting the spoken natural language output according to the determined associated user mood, the spoken natural language output being varied depending on at least one of the received audio information, the gathered information, the topic of interest to the user, the query, and the received at least one response.

23. The method of claim 20, further comprising:
receiving a user oral command when the user interface is in a first mode which is a power-saving low power consumption mode;
responding to the user oral command without communication through the Internet, to enter a second mode which is not a power-saving low power consumption mode;
receiving the spoken natural language input through the microphone of the user interface device and communicating the spoken natural language input over the Internet selectively when the user interface device is in the second mode;
determining within the spoken natural language input, a user request for initiation of an interactive voice communication channel;
automatically initiating the requested interactive voice communication channel; and
returning the user interface device to the first mode.

24. The method of claim 20, wherein the user interface device further comprises a display, further comprising controlling the display to present an avatar associated with the spoken natural language output, the avatar being animated depending on the received at least one response from the database, and the determined context.

25. The method of claim 20, further comprising automatically generating a user profile based on at least one prior user input or prior user action; and formulating the context-dependent interactive spoken natural language output further selectively dependent on the user profile.

26. A user interface method, comprising:
receiving audio information through a microphone of a user interface device comprising an interactive spoken natural language input;

receiving image information through a camera of the user interface device;

communicating a message to an automated database system representing the interactive spoken natural language input and the image information;

automatically determining a query represented by the interactive spoken natural language input;

automatically determining a topic of interest to the user based on the interactive spoken natural language input and a history of prior interaction with the user;

automatically recognizing at least one user gesture represented in the image information with at least one automated processor;

receiving a response from the automated database system responsive to the query;

inferring a mood of the user based on the interactive spoken natural language input and the at least one user gesture;

automatically gathering information relating to the topic of interest and the query from a plurality of sources without a prompt or other action from the user;

receiving a sponsored or advertising content related to the topic of interest to the user and the query;

determining a context of the interactive spoken natural language input based on at least prior user interactions;

select information from the response dependent on the determined context;

formulating a contextually-appropriate conversational spoken natural language reply to the user from the selected information, the gathered information, the inferred mood, and the sponsored or advertising content, further dependent on the recognized at least one user gesture; and presenting the contextually-appropriate conversational spoken natural language conversational reply through an anthropomorphic object of the user interface device, wherein the anthropomorphic object conveys an anthropomorphic mood responsive to the inferred mood of the user.

27. The user interface method of claim 26, wherein the user interface device further comprises a geolocation receiver, further comprising communicating a geolocation of the user interface device to the automated database system, and wherein the response is dependent on the communicated geolocation.

* * * * *